US010020596B2

(12) United States Patent
Benjebbour et al.

(10) Patent No.: US 10,020,596 B2
(45) Date of Patent: Jul. 10, 2018

(54) RADIO BASE STATION

(71) Applicant: NTT DOCOMO, INC., Tokyo (JP)

(72) Inventors: Anass Benjebbour, Tokyo (JP); Satoshi Suyama, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 15/313,570

(22) PCT Filed: Apr. 22, 2016

(86) PCT No.: PCT/JP2016/062736
§ 371 (c)(1),
(2) Date: Nov. 23, 2016

(87) PCT Pub. No.: WO2016/175144
PCT Pub. Date: Nov. 3, 2016

(65) Prior Publication Data
US 2018/0040964 A1 Feb. 8, 2018

(30) Foreign Application Priority Data
Apr. 30, 2015 (JP) .................... 2015-092708

(51) Int. Cl.
*G08B 13/14* (2006.01)
*H01Q 21/22* (2006.01)
(Continued)

(52) U.S. Cl.
CPC ............ *H01Q 21/225* (2013.01); *H01Q 3/26* (2013.01); *H04B 7/10* (2013.01); *H04B 7/0456* (2013.01); *H04B 7/0897* (2013.01)

(58) Field of Classification Search
CPC .................................. H04W 4/00; H04L 1/00
See application file for complete search history.

(56) References Cited

U.S. PATENT DOCUMENTS

| 7,392,015 B1* | 6/2008 | Farlow | H04B 17/21 |
| | | | 342/387 |
| 7,809,393 B2* | 10/2010 | Runze | H04W 52/52 |
| | | | 455/522 |
| 2010/0150013 A1 | 6/2010 | Hara et al. | |

FOREIGN PATENT DOCUMENTS

| JP | 2007-028569 A | 2/2007 |
| JP | 2013-201706 A | 10/2013 |

(Continued)

OTHER PUBLICATIONS

International Search Report issued in corresponding application No. PCT/JP2016/062736 dated Jul. 5, 2016 (2 pages).
(Continued)

*Primary Examiner* — Shirley Lu
(74) *Attorney, Agent, or Firm* — Osha Liang LLP

(57) ABSTRACT

A base station performs the combination of digital precoding and analog beamforming. Transceiving antenna elements are classified into antenna groups. The analog beamformer includes branches corresponding to the antenna groups. Each branch includes sub-branches, and each sub-branch is connected to one antenna element. In self-calibration, after pilot signals are transmitted from antenna elements belonging to an antenna group and are received by antenna elements belonging to another antenna group, it is identifiable as to which antenna element transmitted each pilot signal. After pilot signals are received by antenna elements belonging to an antenna group, it is identifiable as to which antenna element received each pilot signal.

7 Claims, 27 Drawing Sheets

(51) Int. Cl.
*H04B 7/10* (2017.01)
*H01Q 3/26* (2006.01)
*H04B 7/08* (2006.01)
*H04B 7/0456* (2017.01)

(56) References Cited

FOREIGN PATENT DOCUMENTS

| | | |
|---|---|---|
| JP | 2013-232741 A | 11/2013 |
| JP | 2014-220776 A | 11/2014 |
| JP | 2014-531811 A | 11/2014 |
| WO | 2008/146494 A1 | 12/2008 |
| WO | 2013/042922 A2 | 3/2013 |

OTHER PUBLICATIONS

Written Opinion of the International Searching Authority issued in corresponding application No. PCT/JP2016/062736 dated Jul. 5, 2016 (3 pages).
Mitsubishi Electric, "Discussion on antenna calibration in TDD"; 3GPP TSG RAN WG1 #55bis meeting, R1-090043; Ljubljana, Slovenia; Jan. 12-16, 2009 (4 pages).
Qualcomm Europe, "Calibration Procedures for TDD Beamforming"; 3GPP TSG RAN1 #51bis, R1-080494; Sevilla, Spain; Jan. 14-18, 2008 (6 pages).
Obara et al., "Joint Fixed Beamforming and Eigenmode Precoding for Super High Bit Rate Massive MIMO Systems Using Higher Frequency Bands"; Personal, Indoor and Mobile Radio Communication (PIMRC); IEEE; Sep. 2014 (8 pages).

* cited by examiner

RADIO BASE STATION

TECHNICAL FIELD

The present invention relates to a radio base station.

BACKGROUND ART

TDD (time division duplexing) is known as one type of mobile communication scheme. Since frequency bands for an uplink and those for a downlink are the same in TDD, channel states on the air are basically the same between the uplink and the downlink. That the channel states are the same in the uplink and in the downlink is called "channel reciprocity."

Due to such channel reciprocity, theoretically, a radio base station is able to estimate downlink channel states based on uplink channel state information and determine parameters for downlink transmission. Determining parameters for downlink transmission based on uplink channel state information is advantageous as compared to determining parameters for downlink transmission based on downlink channel state information measured by a mobile station (user equipment) because the downlink channel state information need not be reported from the mobile station to the radio base station.

However, in reality, due to variations in characteristics of transmitting circuits and variations in characteristics of receiving circuits, downlink channel state information measured by a mobile station in a TDD mobile communication system is different from uplink channel state information measured by a radio base station. These characteristics change depending on the environment, such as the temperature and humidity, and differ among antennas in the same device. Hereafter, such characteristics of transmitting circuit are called "transmitting gain" and characteristics of receiving circuit are called "receiving gain."

For this reason, calibration of channel coefficients is proposed when parameters for downlink transmission is determined based on uplink channel coefficients (e.g., Non-Patent Documents 1 and 2). Such calibration of channel coefficients in a TDD mobile communication system is called radio frequency calibration (RF calibration) or antenna calibration.

Antenna calibration described in Non-Patent Document 1 will be described with reference to FIG. 1. As shown in FIG. 1, a radio base station 10 includes N number of transceiving antenna elements $11_1$ to $11_N$, and a user equipment 100 includes M number of transceiving antenna elements $101_1$ to $101_M$. Due to channel reciprocity between the uplink and the downlink, the following equation (1) can be obtained.

$$g_{m,n}^{(UL)} = g_{m,n}^{(DL)} \tag{1}$$

Here, $g_{m,n}^{(UL)}$ an uplink channel gain on the air from an antenna element $101_m$ of the user equipment 100 to an antenna element $11_n$ of the radio base station 10, and $g_{m,n}^{(DL)}$ is a downlink channel gain on the air from an antenna element $11_n$ of the radio base station 10 to an antenna element $101_m$ of the user equipment 100. The subscript m is a number for an antenna in the user equipment 100, and the subscript n is a number for an antenna in the radio base station 10.

The radio base station 10, with respect to antenna elements $11_1$ to $11_N$, has transmitting gains $T_{eNB,1}$ to $T_{eNB,N}$, respectively, for downlink transmission and has receiving gains $R_{eNB,1}$ $R_{eNB,N}$, respectively, for uplink reception. The user equipment 100, with respect to antenna elements $101_1$ to $101_M$, has receiving gains $R_{UE}$ to $R_{UE,M}$, respectively, for downlink reception and has transmitting gains $T_{UE,1}$ to $T_{UE,M}$, respectively, for uplink transmission.

Accordingly, an uplink channel coefficient $h_{m,n}^{(UL)}$ measured in the radio base station 10 can be expressed with the following equation (2).

$$h_{m,n}^{UL} = T_{UE,m} \cdot g_{m,n}^{(UL)} \cdot R_{eNB,n} \tag{2}$$

A downlink channel coefficient $h_{m,n}^{(DL)}$ measured in the user equipment 100 can be expressed with the following equation (3).

$$h_{m,n}^{(DL)} = T_{eNB,n} \cdot g_{m,n}^{(DL)} \cdot R_{UE,m} \tag{3}$$

As a result of $T_{UE,m} \cdot R_{eNB,n} \ne T_{eNB,n} R_{UE,m}$, $h_{m,n}^{(UL)} \ne h_{m,n}^{(DL)}$ can be obtained.

Therefore, when the radio base station 10 determines parameters for downlink transmission (e.g., downlink transmitting precoding matrix) based on uplink channel states alone, the determined parameters may not be appropriate for the reception in the user equipment 100. In view of this, the user equipment 100 applies calibration coefficients $c_{UE,m}$ to uplink signals transmitted with respective antennas, and the radio base station 10 applies calibration coefficients $c_{eNB,n}$ to downlink signals transmitted with respective antennas.

The calibrated uplink channel coefficient $a_{m,n}^{(UL)}$ is expressed as follows.

$$a_{m,n}^{(UL)} = c_{UE,m} \cdot h_{m,n}^{(UL)} \tag{4}$$

The calibrated downlink channel coefficient $a_{m,n}^{(DL)}$ is expressed as follows.

$$a_{m,n}^{(DL)} c_{eNB,n} \cdot h_{m,n}^{(DL)} \tag{5}$$

In order to calibrate channel reciprocity distorted by the transmitting gain and the receiving gain, the calibrated channel coefficient should satisfy the following equation.

$$\frac{a_{1,1}^{(UL)}}{a_{1,1}^{(DL)}} = \frac{a_{m,n}^{(UL)}}{a_{m,n}^{(DL)}} \quad m = 1, \ldots, M \quad n = 1, \ldots, N \tag{6}$$

Antenna calibration described in Non-Patent Document 1 is carried out by appropriate determination of calibration coefficients $c_{UE,m}$ and $c_{eNB,n}$ such that the following equations (7) and (8), which can be derived from equations (2), (3), and (6), are satisfied.

$$\frac{c_{UE,1} \cdot T_{UE,1}}{R_{UE,1}} = \frac{c_{UE,2} \cdot T_{UE,2}}{R_{UE,2}} = \ldots = \frac{c_{UE,M} \cdot T_{UE,M}}{R_{UE,M}} \tag{7}$$

$$\frac{c_{eNB,1} \cdot T_{eNB,1}}{R_{eNB,1}} = \frac{c_{eNB,2} \cdot T_{eNB,2}}{R_{eNB,2}} = \ldots = \frac{c_{eNB,N} \cdot T_{eNB,N}}{R_{eNB,N}} \tag{8}$$

Next, a more specific antenna calibration method that can be derived from the antenna calibration method described in Non-Patent Document 1 will be described. From equations (1), (2), and (3), when antenna calibration is not carried out, the relationship between the uplink channel coefficient and the downlink channel coefficient can be expressed by the following equation (9).

$$h_{m,n}^{(DL)} = \frac{R_{UE,m}}{T_{UE,m}} h_{m,n}^{(UL)} \frac{T_{eNB,n}}{R_{eNB,n}} \tag{9}$$

When equation (9) is expressed in a matrix format, equation (10) can be obtained. In other words, when antenna calibration is not carried out, the relationship between the uplink channel matrix and the downlink channel matrix can be expressed by equation (10).

$$H_{DL} = \begin{bmatrix} v_1 & & & 0 \\ & v_2 & & \\ & & \ddots & \\ 0 & & & v_M \end{bmatrix} H_{UL} \begin{bmatrix} w_1 & & & 0 \\ & w_2 & & \\ & & \ddots & \\ 0 & & & w_M \end{bmatrix} \quad (10)$$

Here, $H_{DL}$ is a downlink channel matrix and can be expressed as follows.

$$H_{DL} = \begin{bmatrix} h_{m,n}^{(DL)} & h_{m,n}^{(DL)} & \cdots & h_{m,n}^{(DL)} \\ h_{m,n}^{(DL)} & h_{m,n}^{(DL)} & \cdots & h_{m,n}^{(DL)} \\ \vdots & & & \vdots \\ h_{m,n}^{(DL)} & h_{m,n}^{(DL)} & \cdots & h_{m,n}^{(DL)} \end{bmatrix}$$

$H_{UL}$ is an uplink channel matrix and can be expressed as follows.

$$H_{UL} = \begin{bmatrix} h_{m,n}^{(UL)} & h_{m,n}^{(UL)} & \cdots & h_{m,n}^{(UL)} \\ h_{m,n}^{(UL)} & h_{m,n}^{(UL)} & \cdots & h_{m,n}^{(UL)} \\ \vdots & & & \vdots \\ h_{m,n}^{(UL)} & h_{m,n}^{(UL)} & \cdots & h_{m,n}^{(UL)} \end{bmatrix}$$

Thus, equation (10) can be rewritten as in the following equation (11).

$$H_{DL} = \begin{bmatrix} v_1 & & & 0 \\ & v_2 & & \\ & & \ddots & \\ 0 & & & v_M \end{bmatrix} \begin{bmatrix} h_{m,n}^{(UL)} & h_{m,n}^{(UL)} & \cdots & h_{m,n}^{(UL)} \\ h_{m,n}^{(UL)} & h_{m,n}^{(UL)} & \cdots & h_{m,n}^{(UL)} \\ \vdots & & & \vdots \\ h_{m,n}^{(UL)} & h_{m,n}^{(UL)} & \cdots & h_{m,n}^{(UL)} \end{bmatrix} \begin{bmatrix} w_1 & & & 0 \\ & w_2 & & \\ & & \ddots & \\ 0 & & & w_M \end{bmatrix} \quad (11)$$

$w_n$ in equations (10) and (11) is a parameter for the radio base station 10 and is expressed by $w_n = T_{eNB,n}/R_{eNB,n}$, and $v_n$ is a parameter for the user equipment 100 and is expressed by $v_m = R_{UE,m}/T_{UE,m}$.

When antenna calibration described in Non-Patent Document 1 is carried out, equations (7) and (8) are satisfied. Equation (8) can be rewritten as equation (12), and equation (7) can be rewritten as equation (13).

$$\alpha_1 = \alpha_2 = \ldots = \alpha_M \quad (12)$$

$$\beta_1 = \beta_2 = \ldots = \beta_N \quad (13)$$

Here, $\alpha_n$ is a parameter for the radio base station 10 that has been calibrated with a calibration coefficient $c_{eNB,n}$, and $\beta_m$ is a parameter for the user equipment 100 that has been calibrated with a calibration coefficient $c_{UE,m} \cdot \alpha_n$ and $\beta_m$ are expressed as follows.

$$\alpha_n = \frac{c_{eNB,n} \cdot T_{eNB,n}}{R_{eNB,n}}$$
$$= c_{eNB,n} \cdot w_n$$

$$\beta_n = \frac{c_{UE,m} \cdot T_{UE,m}}{R_{UE,m}}$$
$$= c_{UE,m} \cdot v_m$$

When such antenna calibration is carried out, the relationship between the uplink channel matrix and the downlink channel matrix can be expressed by the following equation (14).

$$H_{DL} = \begin{bmatrix} \beta_1 & & & 0 \\ & \beta_2 & & \\ & & \ddots & \\ 0 & & & \beta_M \end{bmatrix} H_{UL} \begin{bmatrix} \alpha_1 & & & 0 \\ & \alpha_2 & & \\ & & \ddots & \\ 0 & & & \alpha_N \end{bmatrix} \quad (14)$$

Equation (14) can be rewritten as equation (15) from equations (12) and (13).

$$H_{DL} = \alpha_1 \cdot \beta_1 I H_{UL} I \quad (15)$$
$$= \alpha_1 \cdot \beta_1 H_{UL}$$

It can be understood from equation (15) that if the calibrated parameters $\alpha_1$ and $\beta_1$, or calibration coefficients $c_{eNB,n}$ and $c_{UE,m}$, are known, the downlink channel matrix $H_{DL}$ can be estimated from the uplink channel matrix $H_{UL}$. Parameters for downlink transmission, such as a downlink transmitting precoding matrix, can thus be determined appropriately based on the uplink channel matrix.

Calibration coefficients $c_{eNB,n}$ and $c_{UE,m}$ can be calculated from downlink channel information measured in the user equipment 100 and uplink channel information measured in the radio base station 10. However, this calculation method cannot be performed when there is no user equipment 100 in a cell area of the radio base station 10. Furthermore, it will be a waste of time resources, and processing loads on the user equipment 100 will be great, if the user equipment 100 is to receive downlink pilot signals dedicated for calculating calibration coefficients and to report the calculation results to the radio base station 10. The processing loads on the user equipment 100 will also be great if the user equipment 100 is to transmit uplink pilot signals dedicated for calculating calibration coefficients.

Recently, a transmission scheme of Massive MIMO is being studied (e.g., Patent Document 1 and Non-Patent Document 3). In Massive MIMO, it is possible to perform advanced beamforming that uses a large number (e.g., 100 or more) of transmission antenna elements (e.g., 100 or more elements). Beamforming is a technique for adjusting the phase and amplitude of electric signals by weighting (applying weighting coefficients to) the electric signals supplied to transmission antenna elements in order to control the directions and shapes of radio wave beams emitted from the transmission antenna elements. Beamforming involves precoding. Massive MIMO is mainly used in radio base stations.

In Massive MIMO, a large number of transmission antenna elements are used, and consequently it takes time and effort to calibrate antennas. It can be thought that when the calibration coefficients $c_{eNB,n}$ and $c_{UE,m}$ are calculated from downlink channel information measured in the user equipment 100 and uplink channel information measured in the radio base station 10, the stated processing loads on user equipment 100 will be great and the amount of downlink channel information reported from the user equipment 100 will be massive.

In view of such circumstances, it is conceivable that a radio base station will perform self-calibration, which is antenna calibration performed locally in the radio base station. Self-calibration utilizes channel reciprocity among antenna elements of a radio base station. In self-calibration, some of the transceiving antenna elements of a radio base station receive pilot signals (pilot signals dedicated for self-calibration) that have been transmitted from other transceiving antenna elements of the radio base station, and the radio base station calculates calibration coefficients from channel state information. Therefore, there will be no processing loads on the user equipment to calculate the calibration coefficients, and a traffic will be unnecessary for reporting downlink channel state information for calculating the calibration coefficients. Furthermore, it is possible to calculate calibration coefficients even when there is no user equipment 100 in the cell area of the radio base station 10.

In self-calibration, a calibration coefficient $c_{eNB,n}$ is determined so as to satisfy equation (8). As described above, equation (8) can be rewritten as equation (12). Accordingly, the relationship between the uplink channel matrix and the downlink channel matrix can be expressed by the following equation (16).

$$H_{DL} = \begin{bmatrix} \beta_1 & & & 0 \\ & \beta_2 & & \\ & & \ddots & \\ 0 & & & \beta_M \end{bmatrix} H_{UL} \begin{bmatrix} \alpha_1 & & & 0 \\ & \alpha_2 & & \\ & & \ddots & \\ 0 & & & \alpha_1 \end{bmatrix} \quad (16)$$

$$= \alpha_1 \begin{bmatrix} \beta_1 & & & 0 \\ & \beta_2 & & \\ & & \ddots & \\ 0 & & & \beta_M \end{bmatrix} H_{UL}$$

It can be understood from equation (16) that, when calibrated parameters $\alpha_1$ and $\beta_1$ to $\beta_M$ are known or a calibration coefficient $c_{eNB,n}$ and calibrated parameters $\beta_1$ to $\beta_M$ are known, the downlink channel matrix $H_{DL}$ can be estimated from the uplink channel matrix $H_{UL}$. Consequently, parameters for downlink transmission, such as a downlink transmitting precoding matrix, can be appropriately determined based on the uplink channel matrix.

A method of self-calibration will be described in detail with reference to FIGS. 2 and 3. First, the radio base station 10 transmits pilot signals from a single reference antenna element (Step S1). The reference antenna element may be any one of the transceiving antenna elements $11_1$ to $11_N$. For example, the reference antenna element may be transceiving antenna element $11_1$. During the time period in which the reference antenna element transmits pilot signals, the radio base station 10 directs other antenna elements not to transmit pilot signals.

The radio base station 10 performs channel estimation based on pilot signals that have been transmitted from the reference antenna element and are then received by calibration target antenna elements (all of the transceiving antenna elements $11_1$ to $11_N$ except for the reference antenna element; for example, transceiving antenna elements $11_2$ to $11_N$) (Step S2). When the reference antenna element is the transceiving antenna element $11_1$, the radio base station 10 estimates, specifically, effective channel coefficients $h_{1,2}$ to $h_{1,N}$ in Step S2. The first argument in the subscript indicates a number for the antenna element that has transmitted a pilot signal, and the last argument in the subscript indicates a number for the antenna element that has received the pilot signal.

Next, the radio base station 10 transmits pilot signals from one of the calibration target antenna elements (Step S3). Here, the calibration target antenna element that transmits pilot signals may be any one of the calibration target antenna elements. During the time period in which this calibration target antenna element transmits pilot signals, the radio base station 10 directs other antenna elements not to transmit pilot signals.

The radio base station 10 performs channel estimation based on the pilot signals transmitted from this calibration target antenna element and then received by the reference antenna element (Step S4). When the reference antenna element is the transceiving antenna element $11_1$, the radio base station 10 estimates, specifically, an effective channel coefficient $h_{n,1}$ in Step S4. The first argument in the subscript indicates a number for the antenna element that has transmitted a pilot signal, and the last argument in the subscript indicates a number for the antenna element that has received the pilot signal.

The radio base station 10 determines whether there is any calibration target antenna element that has not transmitted pilot signals (Step S5). When the determination result is positive, Steps S3 and S4 are carried out. When all calibration target antenna elements have transmitted pilot signals, the radio base station 10 calculates calibration coefficients from the estimated effective channel coefficients (Step S6).

The effective channel coefficient $h_{m,n}$ from an antenna element $11_m$ to an antenna element $11_n$ can be expressed by the following equation (17).

$$h_{m,n} = T_{eNB,m} \blacksquare g_{m,n} \blacksquare R_{eNB,n} \quad (17)$$

The effective channel coefficient $h_{n,m}$ from an antenna element $11_n$ to an antenna element $11_m$ can be expressed by the following equation (18).

$$h_{n,m} = T_{eNB,n} \blacksquare g_{n,m} \blacksquare R_{eNB,m} \quad (18)$$

Here, a downlink channel gain $g_{m,n}$ on the air from an antenna element $11_m$ to an antenna element $11_n$ is equal to a downlink channel gain $g_{n,m}$ on the air from an antenna element $11_n$ to an antenna element $11_m$. Accordingly, from equations (17) and (18), the relationship between the effective channel coefficients $h_{m,n}$ and $h_{n,m}$ can be expressed by the following equation (19).

$$\frac{h_{m,n}}{h_{n,m}} = \frac{T_{eNB,m} \cdot R_{eNB,n}}{T_{eNB,n} \cdot R_{eNB,m}} \quad (19)$$

In self-calibration, calibration coefficients $c_{eNB,n}$ are determined so as to satisfy equation (8). The calibration coefficient of the reference antenna element is configured to 1. For example, when the antenna element $11_1$ is a reference antenna element, $c_{eNB,1} = 1$. In this case, from equation (8), the calibration coefficient $c_{eNB,n}$ can be expressed by the following equation (20).

$$c_{eNB,n} = \frac{T_{eNB,1} \cdot R_{eNB,n}}{R_{eNB,1} \cdot T_{eNB,n}} \quad (20)$$

From equations (19) and (20), the calibration coefficient $c_{eNB,n}$ can be expressed by the following equation (21).

$$c_{eNB,n} = \frac{h_{1,n}}{h_{n,1}} \quad (21)$$

Therefore, in Step S6, the radio base station 10 calculates, for antenna elements $11_2$ to $11_N$ other than the reference antenna element $11_1$, calibration coefficients $c_{eNB,2}$ to $c_{eNB,N}$ based on the effective channel coefficients (e.g., $h_{1,2}$ to $h_{1,N}$) estimated in Step S2 and the effective channel coefficients (e.g., $h_{2,1}$ to $h_{N,1}$) estimated in Step S4.

As can be understood from the above description, in self-calibration, during the time period in which one calibration target antenna element transmits a pilot signal, the radio base station 10 directs other antenna elements not to transmit pilot signals. Consequently, N number of periods is required. Here, N is the number of transceiving antenna elements $11_1$ to $11_N$.

RELATED ART DOCUMENTS

Patent Document

Patent Document 1: Japanese Patent Application Laid-Open Publication No. 2013-232741

Non-Patent Documents

Non-Patent Document 1: Mitsubishi Electric, "Discussion on antenna calibration in TDD", 3GPP TSG RAN WG1 #55bis meeting, R1-090043, 3GPP, January, 2009
Non-Patent Document 2: Qualcomm Europe, "Calibration Procedures for TDD Beamforming", 3GPP TSG RAN1 #51bis, R1-080494, 3GPP, January, 2008
Non-Patent Document 3: T. Obara, S. Suyama, J. Shen, and Y. Okumura, "Joint fixed beamforming and eigenmode precoding for super high bit rate Massive MIMO systems using higher frequency bands," IEEE PIMRC, September, 2014.

SUMMARY OF THE INVENTION

Problem to be Solved by the Invention

In Massive MIMO, a radio wave is emitted from a large number of transceiving antenna elements. There is a need for a technique for easily calculating calibration coefficients for these large number of transceiving antenna elements.

In view of these circumstances, the present invention provides a radio base station that can easily calculate calibration coefficients for transceiving antenna elements using self-calibration for antenna calibration in a TDD mobile communication system.

Means of Solving the Problems

A radio base station according to one aspect of the present invention includes: a digital signal processor configured to perform digital precoding by applying a precoding matrix to a downlink signal; an analog beamformer configured to perform analog beamforming that applies a change in a phase and amplitude to the downlink signal that has undergone the digital precoding, the change corresponding to a beamforming matrix; transceiving antenna elements configured to transmit by radio the downlink signal that has undergone the analog beamforming and to receive by radio, from user equipment, an uplink signal in the same frequency band as a frequency band used for transmitting the downlink signal; and an uplink signal processor configured to process the uplink signal received by the transceiving antenna elements. The transceiving antenna elements are classified into antenna groups, each antenna group including some of the transceiving antenna elements. The analog beamformer includes branches, each branch corresponding to a corresponding one of the antenna groups, each branch including sub-branches, each sub-branch including a variable phase shifter and an amplitude adjuster to perform the analog beamforming, each sub-branch being connected to one of the transceiving antenna elements. The uplink signal processor includes branches, each branch corresponding to a corresponding one of the antenna groups, each branch including sub-branches, each sub-branch including a receiving amplifier and being connected to one of the transceiving antenna elements. The radio base station further includes: an antenna transmission controller configured to control transmission of pilot signals from the transceiving antenna elements; a channel estimator configured to estimate channel coefficients based on pilot signals received by the transceiving antenna elements; and a calibration coefficient calculator configured to, when downlink transmission is performed, calculate calibration coefficients to be applied to a downlink radio signal to be transmitted from the transceiving antenna elements based on channel coefficients estimated from uplink radio signals received by the transceiving antenna elements. In a first time period, the antenna transmission controller causes transceiving antenna elements alone that are among the transceiving antenna elements and belong to a reference antenna group to transmit pilot signals, the reference antenna group being one of the antenna groups, and the channel estimator estimates channel coefficients based on the pilot signals received by transceiving antenna elements, among the transceiving antenna elements, that belong to the antenna groups except for the reference antenna group. In a second time period different from the first time period, the antenna transmission controller causes the transceiving antenna elements alone that belong to the antenna groups except for the reference antenna group to transmit pilot signals, and the channel estimator estimates channel coefficients based on the pilot signals received by the transceiving antenna elements that belong to the reference antenna group. The calibration coefficient calculator calculates the calibration coefficients from the channel coefficients estimated in the first time period and the channel coefficients estimated in the second time period. After pilot signals are transmitted from transceiving antenna elements, these transceiving antenna elements being among the transceiving antenna elements and belonging to an antenna group that is one of the antenna groups, and are received by other transceiving antenna elements belonging to another antenna group among the antenna groups, it is identifiable as to which of the transceiving antenna elements transmitted each pilot signal. After pilot signals are received by transceiving antenna elements, these transceiving antenna elements being among the transceiving antenna elements and belonging to an antenna group that is one of the antenna groups, it is identifiable as to which of the transceiving antenna elements received each pilot signal.

A radio base station according to another aspect of the present invention includes: a digital signal processor configured to perform digital precoding by applying a precoding matrix to a downlink signal; an analog beamformer configured to perform analog beamforming that applies a change in a phase and amplitude to the downlink signal that has undergone the digital precoding, the change corresponding to a beamforming matrix; transceiving antenna elements configured to transmit by radio the downlink signal that has undergone the analog beamforming and to receive by radio, from user equipment, an uplink signal in the same frequency band as a frequency band used for transmitting the downlink signal; an uplink signal processor configured to process the uplink signal received by the transceiving antenna elements, and at least one antenna calibration reference transceiving antenna element configured to transmit and receive pilot signals for antenna calibration. The transceiving antenna elements are classified into antenna groups, each antenna group including some of the transceiving antenna elements. The analog beamformer includes branches, each branch corresponding to a corresponding one of the antenna groups, each branch including sub-branches, each sub-branch including a variable phase shifter and an amplitude adjuster to perform the analog beamforming, each sub-branch being connected to one of the transceiving antenna elements. The uplink signal processor includes branches, each branch corresponding to a corresponding one of the antenna groups, each branch including sub-branches, each sub-branch including a receiving amplifier and being connected to one of the transceiving antenna elements. The radio base station further includes: an antenna transmission controller configured to control transmission of pilot signals from the at least one antenna calibration reference transceiving antenna element and from the transceiving antenna elements; a channel estimator configured to estimate channel coefficients based on pilot signals received by the at least one antenna calibration reference transceiving antenna element and by the transceiving antenna elements; and a calibration coefficient calculator configured to, when downlink transmission is performed, calculate calibration coefficients to be applied to a downlink radio signal to be transmitted from the transceiving antenna elements based on channel coefficients estimated from uplink radio signals received by the transceiving antenna elements. In a first time period, the antenna transmission controller causes the at least one antenna calibration reference transceiving antenna element alone to transmit pilot signals and the channel estimator estimates channel coefficients based on the pilot signals received by the transceiving antenna elements. In a second time period different from the first time period, the antenna transmission controller causes the transceiving antenna elements alone to transmit pilot signals, and the channel estimator estimates channel coefficients based on the pilot signals received by the at least one antenna calibration reference transceiving antenna element. The calibration coefficient calculator calculates the calibration coefficients from the channel coefficients estimated in the first time period and the channel coefficients estimated in the second time period. After pilot signals are transmitted from transceiving antenna elements, these transceiving antenna elements being among the transceiving antenna elements and belonging to an antenna group that is one of the antenna groups, and are received by the at least one antenna calibration reference transceiving antenna element, it is identifiable as to which of the transceiving antenna elements transmitted each pilot signal. After pilot signals are received by transceiving antenna elements, these transceiving antenna elements being among the transceiving antenna elements and belonging to an antenna group that is one of the antenna groups, it is identifiable as to which of the transceiving antenna elements received each pilot signal.

Effect of the Invention

According to the present invention, after pilot signals are transmitted from transceiving antenna elements that belong to an antenna group and are received by transceiving antenna elements that belong to another antenna group, it is possible to identify which transceiving antenna element transmitted each pilot signal. Moreover, after pilot signals are received by transceiving antenna elements that belong to an antenna group, it is possible to identify which transceiving antenna received each pilot signal. Accordingly, it is possible to easily calculate calibration coefficients for transceiving antenna elements using self-calibration for antenna calibration in a TDD mobile communication system.

MODES FOR CARRYING OUT THE INVENTION

Hereafter, various embodiments according to the present invention will be described with reference to the attached drawings.

Massive MIMO

Figure 4:
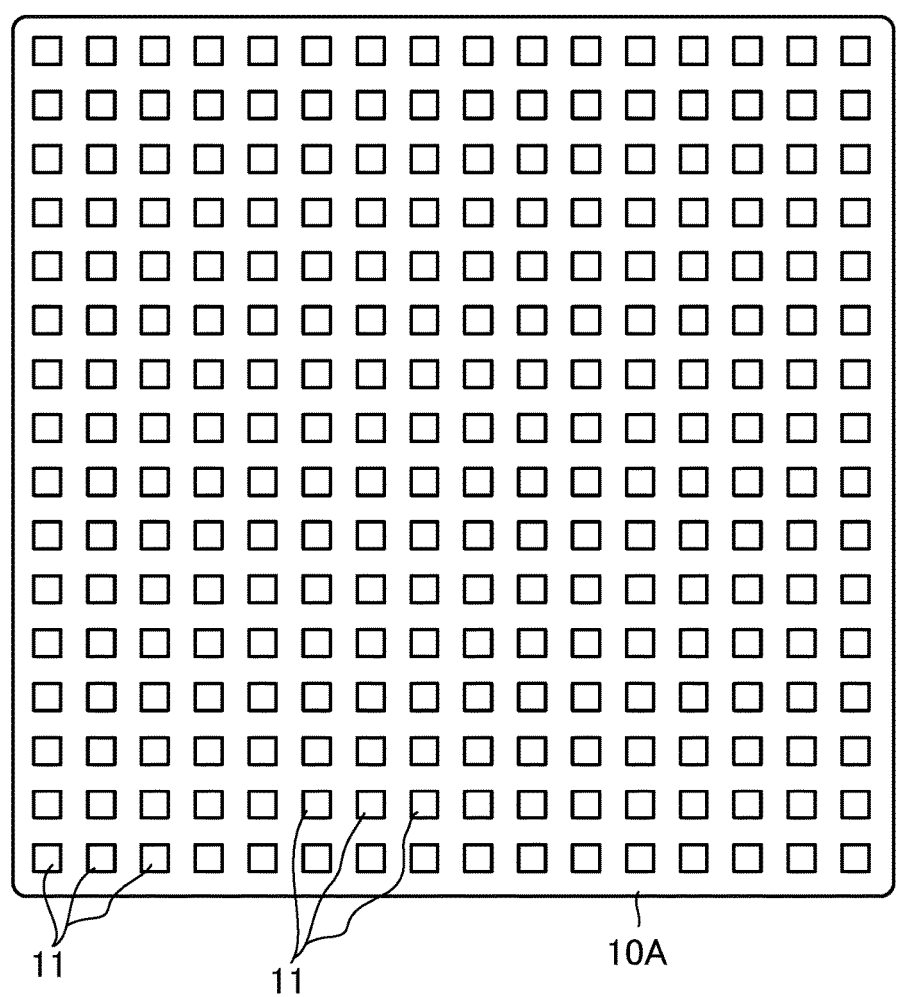
FIG. 4 shows a front view illustrating an antenna set for Massive MIMO used in various embodiments of the present invention.

A radio base station implementing Massive MIMO includes an antenna set 10A exemplified in FIG. 4. The illustrated antenna set 10A includes 256 pieces of transceiving antenna elements 11 in 16 rows and 16 columns. The number of antenna elements is not limited to this example.

Figure 5:
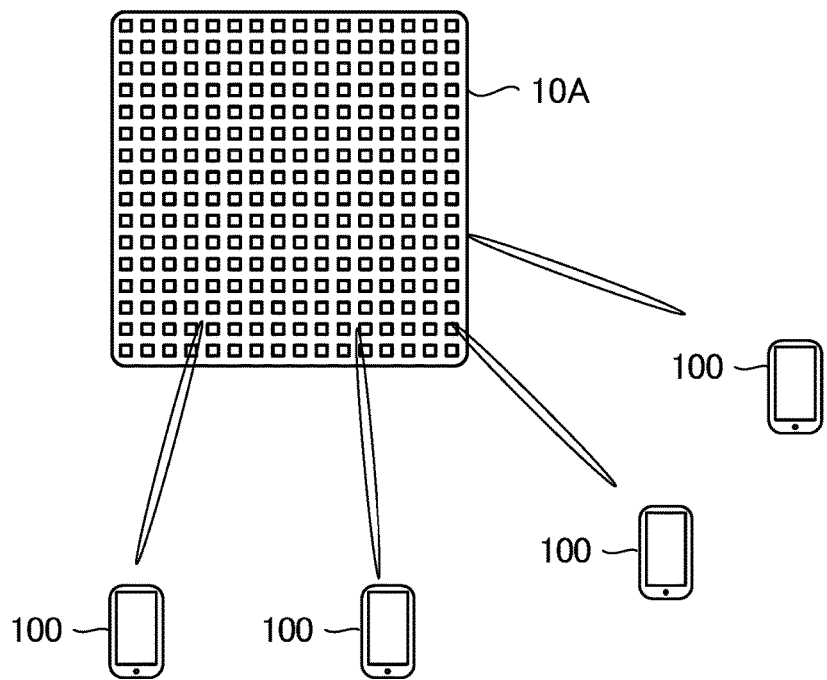
FIG. 5 shows a diagram schematically illustrating communication with user equipment using Massive MIMO.

In Massive MIMO, high radio communication speed (data rate) is achieved by multiplexing of multiple streams. In addition, since the degree of freedom in antenna control for performing beamforming increases, it is possible to achieve more advanced beamforming than by conventional methods. For example, as shown in FIG. 5, it is possible to form, according to each of a large number of user equipment 100, a transmitting beam toward the user equipment 100, the transmitting beam carrying downlink data signals directed to the user equipment 100.

Figure 6:
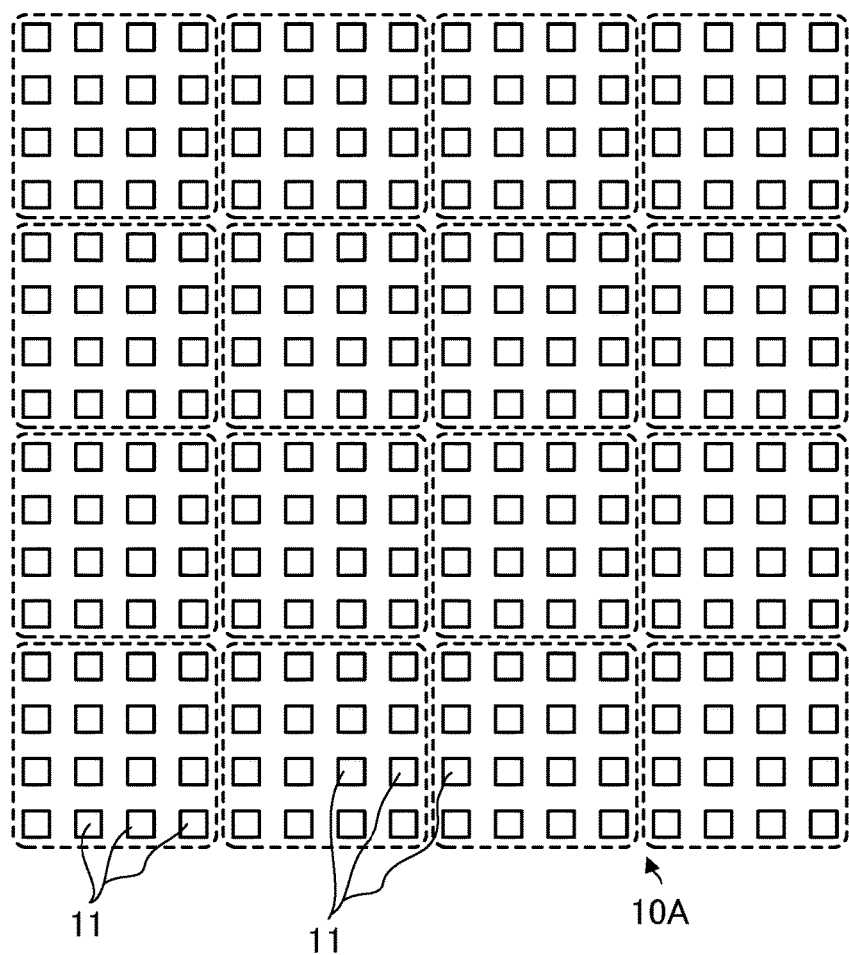
FIG. 6 shows a diagram illustrating an example grouping of antenna elements used in various embodiments of the present invention.
Figure 7:
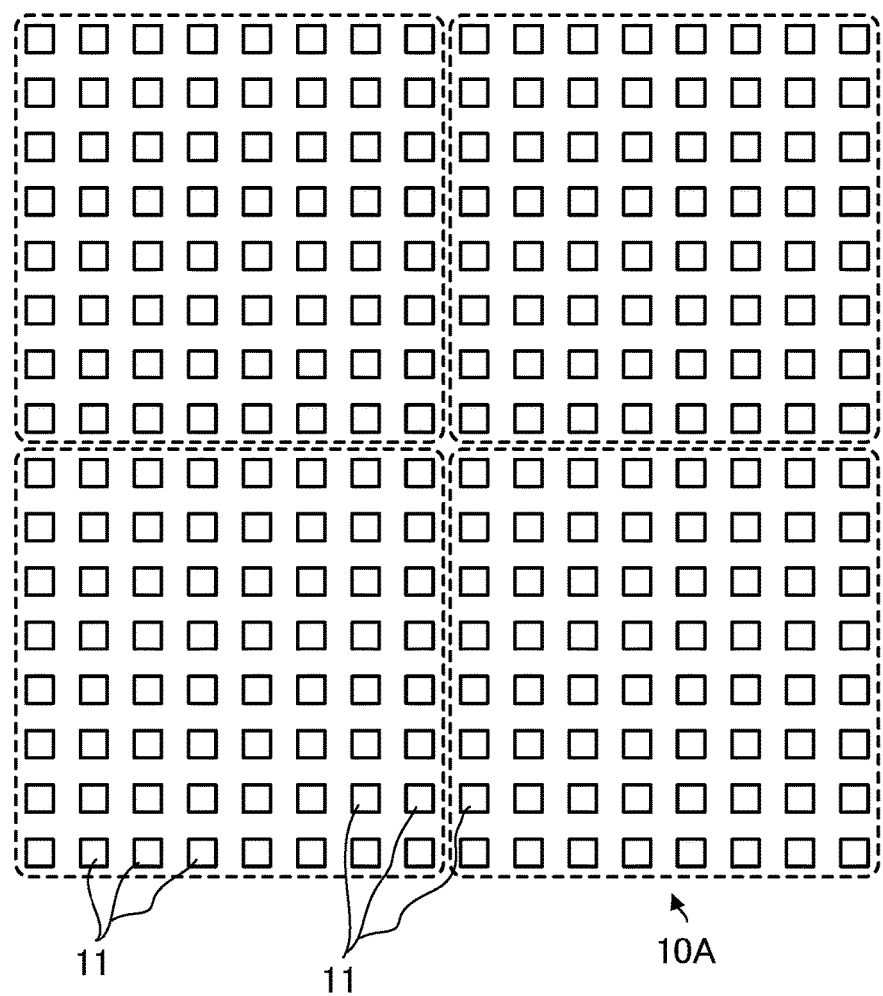
FIG. 7 shows a diagram illustrating another example grouping of antenna elements used in various embodiments of the present invention.

In various embodiments according to the present invention, these transceiving antenna elements 11 are classified into antenna groups for convenience in controlling each transceiving antenna element 11. Each antenna group includes transceiving antenna elements 11 that are close to each other. FIG. 6 shows an example in which the 256 transceiving antenna elements are classified into 16 antenna groups. FIG. 7 shows an example in which the 256 transceiving antenna elements are classified into 4 antenna groups. Dotted lines in the figures indicate the extents of the groups. In FIG. 6, each antenna group has 16 transceiving antenna elements 11, and in FIG. 7, each antenna group has 64 transceiving antenna elements 11. It is noted that the grouping of antennas is not limited to these illustrated examples.

Hybrid Beamforming

In various embodiments of the present invention, a radio base station performs hybrid beamforming. Hybrid beamforming is a combination technique of analog transmission beamforming and digital precoding; hybrid beamforming is able to combine rough directional control of beams by analog transmission beamforming and high-precision directional control by digital precoding. Additionally, hybrid beamforming can reduce the processing loads of digital precoding by analog transmission beamforming. In hybrid beamforming, digital precoding is first carried out, and then analog transmission beamforming is carried out.

Figure 8:
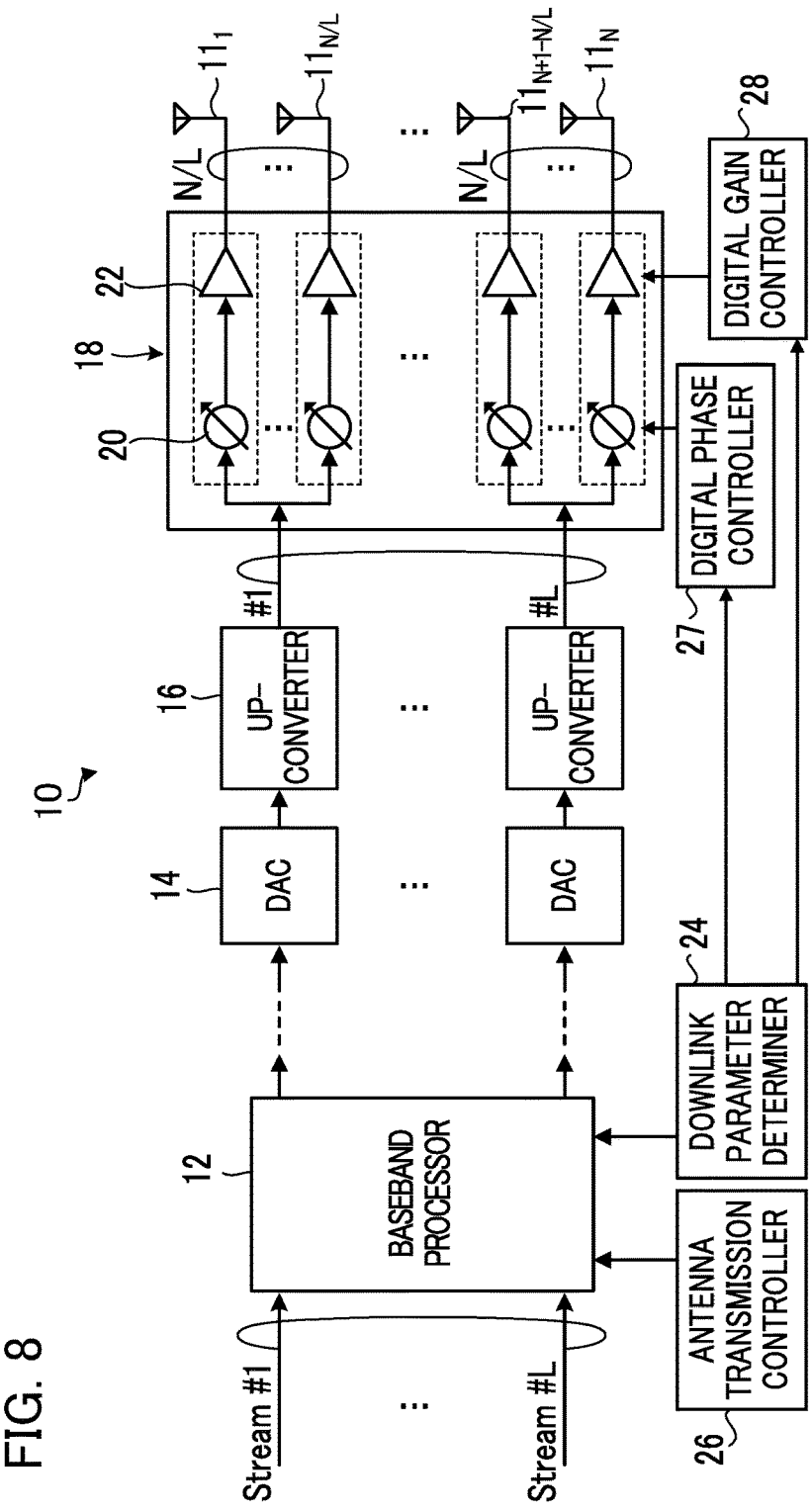
FIG. 8 shows a block diagram illustrating downlink-transmission-related portions of a radio base station that performs hybrid beamforming, the radio base station serving as a basis for embodiments of the present invention.

FIG. 8 shows a block diagram of a radio base station 10 that performs hybrid beamforming, the radio base station 10 serving as a basis for the embodiments of the present invention. FIG. 8 shows only portions relevant to downlink transmission.

L-sequence digital baseband signals, corresponding to L streams to be transmitted, are supplied to a baseband processor (digital signal processor) 12. The baseband processor 12 applies a precoding matrix to the L-sequence downlink signals to perform digital precoding. In other words, the baseband processor 12 has a digital precoder function. The baseband processor 12 can be achieved by digital signal processing carried out by, for example, a Digital Signal Processor (DSP).

The L-sequence signals output from the baseband processor 12 are converted into analog signals by digital-to-analog converters (DAC) 14 and are up-converted by up-converters (frequency converters) 16. The L-sequence signals up-converted by the L number of up-converters 16 are supplied to an analog beamformer 18. The analog beamformer 18 applies a transmission beamforming matrix onto the L-sequence downlink signals to generate N-sequence signals. N is the number of transceiving antenna elements $11_1$ to $11_N$.

Each of the N-sequence downlink signals that have undergone analog beamforming and have been output from the analog beamformer 18 is transmitted by radio by a corresponding one of the N number of transceiving antenna elements 11. Here, a filter (not illustrated) may be provided in the analog beamformer 18, or between the analog beamformer 18 and the transceiving antenna elements 11. The up-converters 16 may be provided in the analog beamformer 18, or between the analog beamformer 18 and the transceiving antenna elements 11.

The analog beamformer 18 can be achieved by an analog circuit. The analog beamformer 18 has L branches. To the L branches, L-sequence downlink signals corresponding to L streams are supplied.

Each branch has N/L sub-branches, and each sub-branch includes a variable phase shifter 20 and a power amplifier (amplitude adjuster) 22 for performing analog transmission beamforming. In FIG. 8, each sub-branch is surrounded by one dotted-line rectangle. Each sub-branch is connected to one transceiving antenna element 11. Signals supplied to each sub-branch and to have their phases and amplitudes adjusted are supplied to the transceiving antenna element 11 corresponding to the sub-branch.

Accordingly, signals processed by each sub-branch are supplied to one transceiving antenna element 11, without being added to signals processed by other sub-branches. That is, a downlink signal supplied to a transceiving antenna element 11 is processed independently by a single sub-branch. This type of the analog beamformer 18 is called a sub-array type analog beamformer.

When a sub-array type analog beamformer 18 is used, transmission antenna elements #1 to #N transmit streams #1 to #L. The L branches, each having N/L sub-branches, are independent of each other, and one stream is transmitted by N/L number of transceiving antenna elements 11. For example, stream #1 is transmitted from the transceiving antenna elements $11_1$ to $11_{N/L}$, and stream #L is transmitted from the transceiving antenna elements $11_{N+1-N/L}$ to $11_N$.

As described above with reference to FIG. 6 and FIG. 7, the transceiving antenna elements 11 are classified into antenna groups, and each antenna group includes transceiving antenna elements 11. One antenna group corresponds to one branch. Therefore, there is L number of antenna groups, and multiple (N/L number of) transceiving antenna elements 11 belonging to one antenna group transmit one stream.

The radio base station 10 further includes a downlink parameter determiner 24, an antenna transmission controller 26, a digital phase controller 27, and a digital gain controller 28. Similarly to the baseband processor 12, these elements are functional blocks that are achieved by the DSP executing a computer program stored in a storage unit (not illustrated) and functioning in accordance with the computer program.

The downlink parameter determiner 24 determines parameters (e.g., a downlink precoding matrix and a transmission beamforming matrix) for downlink transmission based on uplink channel state information. The precoding matrix determined in the downlink parameter determiner 24 is supplied to the baseband processor 12, and the baseband processor 12 performs digital precoding in accordance with the precoding matrix.

According to the transmission beamforming matrix determined in the downlink parameter determiner 24, the digital phase controller 27 controls the phase that is to be adjusted by each variable phase shifter 20 of the analog beamformer 18. Additionally, according to the transmission beamforming matrix, the digital gain controller 28 controls the gain set to each power amplifier 22 of the analog beamformer 18.

The antenna transmission controller 26 controls the transmission of pilot signals from transceiving antenna elements 11. The function of the antenna transmission controller 26 will be described in detail later.

Figure 9:
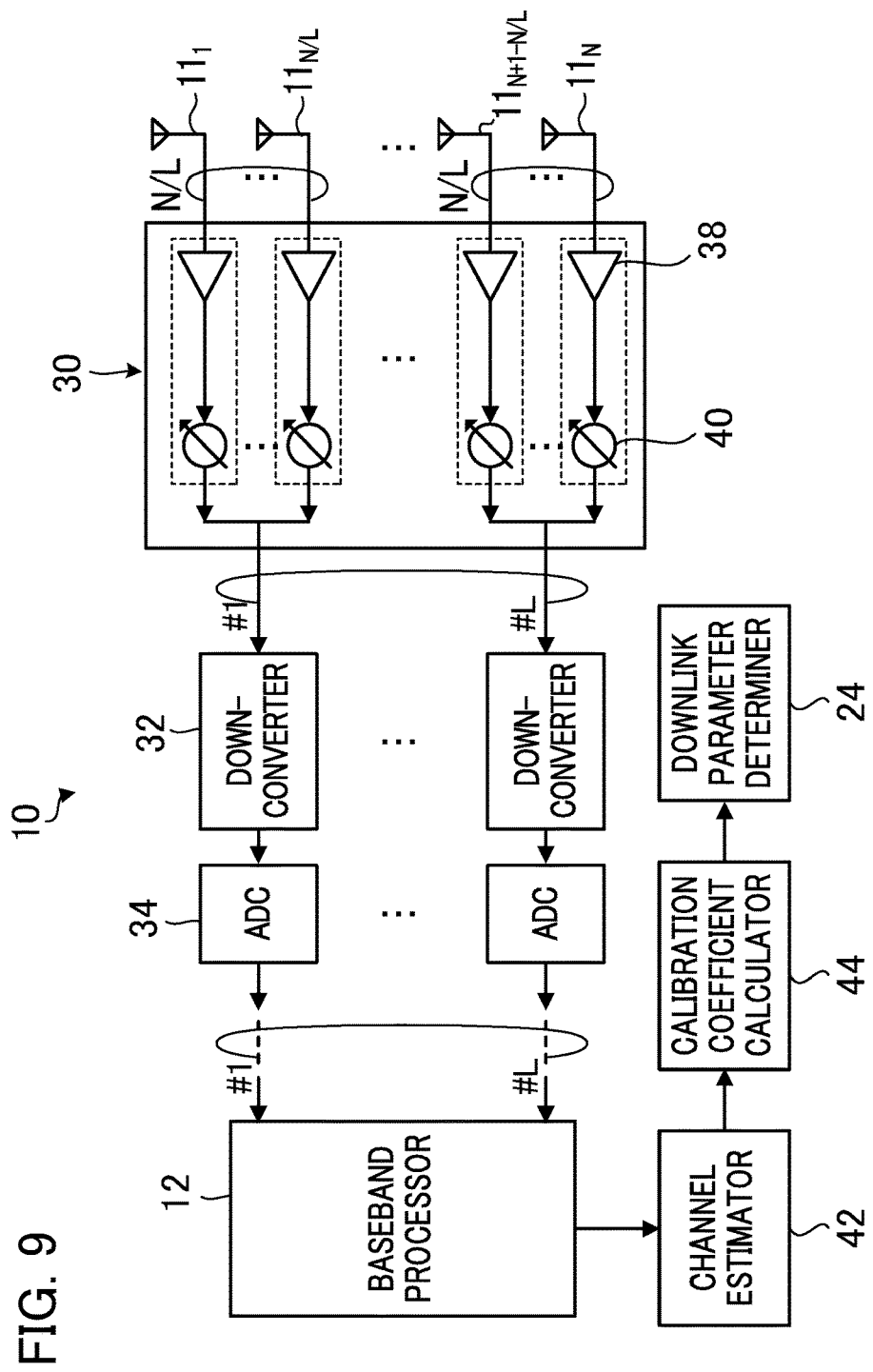
FIG. 9 shows a block diagram illustrating portions of the radio base station mainly relevant to uplink reception, the radio base station serving as a basis for embodiments of the present invention.

FIG. 9 shows a block diagram of the radio base station 10, which serves as a basis for embodiments of the present invention. FIG. 9 shows portions mainly relevant to the uplink reception. The radio base station 10 in reality includes components illustrated in FIG. 8 and components illustrated in FIG. 9.

Transceiving antenna elements $11_1$ to $11_N$ receive by radio uplink signals from user equipment. Mobile communication systems to which the embodiments are applied are TDD mobile communication systems. Accordingly, the transceiving antenna elements $11_1$ to $11_N$ receive by radio from the user equipment uplink signals in the same frequency band as the frequency band used for transmission of downlink signals.

The radio base station 10 includes an uplink signal processor 30 that processes uplink signals received by the transceiving antenna elements 11. The uplink signal processor 30 can be achieved by an analog circuit. The uplink signal processor 30 includes L branches, each branch corresponding to one of the L antenna groups and including N/L number of sub-branches. Each sub-branch includes a low-noise receiving amplifier 38 and a variable phase shifter 40. In FIG. 9, each sub-branch is surrounded by a dotted-line rectangle. Each sub-branch is connected to a single transceiving antenna element 11. Signals supplied from a transceiving antenna element 11 are supplied to the sub-branch corresponding to the transceiving antenna element 11, and their amplitudes and phases are respectively adjusted by the low-noise receiving amplifier (low noise amplifier, LNA) 38 and the variable phase shifter 40.

A signal processed in each sub-branch is added to signals processed in other sub-branches belonging to the same branch as the sub-branch. As a result, L-sequence signals are output from the uplink signal processor 30. The L-sequence signals are down-converted by down-converters (frequency converters) 32 and are converted into analog signals by analog-to-digital converters (ADC) 34, and then are supplied to the baseband processor 12. The down-converters 32 may be provided in the uplink signal processor 30, or between the uplink signal processor 30 and the transceiving antenna elements 11.

The radio base station 10 further includes a channel estimator 42 and a calibration coefficient calculator 44. Similarly to the baseband processor 12, the channel estimator 42 and the calibration coefficient calculator 44 are functional blocks achieved by the DSP executing computer programs stored in the storage unit (not illustrated) and functioning in accordance with the computer programs.

The channel estimator 42 estimates channel coefficients based on radio signals received by transceiving antenna elements 11. During the radio communication with the user equipment, the channel estimator 42 estimates uplink channel coefficients based on uplink radio signals that are transmitted from the user equipment and are received by transceiving antenna elements 11. In antenna calibration, the channel estimator 42 estimates channel coefficients for each combination of transceiving antenna elements based on radio pilot signals that are transmitted from transceiving antenna elements 11 and are received by transceiving antenna elements 11.

When the radio base station 10 performs downlink transmission, the calibration coefficient calculator 44 calculates calibration coefficients that are to be applied to a downlink radio signal to be transmitted from transceiving antenna elements 11 based on channel coefficients estimated from the uplink radio signals received by transceiving antenna elements 11. The calibration coefficient calculator 44 supplies the calibration coefficients to the downlink parameter determiner 24. The downlink parameter determiner 24 controls at least one of digital precoding or analog transmission beamforming based on the calibration coefficients. In this way, when the radio base station 10 performs downlink transmission, downlink radio signals transmitted from transceiving antenna elements 11 are calibrated based on channel coefficients estimated from uplink radio signals received by transceiving antenna elements 11. Functions of the channel estimator 42 and the calibration coefficient calculator 44 will be described in detail later.

Figure 10:
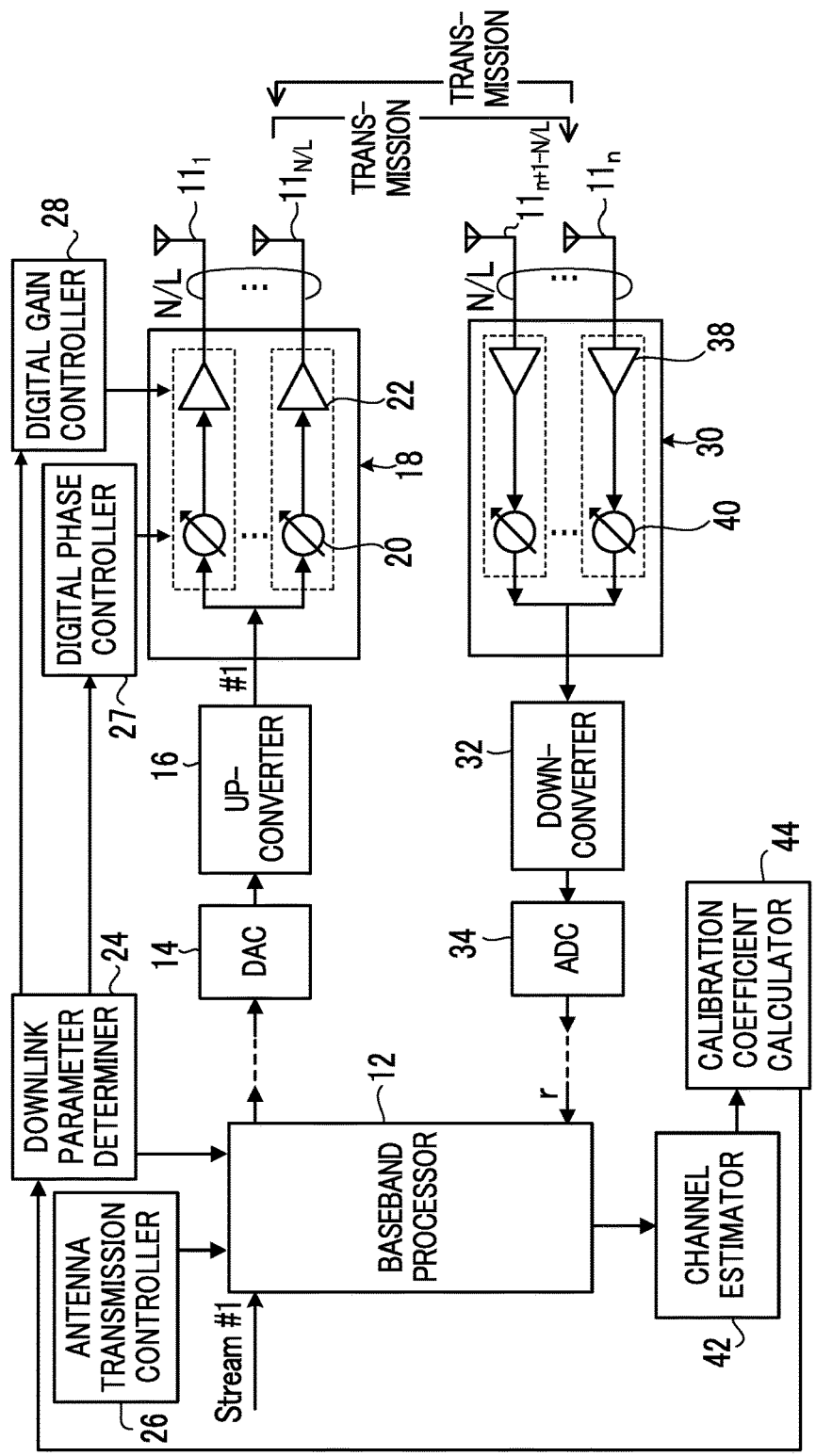
FIG. 10 shows a block diagram, for describing self-calibration, illustrating components of a radio base station related to radio transmission and radio reception.

FIG. 10 shows components of the radio base station 10 related to radio transmission and radio reception for the purposes of illustrating antenna calibration (self-calibration). FIG. 10 shows only one branch in the analog beamformer 18 (corresponding to one antenna group) and another branch in the uplink signal processor 30 (corresponding to another antenna group) for the purposes of illustration. However, in reality, the analog beamformer 18 includes L branches corresponding to L antenna groups, and the uplink signal processor 30 includes L branches corresponding to L antenna groups.

Figure 1:
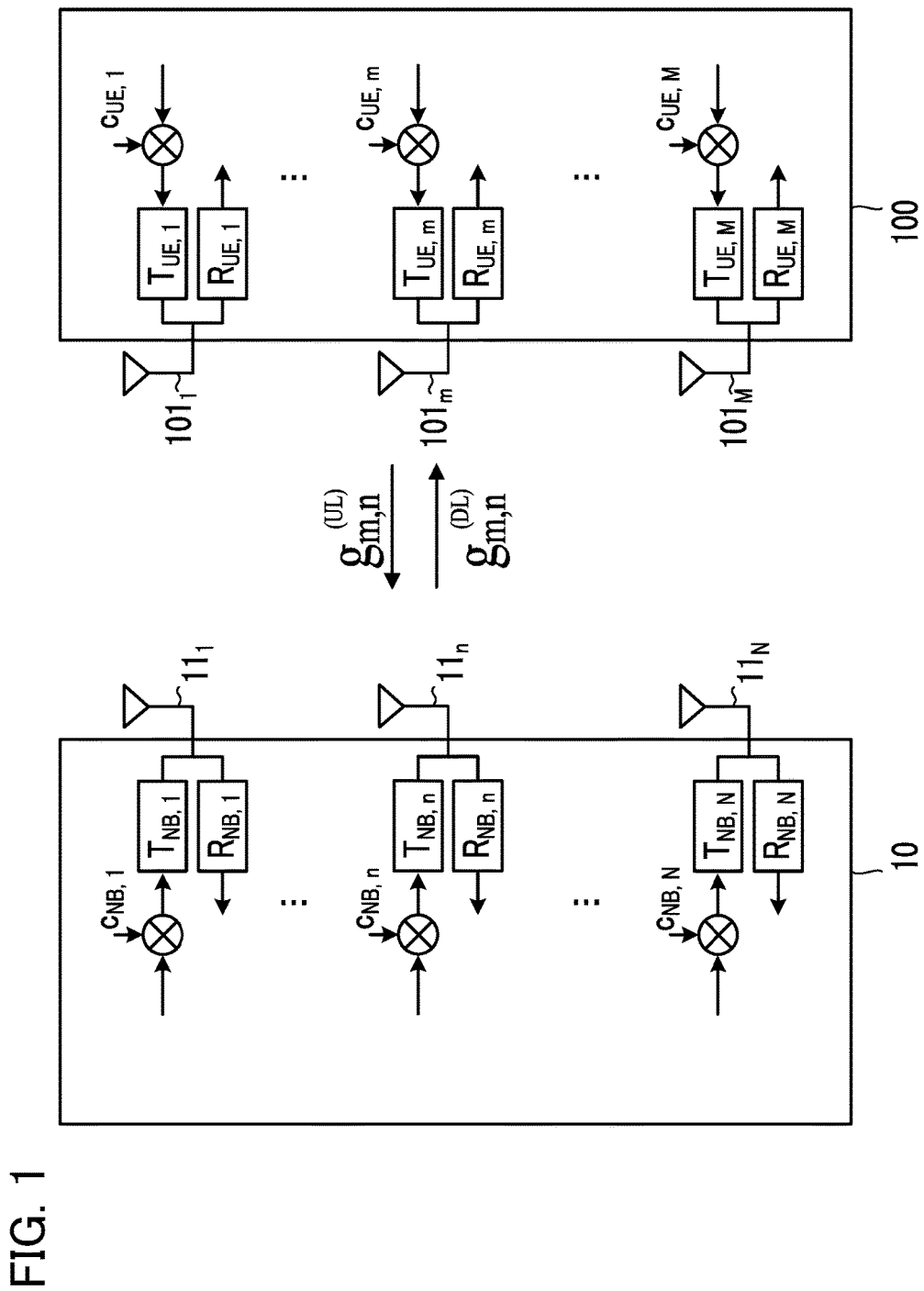
FIG. 1 shows a diagram illustrating conventional antenna calibration.
Figure 2:
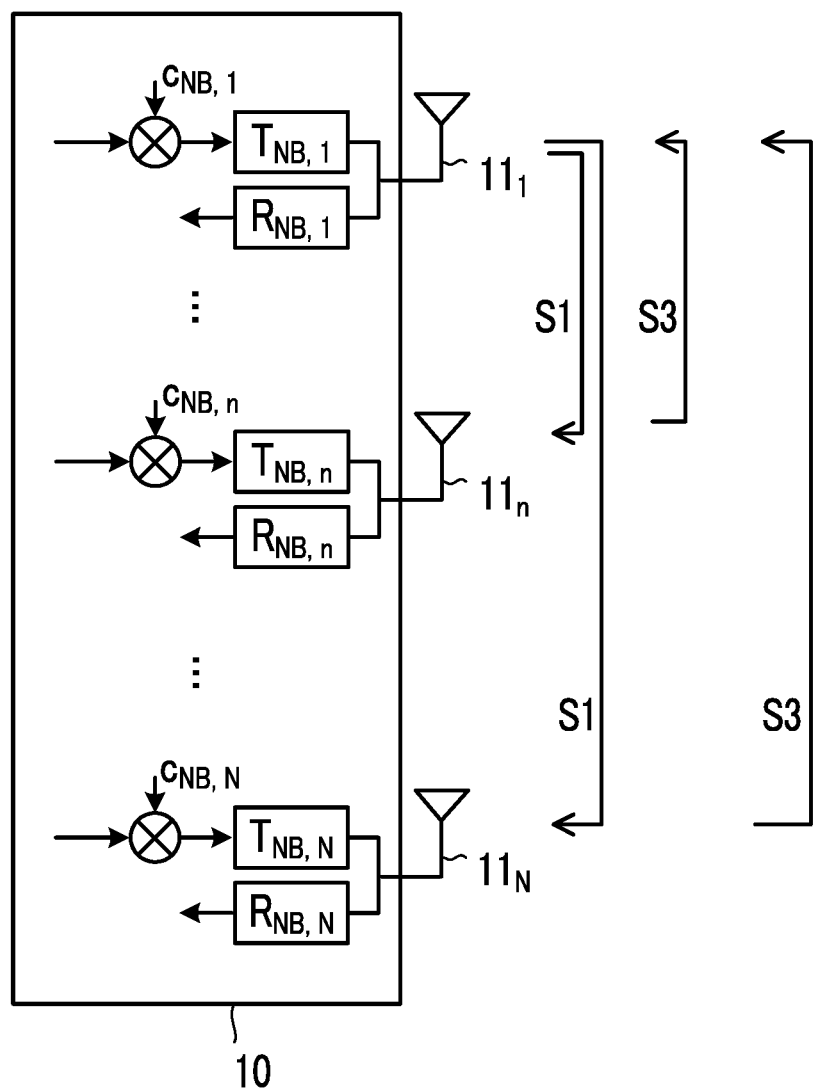
FIG. 2 shows a diagram illustrating conventional self-calibration.
Figure 3:
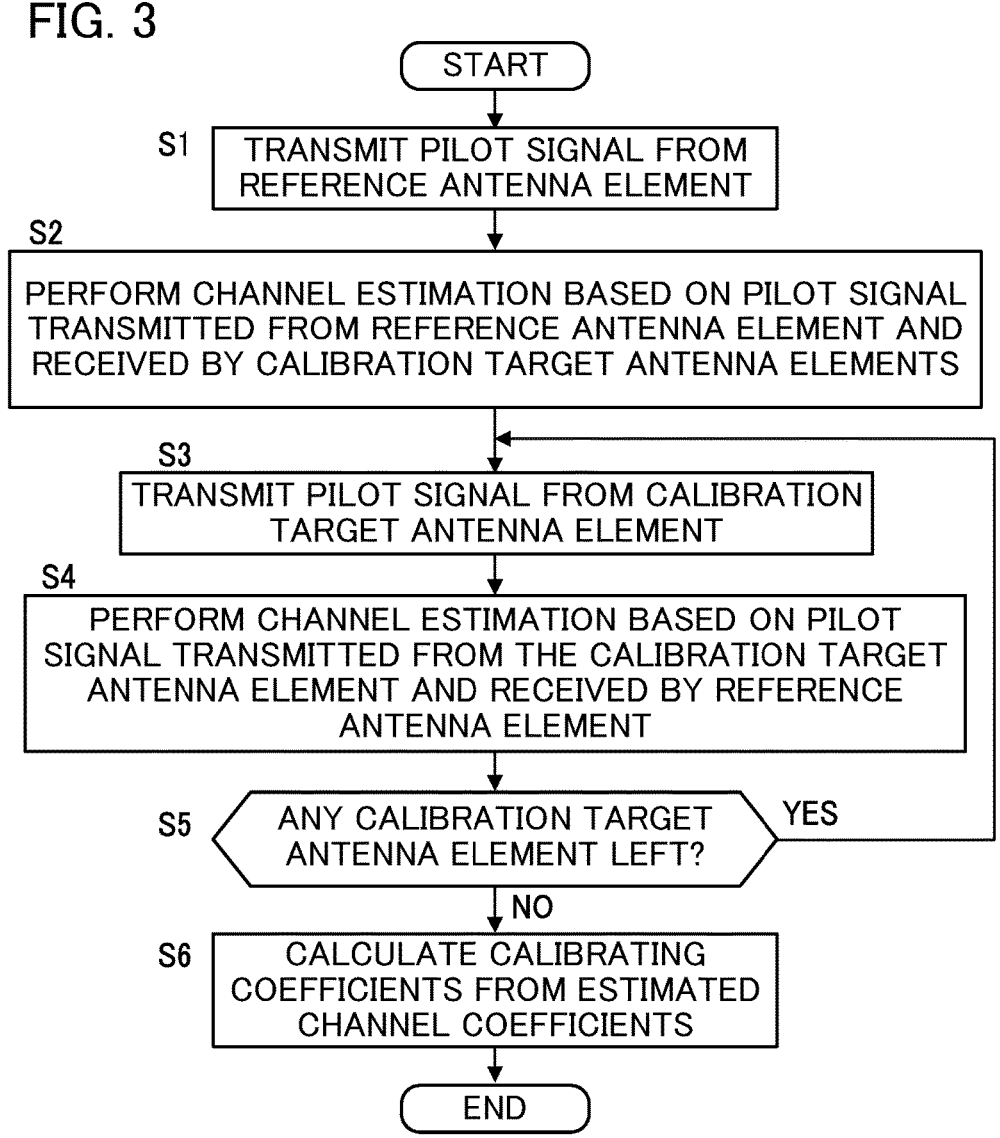
FIG. 3 shows a flowchart illustrating a conventional process for self-calibration.

Antenna calibration is performed in order to appropriately calibrate downlink signals based on uplink channel matrices by using channel reciprocity between the uplink and the downlink in TDD mobile communication systems. In self-calibration, when a radio signal is transmitted by transceiving antenna elements $11_1$ to $11_N$, calibration coefficients that calibrate a downlink transmission parameter are calculated based on channel coefficients estimated from pilot signals received by the transceiving antenna elements $11_1$ to $11_N$. As described above with reference to FIG. 2 and FIG. 3, when beamforming or precoding is not performed, a calibration coefficient may be calculated according to equation (21) for each of all calibration target antenna elements, the calibration target antenna elements being other than, and corresponding to, a reference antenna element.

When beamforming or precoding is performed, transceiving antenna elements 11 emit radio waves simultaneously. In view of this situation, in the example in FIG. 10, the radio base station 10 transmits radio pilot signals (pilot signals dedicated to self-calibration) from antenna elements belonging to a reference antenna group that includes transceiving antenna elements $11_1$ to $11_{N/L}$, for example. Then, the radio base station 10 estimates channel coefficients based on the pilot signals received by antenna elements belonging to other antenna groups other than the reference antenna group (calibration target antenna groups). The radio base station 10 then transmits radio pilot signals from antenna elements belonging to the calibration target antenna groups at different timings, and estimates channel coefficients based on the pilot signals received by antenna elements belonging to the reference antenna group. Then, the radio base station 10 calculates a calibration coefficient for each of all the antenna elements other than the reference antenna element.

In this specification, terms "reference antenna group" and "calibration target antenna group" are used for convenience. A reference antenna group indicates an antenna group that has a single reference antenna element that serves as a reference for antenna calibration and is not subjected to antenna calibration (wherein the calibration coefficient is configured to 1). Calibration target antenna groups indicate antenna groups other than the reference antenna group, and antenna calibration is performed on antenna elements belonging to the calibration target antenna groups (calibration coefficients are calculated for these antenna elements). It is noted that antenna calibration is performed also on antenna elements that belong to the reference antenna group but are not reference antenna elements (calibration coefficients are calculated).

First Embodiment

Figure 11:
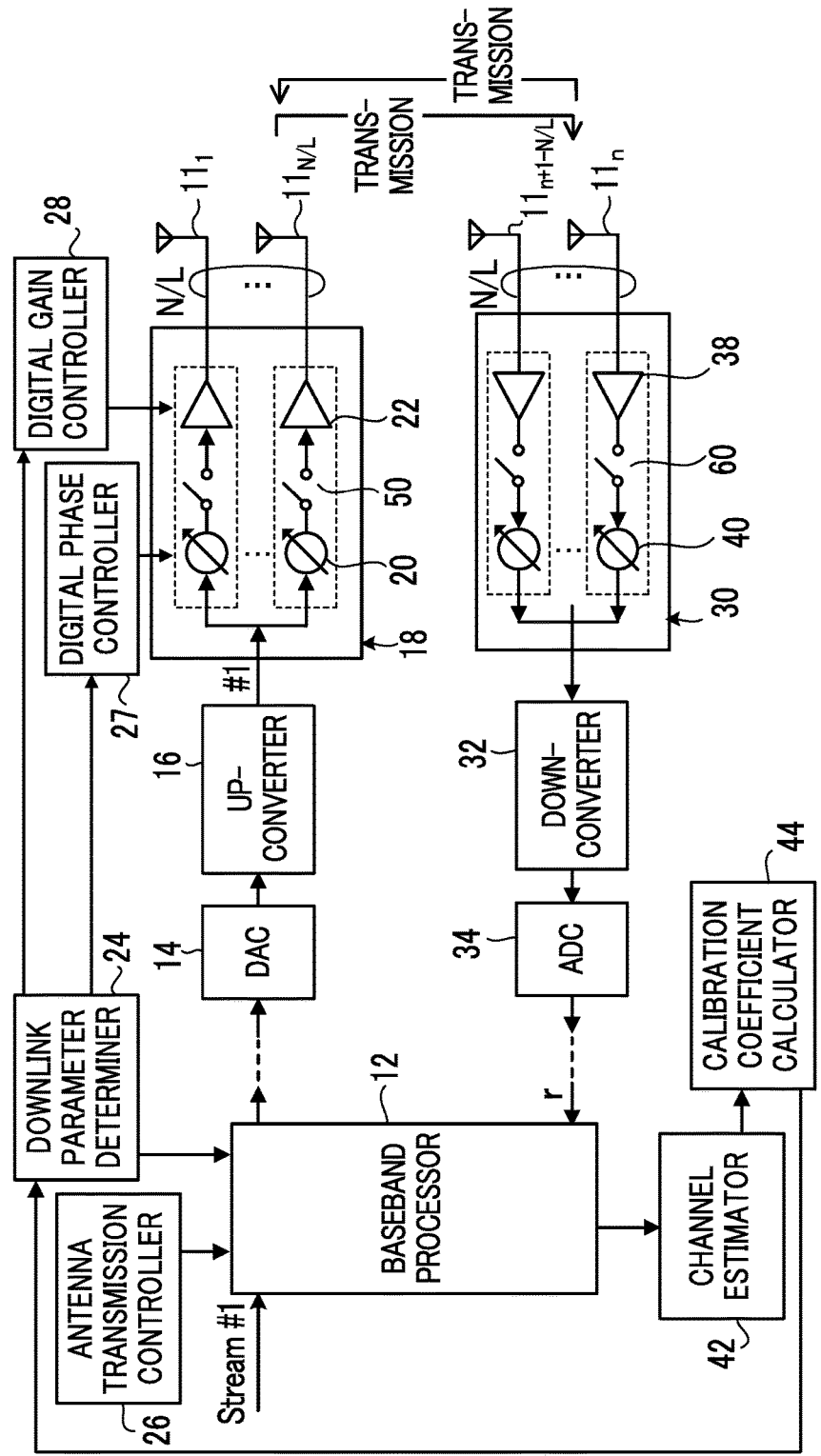
FIG. 11 shows a block diagram illustrating a configuration of a radio base station according to a first embodiment of the present invention.

FIG. 11 shows a configuration of a radio base station 10 according to a first embodiment of the present invention. FIG. 11 shows only one branch in the analog beamformer 18 (corresponding to one antenna group) and another branch in the uplink signal processor 30 (corresponding to another antenna group) for the purposes of illustration. However, in reality, the analog beamformer 18 includes L branches corresponding to L antenna groups, and the uplink signal processor 30 includes L branches corresponding to L antenna groups.

In this embodiment, in a first time period, the antenna transmission controller 26 causes transceiving antenna elements (e.g., transceiving antenna elements $11_1$ to $11_{N/L}$) alone that belong to the reference antenna group, the reference antenna group being one of L antenna groups, to transmit radio pilot signals. The channel estimator 42 estimates channel coefficients based on the pilot signals received by transceiving antenna elements that belong to the calibration target antenna groups. In a second time period that is different from the first time period (the second time period may be before or after the first time period), the antenna transmission controller 26 causes the transceiving antenna elements belonging to the calibration target antenna groups alone to transmit radio pilot signals. The channel estimator 42 estimates channel coefficients based on the pilot signals received by the transceiving antenna elements belonging to the reference antenna group. The calibration coefficient calculator 44 calculates calibration coefficients from the channel coefficients estimated in the first time period and the channel coefficients estimated in the second time period.

After pilot signals are transmitted from transceiving antenna elements belonging to an antenna group and are received by other transceiving antenna elements belonging to another antenna group, preferably it is identifiable as to which of the transceiving antenna elements transmitted each pilot signal. Additionally, after pilot signals are received by transceiving antenna elements belonging to an antenna group, preferably it is identifiable as to which of the transceiving antenna elements received each pilot signal.

Thus, in this embodiment, each sub-branch in the analog beamformer 18 includes a transmitting-side switch 50 that, when one transceiving antenna element belonging to one antenna group transmits pilot signals in the first time period and in the second time period, prevents other transceiving antenna elements belonging to this antenna group from transmitting pilot signals. In addition, each sub-branch in the uplink signal processor 30 includes a receiving-side switch 60 that, when one sub-branch belonging to one branch in the uplink signal processor 30 processes the pilot signals in the first time period and the second time period, prevents other sub-branches belonging to that branch from processing the pilot signals.

Components other than the transmitting-side switch 50 and the receiving-side switch 60 are the same as those of the radio base station 10 serving as a basis for the embodiments as described above with reference to FIGS. 8 to 10, and the same reference signs as those used in FIGS. 8 to 10 are used in FIG. 11. In FIG. 11, each sub-branch is surrounded by a dotted-line rectangle.

Figure 12:
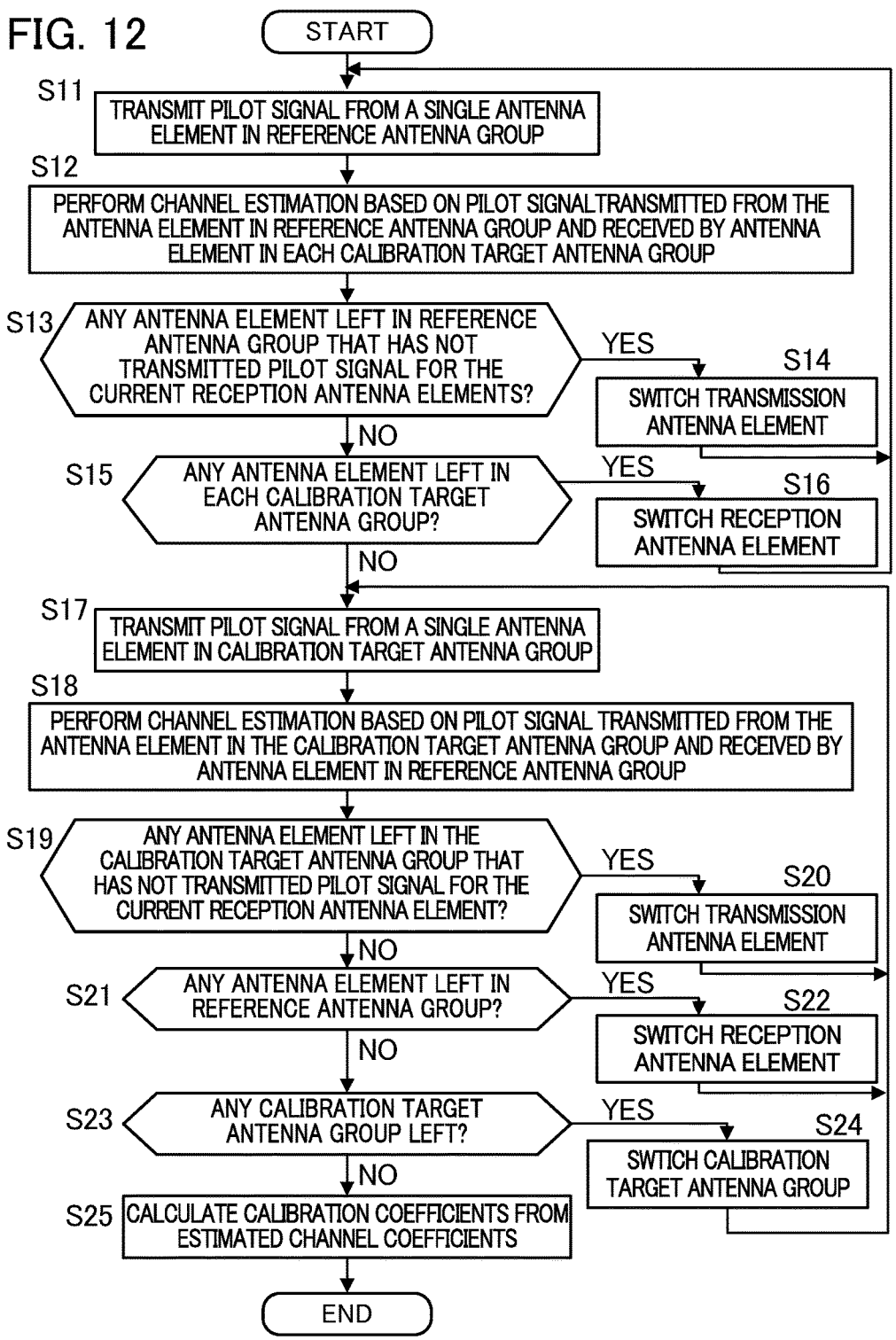
FIG. 12 shows a flowchart illustrating a process for self-calibration according to the first embodiment.

FIG. 12 shows a flowchart illustrating a process for self-calibration according to the first embodiment. First, the antenna transmission controller 26 causes one antenna element alone (e.g., transceiving antenna element $11_2$) in the reference antenna group (e.g., the group including transceiving antenna elements $11_1$ to $11_{N/L}$) to transmit a pilot signal (Step S11). In Step S11, the antenna transmission controller 26 controls each transmitting-side switch 50 such that the transmitting-side switch 50 corresponding to the transceiving antenna element that transmits the pilot signal and that is in the reference antenna group is in the closed state, and the transmitting-side switches 50 corresponding to other transceiving antenna elements in the reference antenna group are in the opened state. In addition, in Step S11, the antenna transmission controller 26 controls each receiving-side switch 60 such that the receiving-side switch 60 corresponding to one transceiving antenna element in each calibration target antenna group is in the closed state, and the receiving-side switches 60 corresponding to other transceiving antenna elements in the calibration target antenna groups are in the opened state.

Next, the channel estimator 42 estimates channel coefficients based on the pilot signal that has been transmitted from the antenna element in the reference antenna group and received by the selected antenna element in each of the calibration target antenna groups (Step S12).

The antenna transmission controller 26 determines whether there is any antenna element in the reference antenna group that has not transmitted a pilot signal for the current receiving antenna elements (the transceiving antenna elements in the calibration target antenna groups that are currently configured by the receiving-side switches 60 to perform reception processing of pilot signals) (Step S13). When the determination result is positive, the antenna transmission controller 26 controls transmitting-side switches 50 relevant to the reference antenna group to switch the antenna element that is to transmit a pilot signal among the antenna elements in the reference antenna group (Step S14). Thereafter, the process returns to Step S11, and thus, a pilot signal is transmitted from one of the other antenna elements in the reference antenna group and the channel estimator 42 estimates channel coefficients (Step S12).

When the determination in Step S13 is negative (that is, when all the antenna elements belonging to the reference antenna group have transmitted pilot signals for the selected transceiving antenna elements in the calibration target antenna groups that are currently configured by the corresponding receiving-side switches 60 to perform reception processing of pilot signals), the antenna transmission controller 26 determines whether there is any antenna element, in each calibration target antenna group, that has not performed reception processing of a pilot signal (Step S15). If the determination result is positive, the antenna transmission controller 26 controls the receiving-side switches 60 relevant to the calibration target antenna groups to switch the antenna element that is to receive a pilot signal among the antenna elements in each calibration target antenna group (Step S16). Thereafter, the process returns to Step S11, and thus, a pilot signal is again transmitted from one antenna element in the reference antenna group and the channel estimator 42 estimates channel coefficients (Step S12).

After all the antenna elements belonging to each calibration target antenna group have received pilot signals transmitted from each of all the antenna elements belonging to the reference antenna group, and channel coefficients for these combinations have been estimated, the process proceeds to Step S17. In this flowchart, the abovementioned "first time period" indicates a period before Step S17, and the "second time period" indicates a period starting at Step S17 and ending before Step S25.

In Step S17, the antenna transmission controller 26 causes one antenna element (e.g., transceiving antenna element $11_{1+N/L}$) alone in one calibration target antenna group (e.g., the group including transceiving antenna elements $11_{1+N/L}$ to $11_{2N/L}$) to transmit a pilot signal. In Step S17, the antenna transmission controller 26 controls each transmitting-side switch 50 such that the transmitting-side switch 50 corresponding to the transceiving antenna element that transmits a pilot signal and that is in the one calibration target antenna group is in the closed state, and the transmitting-side switches 50 corresponding to other transceiving antenna elements in the calibration target antenna groups are in the opened state. In addition, in Step S17, the antenna transmission controller 26 controls each receiving-side switch 60 such that the receiving-side switch 60 corresponding to one transceiving antenna element in the reference antenna group is in the closed state, and the receiving-side switches 60 corresponding to other transceiving antenna elements in the reference antenna group are in the opened state.

Next, the channel estimator 42 estimates a channel coefficient based on the pilot signal that has been transmitted from the one antenna element in the one calibration target antenna group and received by the one antenna element in the reference antenna group (Step S18).

The antenna transmission controller 26 determines whether there is any antenna element, in the one calibration target antenna group, that has not transmitted a pilot signal for the current receiving antenna element (the one transceiving antenna element in the reference antenna group currently configured by the receiving-side switch 60 to perform reception processing of pilot signals) (Step S19). When the determination result is positive, the antenna transmission controller 26 controls transmitting-side switches 50 relevant to the one calibration target antenna group to switch the antenna element that is to transmit a pilot signal among the antenna elements in the one calibration target antenna group (Step S20). Thereafter, the process returns to Step S17, and thus a pilot signal is transmitted from another antenna element in the one calibration target antenna group and the channel estimator 42 estimates a channel coefficient (Step S18).

When the determination result in Step S19 is negative (that is, when all the antenna elements belonging to the one calibration target antenna group have transmitted pilot signals for the one transceiving antenna element in the reference antenna group currently configured by the receiving-side switch 60 to perform reception processing of pilot signals), the antenna transmission controller 26 determines whether there is any antenna element in the reference antenna group that has not performed reception processing of pilot signals (Step S21). When the determination result is positive, the antenna transmission controller 26 controls receiving-side switches 60 relevant to the reference antenna group to switch the antenna element that is to receive pilot signals among the antenna elements in the reference antenna group (Step S22). Thereafter, the process returns to Step S17, and thus, a pilot signal is again transmitted from one antenna element in the calibration target antenna group and the channel estimator 42 estimates a channel coefficient (Step S18).

After all the antenna elements belonging to the reference antenna group have received pilot signals transmitted from each of all the antenna elements belonging to the current calibration target antenna group, and the channel coefficients for these combinations have been estimated, the process proceeds to Step S23.

In Step S23, the antenna transmission controller 26 determines whether there is any calibration target antenna group that has not transmitted pilot signals. When the determination result is positive, the antenna transmission controller 26 switches the calibration target antenna group (Step S24). Thereafter, the process returns to Step S17, and thus, a pilot signal is transmitted from one antenna element in another calibration target antenna group and the channel estimator 42 estimates a channel coefficient (Step S18).

After pilot signals have been transmitted from all the antenna elements in all the calibration target antenna groups, all the antenna elements belonging to the reference antenna group have received pilot signals transmitted from all the antenna elements belonging to all the calibration target antenna groups, and the channel coefficients for these combinations have been estimated, the process proceeds to Step S25. In Step S25, the calibration coefficient calculator 44 calculates calibration coefficients for all the antenna elements in the calibration target antenna groups from the channel coefficients obtained in Step S12 and Step S18 according to equation (21).

In the process so far, the channel coefficients for channels from the antenna elements belonging to the reference antenna group, except the reference antenna element, to the antenna elements belonging to the calibration target antenna groups and the channel coefficients in the reverse direction have been calculated. Additionally, the calibration coefficients related to the antenna elements belonging to the calibration target antenna groups have been calculated. In Step S25, from these channel coefficients and calibration coefficients, the calibration coefficient calculator 44 calculates calibration coefficients for all the antenna elements belonging to the reference antenna group, except the reference antenna element.

The calibration coefficient calculator 44 supplies the calculated calibration coefficients to the downlink parameter determiner 24. The downlink parameter determiner 24 controls at least one of digital precoding or analog transmission beamforming based on these calibration coefficients. In this way, when the radio base station 10 performs downlink transmission, downlink radio signals to be transmitted from transceiving antenna elements 11 are calibrated based on channel coefficients estimated from uplink radio signals received by transceiving antenna elements 11. For example, the calibration coefficient $c_{eNB,n}$ for a particular transceiving antenna element $11_n$ can be expressed by the following equation.

$$c_{eNB,n} = A(n) \cdot e^{j\phi(n)}$$

Here, A(n) is an amplitude of a downlink signal given to the transceiving antenna element $11_n$, and $\phi(n)$ is a phase of the downlink signal given to the transceiving antenna element $11_n$. Upon transmitting a downlink signal, the downlink parameter determiner 24 directs the digital gain controller 28 to adjust the gain of the power amplifier 22 corresponding to the transceiving antenna element $11_n$ such that the amplitude of the downlink signal to be given to the transceiving antenna element $11_n$ is configured to A, and the downlink parameter determiner 24 directs the digital phase controller 27 to adjust the phase shifting amount of the variable phase shifter 20 corresponding to the transceiving antenna element $11_n$ such that the phase of the downlink signal to be given to the transceiving antenna element $11_n$ is configured to $\phi(n)$. The downlink parameter determiner 24 may adjust the precoding matrix to be given to the baseband processor 12 based on the calibration coefficient.

In this embodiment, after pilot signals are transmitted from transceiving antenna elements that belong to one antenna group and are then received by transceiving antenna elements that belong to another antenna group, it is identifiable as to which of the transceiving antenna elements transmitted each pilot signal. Furthermore, after pilot signals are received by transceiving antenna elements that belong to one antenna group, it is identifiable as to which of the transceiving antenna elements received each pilot signal. Therefore, it is possible to easily calculate calibration coefficients for transceiving antenna elements using self-calibration for antenna calibration in a TDD mobile communication system.

In this first embodiment, in order to distinguish between the transceiving antenna elements, there are provided transmitting-side switches 50. However, in Massive MIMO, when a radio base station actually performs downlink transmission while performing beamforming, radio waves are simultaneously emitted from transceiving antenna elements belonging to one antenna group. Accordingly, electric current flows into sub-branches in one branch corresponding to one antenna group and electromagnetic coupling is caused. In the first embodiment, because the antenna element that is to transmit a pilot signal is switched by the transmitting-side switch 50, an effect of electromagnetic coupling is not reflected in the calibration coefficients. Furthermore, providing a transmitting-side switch 50 to each sub-branch will make the structure complicated and will make it complicated to control these switches.

Figure 13:
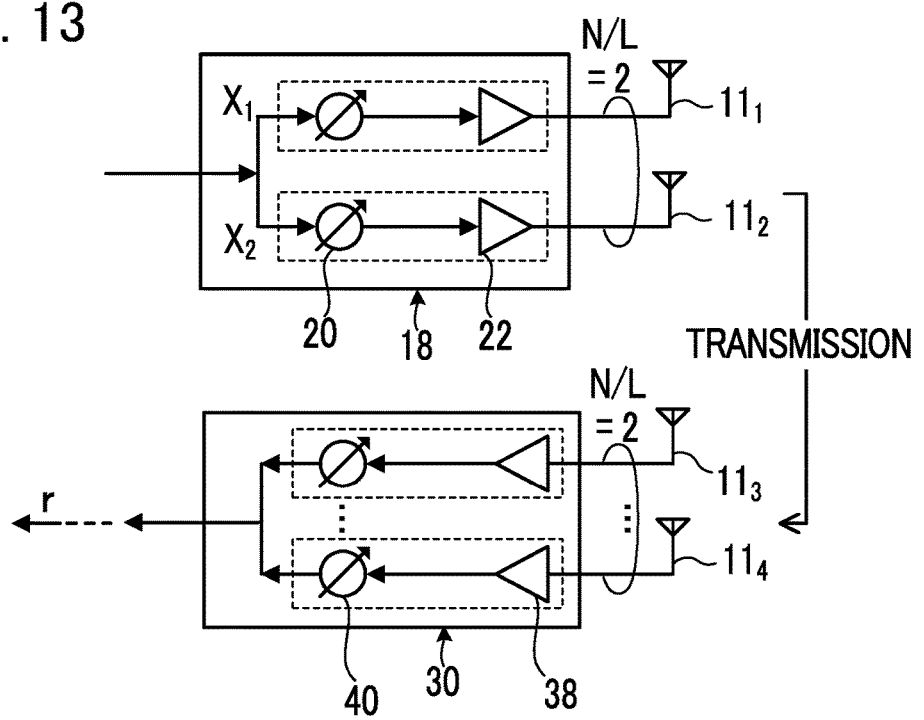
FIG. 13 shows a simplified version of FIG. 10.

Thus, it is desirable to transmit pilot signals simultaneously from the antenna elements belonging to one antenna group (corresponding to one branch) to calculate calibration coefficients. However, in this case, it is difficult to calculate calibration coefficients. The reason thereof will be described with reference to FIG. 13. FIG. 13 is a simplified version of FIG. 10. Here, it is assumed that there are only 2 sub-branches in one branch. That is, N/L=2. Sub-branches in the analog beamformer 18 are connected to the transceiving antenna elements $11_1$ and $11_2$. Sub-branches in the uplink signal processor 30 are connected to the transceiving antenna elements $11_3$ and $11_4$. Transmitting gains $T_1$ and $T_2$ are respectively given to pilot signals $X_1$ and $X_2$ that are to be transmitted respectively by the transceiving antenna elements $11_1$ and $11_2$, and receiving gains $R_3$ and $R_4$ are respectively given to pilot signals to be received respectively by the transceiving antenna elements $11_3$ and $11_4$. In this case, a reception result "r" by antenna elements $11_3$ and $11_4$ can be expressed by the following equation (22).

$$r = R_3 * h_{1,3} * T_1 * X_1 + R_3 * h_{2,3} * T_2 * X_2 + R_4 * h_{1,4} * T_1 * X_1 + R_4 * h_{2,4} * T_2 * X_2 \qquad (22)$$

In order to obtain a calibration coefficient, it is necessary to compute the effective channel coefficients $(R_n * h_{m,n} * T_m)$. However, since the transmitting gains $T_1$ and $T_2$ and the receiving gains $R_3$ and $R_4$ are unknown in equation (22), the effective channel coefficients $(R_n * h_{m,n} * T_m)$ cannot be calculated. Supposedly, if orthogonal pilot signals $X_1$ and $X_2$ are transmitted that satisfy $X_1 \blacksquare X_1 = 1$, $X_2 \blacksquare X_2 = 1$, and $X_1 \blacksquare X_2 = 0$, and the reception result r is multiplied by $X_1$ and $X_2$, respectively, at the receiving side, the following equations can be obtained.

$$X_1 * r = R_3 * h_{1,3} * T_1 + R_4 * h_{1,4} * T_1$$
$$= (R_3 * h_{1,3} + R_4 * h_{1,4}) * T_1$$
$$X_2 * r = R_3 * h_{2,3} * T_2 + R_4 * h_{2,4} * T_2$$
$$= (R_3 * h_{2,3} + R_4 * h_{2,4}) * T_2$$

However, it is not possible to calculate the effective channel coefficients $(R_n * h_{m,n} * T_m)$ in this case either.

Ideally, if a condition that satisfies the following four independent equations can be realized with processing at the receiving side, it is possible to calculate the effective channel coefficients $(R_n * h_{m,n} * T_m)$.

$$X_1 * r_a = R_3 * h_{1,3} * T_1$$

$$X_1 * r_b = R_4 * h_{1,4} * T_1$$

$$X_2 * r_c = R_3 * h_{2,3} * T_2$$

$$X_2 * r_d = R_4 * h_{2,4} * T_2$$

Here, $r_a$ to $r_d$ are the reception results obtained by processing at the receiving side.

The above-described first embodiment is one of the ways to realize conditions that satisfy the independent equations. However, there are the above-described problems in the first embodiment. The second to fifth embodiments solve these problems, and they transmit pilot signals simultaneously from the antenna elements belonging to one antenna group at the same time (corresponding to one branch) and calculate calibration coefficients.

Second Embodiment

Figure 14:
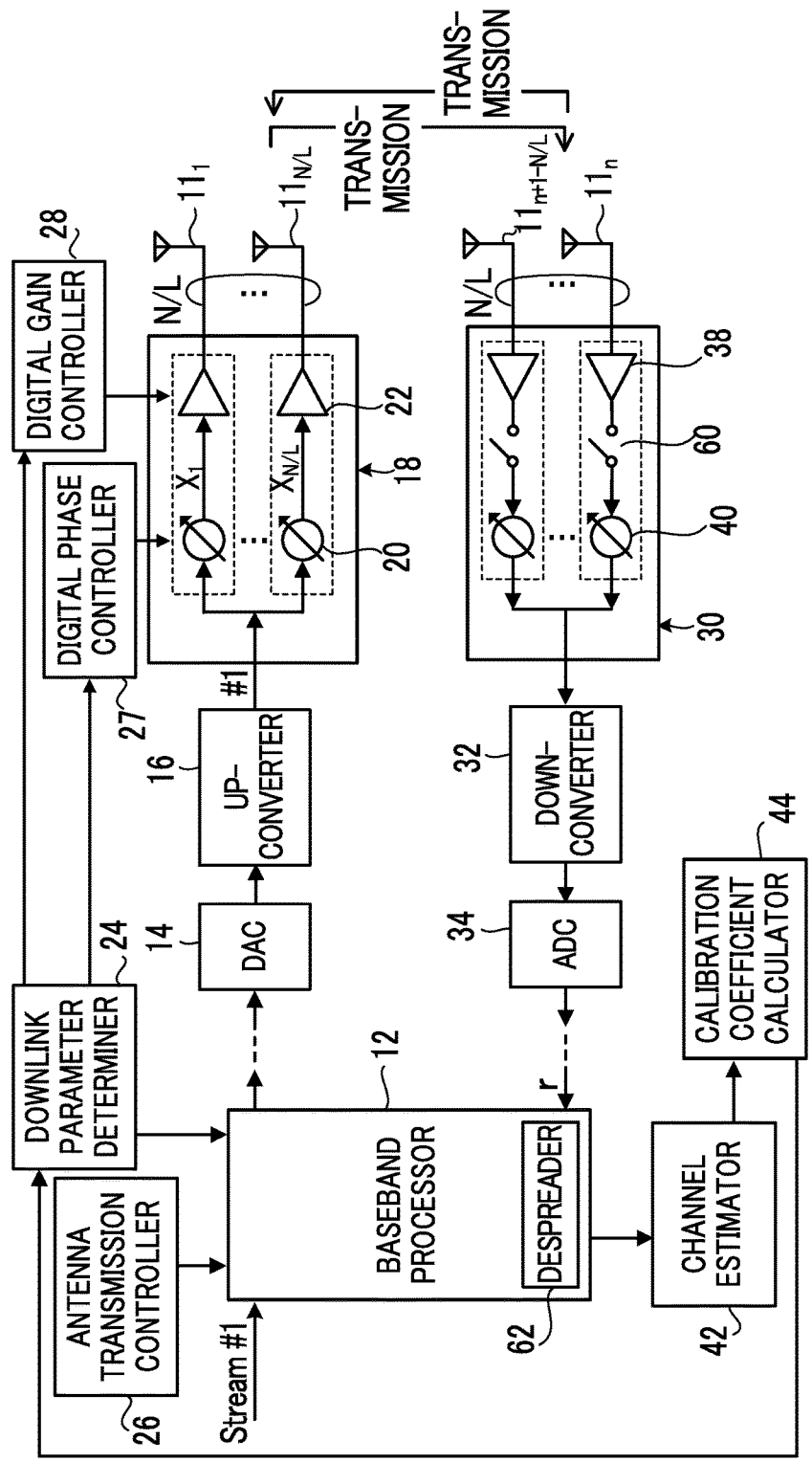
FIG. 14 shows a block diagram illustrating a configuration of a radio base station according to a second embodiment of the present invention.

FIG. 14 shows a configuration of a radio base station 10 according to the second embodiment of the present invention. FIG. 14 shows only one branch in the analog beamformer 18 (corresponding to one antenna group) and another branch in the uplink signal processor 30 (corresponding to another antenna group) for the purposes of illustration. However, in reality, the analog beamformer 18 includes L branches corresponding to L antenna groups, and the uplink signal processor 30 includes L branches corresponding to L antenna groups.

In this embodiment, in the first time period, the antenna transmission controller 26 causes transceiving antenna elements (e.g., transceiving antenna elements $11_1$ to $11_{N/L}$) alone that belong to the reference antenna group, the reference antenna group being one of L antenna groups, to transmit radio pilot signals. The channel estimator 42 estimates channel coefficients based on the pilot signals received by transceiving antenna elements that belong to the calibration target antenna groups. In addition, in the second time period that is different from the first time period (the second time period may be before or after the first time period), the antenna transmission controller 26 causes transceiving antenna elements belonging to the calibration target antenna groups alone to transmit radio pilot signals. The channel estimator 42 estimates channel coefficients based on the pilot signals received by transceiving antenna elements belonging to the reference antenna group. The calibration coefficient calculator 44 calculates calibration coefficients from the channel coefficients estimated in the first time period and the channel coefficients estimated in the second time period.

After pilot signals are transmitted from transceiving antenna elements belonging to an antenna group and are received by other transceiving antenna elements belonging to another antenna group, preferably it is identifiable as to which of the transceiving antenna elements transmitted each pilot signal. Additionally, after pilot signals are received by transceiving antenna elements belonging to an antenna group, preferably it is identifiable as to which of the transceiving antenna elements received each pilot signal.

The radio base station 10 according to this embodiment includes a transmitting-side phase controller that, when transceiving antenna elements belonging to one antenna group transmit pilot signals in the first time period and the second time period, makes phases of the pilot signals to be transmitted from these transceiving antenna elements different from each other. The transmitting-side phase controller may be a digital phase controller 27. The digital phase controller 27 adjusts the phases of the variable phase shifters 20 for analog transmission beamforming in usual downlink transmission, and adjusts the phases to be given by the variable phase shifters 20 to make the phases of pilot signals different in antenna calibration. In antenna calibration, the digital phase controller (transmitting-side phase controller) 27 adjusts variable phase shifters 20 such that, for example, the phase of a pilot signal $X_1$ for the sub-branch corresponding to the transceiving antenna element $11_1$ is configured to [1, 1] and the phase of a pilot signal $X_2$ for the sub-branch corresponding to transceiving antenna element $11_2$ is configured to [1, −1]. The digital phase controller 27 thereby orthogonalizes (i.e., spreads) these pilot signals for these sub-branches.

In addition, in this embodiment, each sub-branch in the uplink signal processor 30 includes a receiving-side switch 60 that, when one sub-branch belonging to one branch in the uplink signal processor 30 processes pilot signals in the first time period and the second time period, prevents other sub-branches belonging to this branch from processing the pilot signals. Furthermore, in this embodiment, the baseband processor 12 includes a despreader 62. The despreader 62 performs an inverse operation (namely, despreading) of the variable phase shifters 20 spreading pilot signals as a result of the operation by the digital phase controller (transmitting-side phase controller) 27.

Therefore, by means of the spreading of pilot signals by the transmitting-side digital phase controller (transmitting-side phase controller) 27 and the despreading of the pilot signals by the receiving-side despreader 62, it is possible, after pilot signals are simultaneously transmitted from transceiving antenna elements belonging to one antenna group and are then received by transceiving antenna elements belonging to another antenna group, to identify which of the transceiving antenna elements transmitted each pilot signal. By means of an operation of the receiving-side switches 60 at the receiving-side for pilot signals, after pilot signals are received by transceiving antenna elements belonging to one antenna group, it is possible to identify which of the transceiving antenna elements received each pilot signal.

The operation of the digital phase controller 27 and components other than the receiving-side switches 60 and despreader 62 are the same as those of the radio base station 10 that is described above with reference to FIGS. 8 to 10 and that serves as a basis for the embodiments. The same reference signs are used in FIG. 14 to denote the same components. In addition, in FIG. 14, each sub-branch is surrounded by a dotted-line rectangle.

Figure 15:
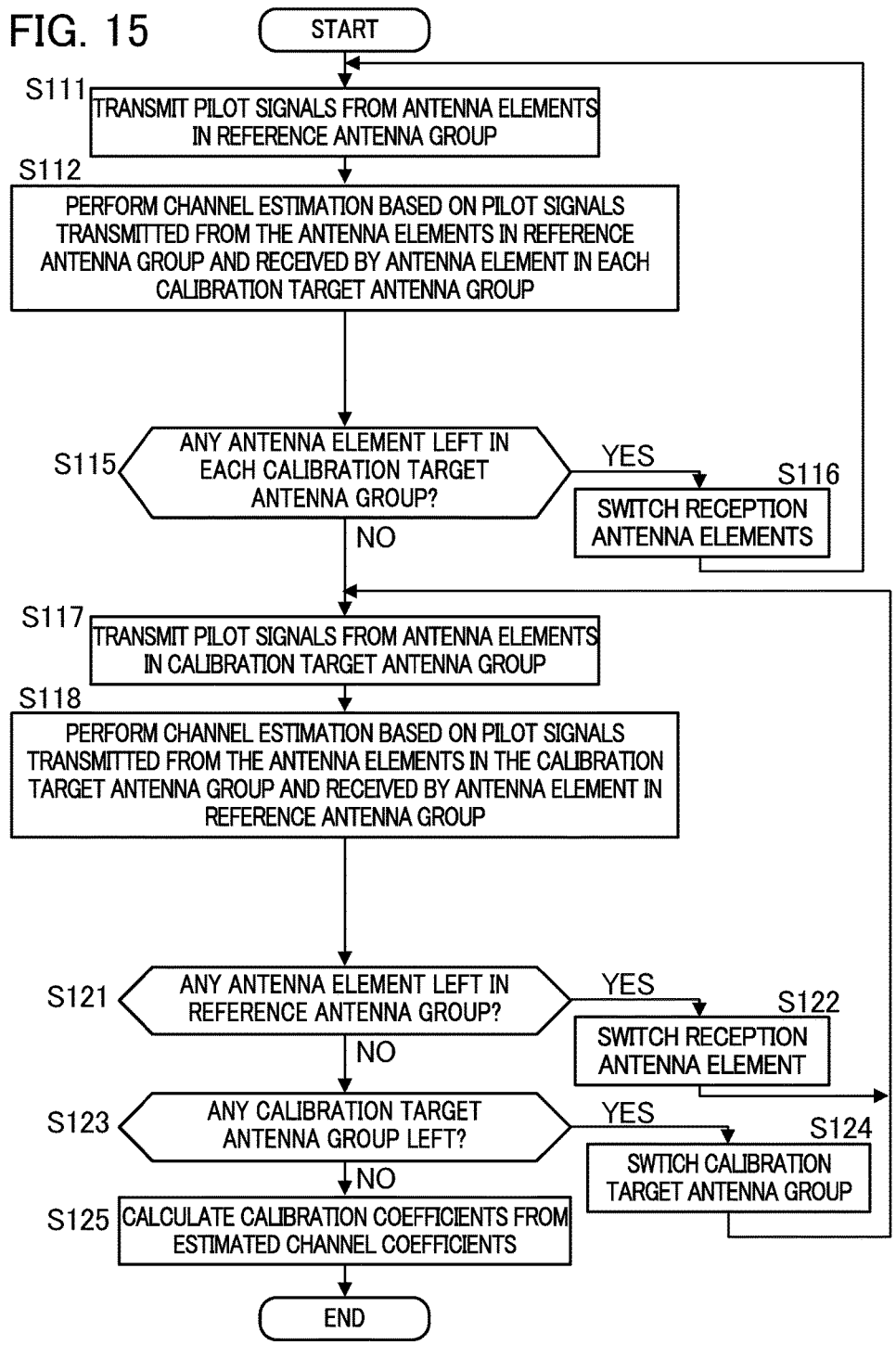
FIG. 15 shows a flowchart illustrating a process for self-calibration according to the second embodiment.

FIG. 15 shows a flowchart illustrating the process for self-calibration according to the second embodiment. First, the antenna transmission controller 26 causes all the antenna elements in the reference antenna group alone (e.g., transceiving antenna elements $11_1$ to $11_{N/L}$) to transmit pilot signals (Step S111). In Step S111, the digital phase controller 27 gives different phases to the sub-branches corresponding to the reference antenna group. In addition, in Step S111, the antenna transmission controller 26 controls each receiving-side switch 60 such that the receiving-side switch 60 corresponding to one transceiving antenna element in each calibration target antenna group is in the closed state and the receiving-side switches 60 corresponding to other transceiving antenna elements in each calibration target antenna group are in the opened state.

Next, the channel estimator 42 estimates channel coefficients based on the pilot signals that have been transmitted from each antenna element in the reference antenna group and received by the one antenna element in each calibration target antenna group (Step S112). In Step S112, the despreader 62 performs despreading and for each pilot signal identifies the antenna element that transmitted this pilot signal.

The antenna transmission controller 26 determines whether there is any antenna element that has not performed reception processing of pilot signals in each calibration target antenna group (Step S115). When the determination result is positive, the antenna transmission controller 26 controls the receiving-side switches 60 relevant to the calibration target antenna groups to switch the antenna element that is to receive a pilot signal in each calibration target antenna group (Step S116). Thereafter, the process returns to Step S111, and thus, pilot signals are transmitted again from all the antenna elements in the reference antenna group and the channel estimator 42 estimates channel coefficients (Step S112).

After all the antenna elements belonging to each calibration target antenna group have received pilot signals transmitted from all the antenna elements belonging to the reference antenna group, and the channel coefficients for these combinations have been estimated, the process proceeds to Step S117. In this flowchart, the abovementioned "first time period" indicates a period before Step S117, and the "second time period" indicates a period starting at step S117 and ending before Step S125.

In Step S117, the antenna transmission controller 26 causes all the antenna elements in one calibration target antenna group alone (e.g., transceiving antenna elements $11_{1+N/L}$ to $11_{2N/L}$) to transmit pilot signals. In Step S117, the digital phase controller 27 gives different phases to the sub-branches corresponding to the one calibration target antenna group. In addition, in Step S117, the antenna transmission controller 26 controls each receiving-side switch 60 such that the receiving-side switch 60 corresponding to one transceiving antenna element in the reference antenna group is in the closed state and the receiving-side switches 60 corresponding to other transceiving antenna elements in the reference antenna group are in the opened state.

Next, the channel estimator 42 estimates channel coefficients based on the pilot signals that have been transmitted from each antenna element in the one calibration target antenna group and received by the one antenna element in the reference antenna group (Step S118). In Step S118, the despreader 62 performs despreading and for each pilot signal identifies the antenna element that transmitted this pilot signal.

The antenna transmission controller 26 determines whether there is any antenna element that has not performed reception processing of pilot signals in the reference antenna group (Step S121). When the determination result is positive, the antenna transmission controller 26 controls the receiving-side switches 60 relevant to the reference antenna group to switch the antenna element that is to receive pilot signals in the reference antenna group (Step S122). Thereafter, the process returns to Step S117, and thus, pilot signals are transmitted again from all the antenna elements in the one calibration target antenna group and the channel estimator 42 estimates channel coefficients (Step S118).

After all the antenna elements belonging to the reference antenna group have received pilot signals transmitted from all the antenna elements belonging to the current calibration target antenna group, and channel coefficients for these combinations have been estimated, the process proceeds to Step S123.

In Step S123, the antenna transmission controller 26 determines whether there is any calibration target antenna group that has not transmitted pilot signals. If the determination result is positive, the antenna transmission controller 26 switches the calibration target antenna group (Step S124). Thereafter, the process returns to Step S117, and thus, pilot signals are transmitted from all the antenna elements in another calibration target antenna group and the channel estimator 42 estimates channel coefficients (Step S118).

After all the antenna elements in all the calibration target antenna groups have transmitted pilot signals, all the antenna elements belonging to the reference antenna group have received pilot signals transmitted from all the antenna elements belonging to all the calibration target antenna groups, and channel coefficients for these combinations have been estimated, the process proceeds to Step S125. In Step S125, the calibration coefficient calculator 44 calculates calibration coefficients for all the antenna elements in the calibration target antenna groups from the channel coefficients obtained in Step S112 and Step S118.

In the process so far, the channel coefficients for channels from the antenna elements belonging to the reference antenna group, except the reference antenna element, to the antenna elements belonging to the calibration target antenna groups and the channel coefficients in the reverse direction have been calculated, and the calibration coefficients related to the antenna elements belonging to the calibration target antenna groups have been calculated. In Step S125, from these channel coefficients and calibration coefficients, the calibration coefficient calculator 44 calculates calibration coefficients for all the antenna elements belonging to the reference antenna group, except for the reference antenna element.

The calibration coefficient calculator 44 supplies the calculated calibration coefficients to the downlink parameter determiner 24. The downlink parameter determiner 24 controls at least one of digital precoding or analog transmission beamforming based on these calibration coefficients as in the first embodiment.

In this embodiment, after pilot signals are transmitted from transceiving antenna elements that belong to one antenna group and are then received by transceiving antenna elements that belong to another antenna group, it is identifiable as to which of the transceiving antenna elements transmitted each pilot signal. Furthermore, after pilot signals are received by transceiving antenna elements that belong to one antenna group, it is identifiable as to which of the transceiving antenna elements received each pilot signal. Therefore, it is possible to easily calculate calibration coefficients for transceiving antenna elements using self-calibration for antenna calibration in a TDD mobile communication system.

In Massive MIMO, when a radio base station actually performs downlink transmission while performing beamforming, radio waves are simultaneously emitted from transceiving antenna elements belonging to one antenna group. Accordingly, electric current flows into sub-branches in one branch corresponding to one antenna group and electromagnetic coupling is caused. In this embodiment, because pilot signals are simultaneously transmitted from the transceiving antenna elements belonging to one antenna group in the performance of antenna calibration, it is possible to calculate calibration coefficients reflecting the influence of electromagnetic coupling. Furthermore, since transmitting-side switches 50 are not provided in the transmitting-side sub-branches, it is possible to simplify the structure as well as the control of the components. Furthermore, as is clear when comparing FIG. 15 with FIG. 12, it is unnecessary to have a step to switch antenna elements that transmit pilot signals, and consequently, it is possible to simplify the process.

Third Embodiment

Figure 16:
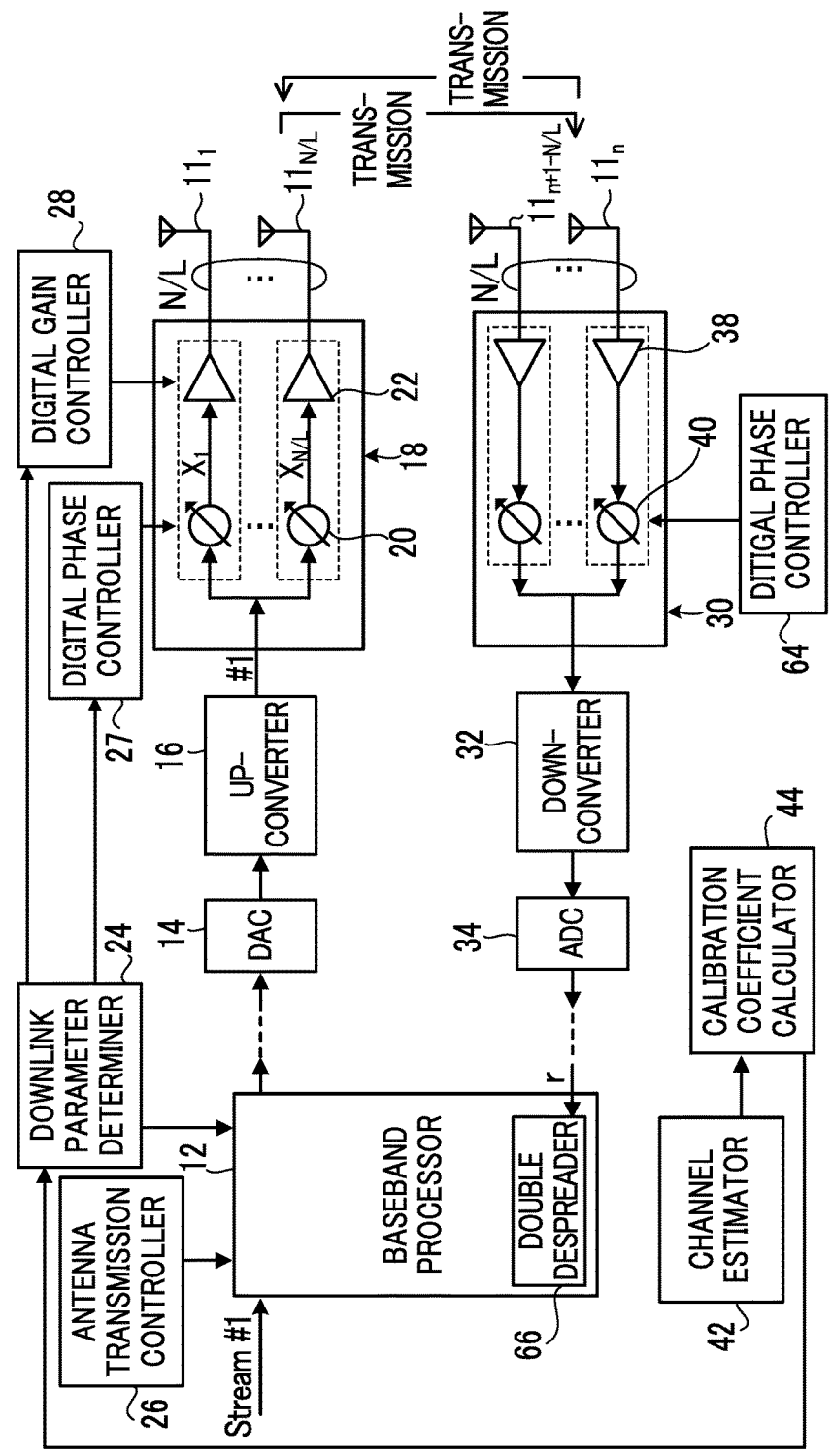
FIG. 16 shows a block diagram illustrating a configuration of a radio base station according to a third embodiment of the present invention.

FIG. 16 shows a configuration of a radio base station 10 according to the third embodiment of the present invention. FIG. 16 shows only one branch in the analog beamformer 18 (corresponding to one antenna group) and another branch in the uplink signal processor 30 (corresponding to another antenna group) for the purposes of illustration. However, in reality, the analog beamformer 18 includes L branches corresponding to L antenna groups, and the uplink signal processor 30 includes L branches corresponding to L antenna groups.

In this embodiment, in the first time period, the antenna transmission controller 26 causes the transceiving antenna elements (e.g., transceiving antenna elements $11_1$ to $11_{N/L}$) alone that belong to the reference antenna group, the reference antenna group being one of L antenna groups, to transmit radio pilot signals. The channel estimator 42 estimates channel coefficients based on the pilot signals received by the transceiving antenna elements belonging to the calibration target antenna groups. In addition, in the second time period that is different from the first time period (the second time period may be before or after the first time period), the antenna transmission controller 26 causes the transceiving antenna elements alone that belong to the calibration target antenna groups to transmit radio pilot signals. The channel estimator 42 estimates channel coefficients based on the pilot signals received by the transceiving antenna elements belonging to the reference antenna group. The calibration coefficient calculator 44 calculates calibration coefficients from the channel coefficients estimated in the first time period and the channel coefficients estimated in the second time period.

After pilot signals are transmitted from transceiving antenna elements belonging to an antenna group and are received by other transceiving antenna elements belonging to another antenna group, preferably it is identifiable as to which of the transceiving antenna elements transmitted each pilot signal. Additionally, after pilot signals are received by transceiving antenna elements belonging to an antenna group, preferably it is identifiable as to which of the transceiving antenna elements received each pilot signal.

Thus, the radio base station 10 according to this embodiment includes: a transmitting-side phase controller that, when transceiving antenna elements belonging to one antenna group transmit pilot signals in the first time period and the second time period, spreads the pilot signals to be transmitted from these transceiving antenna elements with different first orthogonal-spreading sequences; and a digital phase controller (receiving-side phase controller) 64 that, when sub-branches belonging to one branch in the uplink signal processor 30 process the pilot signals in the first time period and the second time period, spreads these pilot signals processed by the sub-branches with different second orthogonal-spreading sequences.

The transmitting-side phase controller may be a digital phase controller 27. The digital phase controller 27 adjusts the phases of the variable phase shifters 20 for analog transmission beamforming in usual downlink transmission, and adjusts the phases to be given by the variable phase shifters 20 to make the phases of pilot signals different in antenna calibration. In antenna calibration, the digital phase controller (transmitting-side phase controller) 27 adjusts the phases of variable phase shifters 20 such that, for example, a pilot signal $X_1$ for the transmitting-side sub-branch corresponding to the transceiving antenna element $11_1$ is configured to $[1, 1, \ldots]$, and a pilot signal $X_2$ for the transmitting-side sub-branch corresponding to the transceiving antenna element $11_2$ is configured to $[1, -1, \ldots]$. The digital phase controller 27 thereby orthogonalizes these pilot signals for these sub-branches. That is, in antenna calibration, the digital phase controller 27 spreads pilot signals to be transmitted from the transceiving antenna elements with different first orthogonal-spreading sequences.

The digital phase controller 64 is a functional block that is implemented by the DSP executing a computer program stored in the storage unit (not illustrated) and functioning in accordance with the computer program. The digital phase controller 64 adjusts the phases of the variable phase shifters 40 for reception beamforming in usual uplink reception, and adjusts the phases to be given by the variable phase shifters 40 to make the phases of the received pilot signals different in antenna calibration. In antenna calibration, the digital phase controller (receiving-side phase controller) 64 adjusts the phases of variable phase shifters 40 such that, for example, pilot signals for the receiving-side sub-branch corresponding to a particular antenna element are multiplied by $[1, 1, 1, 1, \ldots]$, and pilot signals for the receiving-side sub-branch corresponding to another antenna element are multiplied by $[1, -1, 1, -1, \ldots]$. The digital phase controller 64 thereby orthogonzalize these pilot signals for these sub-branches. That is, in antenna calibration, the digital phase controller 64 spreads pilot signals received by the transceiving antenna elements with different second orthogonal-spreading sequences. Second orthogonal-spreading sequences have longer periods than first orthogonal-spreading sequences do. In other words, the second orthogonal-spreading sequences are long codes, whereas the first orthogonal-spreading sequences are short codes.

Furthermore, in this embodiment, the baseband processor 12 includes a double despreader 66. The double despreader 66 executes an inverse operation (namely, despreading long codes) of the variable phase shifters 40 spreading pilot signals as a result of the operation of the receiving-side digital phase controller (receiving-side phase controller) 64, and executes an inverse operation (namely, despreading short codes) of the variable phase shifters 20 spreading pilot signals as a result of the operation of the transmitting-side digital phase controller (transmitting-side phase controller) 27. In other words, the double despreader 66 performs double despreading.

Accordingly, by means of the spreading of pilot signals by the transmitting-side digital phase controller (transmitting-side phase controller) 27 and the short-code despreading of the pilot signals by the receiving-side double despreader 66, it is possible, after pilot signals are simultaneously transmitted from transceiving antenna elements belonging to one antenna group and are then received by other transceiving antenna elements belonging to another antenna group, to identify which of the transceiving antenna elements transmitted each pilot signal. By means of the spreading of pilot signals by the receiving-side digital phase controller (receiving-side phase controller) 64 and the long-code despreading of the pilot signals by the receiving-side double despreader 66, it is possible, after pilot signals are received by transceiving antenna elements belonging to one antenna group, to identify which of the transceiving antenna elements received each pilot signal.

The operation of the digital phase controller 27 and components other than the digital phase controller 64 and the double despreader 66 are the same as those of the radio base station 10 that is described above with reference to FIGS. 8 to 10 and that serves as a basis for the embodiments. The same reference signs are used in FIG. 16 to denote the same components. In addition, in FIG. 16, each sub-branch is surrounded by a dotted-line rectangle.

Figure 17:
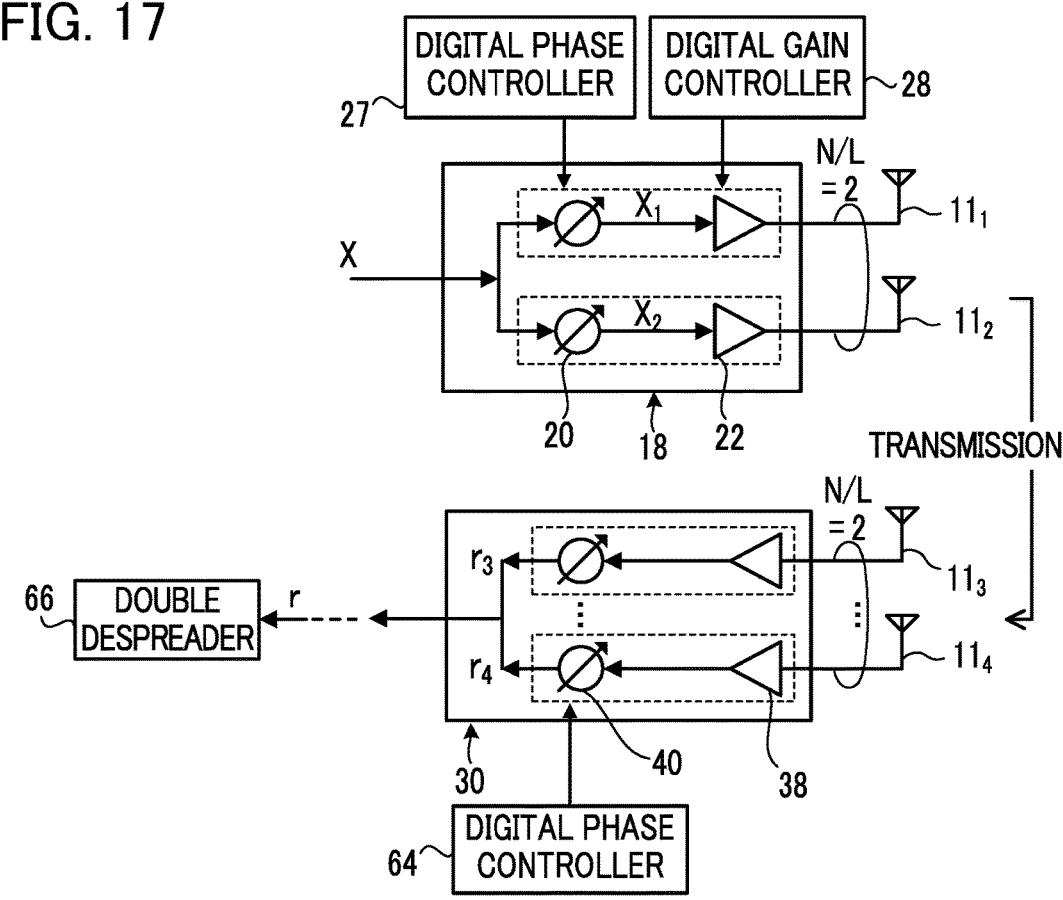
FIG. 17 shows a simplified version of FIG. 16.

The principle of the third embodiment will be described with reference to FIG. 17. FIG. 17 is a simplified version of FIG. 16. Here, it is assumed that there are only two sub-branches in one branch. That is, N/L=2. Sub-branches in the analog beamformer 18 are connected to transceiving antenna elements $11_1$ and $11_2$, and sub-branches in the uplink signal processor 30 are connected to transceiving antenna elements $11_3$ and $11_4$. Transmitting gains $T_1$ and $T_2$ are given to pilot signals $X_1$ and $X_2$ to be transmitted by the transceiving antenna elements $11_1$ and $11_2$, respectively. Receiving gains $R_3$ and $R_4$ are given to pilot signals received by the transceiving antenna elements $11_3$ and $11_4$, respectively. In this case, the reception result r by the antenna elements $11_3$ and $11_4$ can be expressed by the above-described equation (22).

In antenna calibration, a common pilot signal X is given to each sub-branch at the transmitting-side. The X is a sequence [1, 1, 1, 1, 1, 1, 1, 1, 1, 1, 1, 1, 1, 1, 1, 1, . . . ]. The digital phase controller 27 controls phases of the respective variable phase shifters 20 in the analog beamformer 18 such that a pilot signal $X_1$ for the transmitting-side sub-branch corresponding to the antenna element $11_1$ is configured to [1, 1, 1, 1, 1, 1, 1, 1, 1, 1, 1, 1, 1, 1, 1, 1, . . . ], and a pilot signal $X_2$ for the transmitting-side sub-branch corresponding to the antenna element $11_2$ is configured to [1, −1, 1, −1, 1, −1, 1, −1, 1, −1, 1, −1, 1, −1, 1, −1, . . . ]. In other words, the variable phase shifter 20 corresponding to the antenna element $11_1$ multiplies the pilot signal X by a first orthogonal-spreading sequence [1, 1, 1, 1, 1, 1, 1, 1, 1, 1, 1, 1, 1, 1, 1, 1, . . . ], and the variable phase shifter 20 corresponding to the antenna element $11_2$ multiplies the pilot signal X by a first orthogonal-spreading sequence [1, −1, 1, −1, 1, −1, 1, −1, 1, −1, 1, −1, 1, −1, 1, −1, . . . ].

Specifically, a pilot signal $X_n$ in the analog beamformer 18 can be expressed by the following equation:

$$X_n = B(n) \cdot e^{j\phi(n)}$$

Here, B(n) is an amplitude of a pilot signal given to a transceiving antenna element $11_n$, and $\phi(n)$ is a phase of the pilot signal given to the antenna element $11_n$. The digital gain controller 28 gives the same amplitude B to the pilot signals $X_1$ and $X_2$. The digital phase controller 27 always sets the phase $\phi(n)$ of the pilot signal $X_1$ to 0 and periodically switches the phase $\phi(n)$ of the pilot signal $X_2$ between 0 and $\pi$. In this way, the pilot signal $X_1$ for the transmitting-side sub-branch corresponding to the antenna element $11_1$ is configured to [1, 1, 1, 1, 1, 1, 1, 1, 1, 1, 1, 1, 1, 1, 1, 1, . . . ], and the pilot signal $X_2$ for the transmitting-side sub-branch corresponding to the antenna element $11_2$ is configured to [1, −1, 1, −1, 1, −1, 1, −1, 1, −1, 1, −1, 1, −1, 1, −1, . . . ].

In antenna calibration, at the receiving-side, the digital phase controller 64 controls the phase of each variable phase shifter 40 in the uplink signal processor 30 such that pilot signals for the receiving-side sub-branch corresponding to the antenna element $11_3$ are multiplied by a second orthogonal-spreading sequence $S_3$, that is, [1, 1, 1, 1, . . . ], and that pilot signals for the receiving-side sub-branch corresponding to the antenna element $11_4$ are multiplied by a second orthogonal-spreading sequence $S_4$, [1, −1, 1, −1, . . . ]. That is, the variable phase shifter 40 corresponding to the antenna element $11_3$ multiplies the pilot signal by the second orthogonal-spreading sequence [1, 1, 1, 1, . . . ], and the variable phase shifter 40 corresponding to the antenna element $11_4$ multiplies the pilot signal X by the second orthogonal-spreading sequence [1, −1, 1, −1, . . . ]. The second orthogonal-spreading sequences $S_3$ and $S_4$ are orthogonal to each other.

The period of second orthogonal-spreading sequences is four times that of first orthogonal-spreading sequences. Therefore, for example, $S_3 * X_1 =$ [1, 1, 1, 1, 1, 1, 1, 1, 1, 1, 1, 1, 1, 1, 1, 1, . . . ], and $S_4 * X_2 =$ [1, −1, 1, −1, −1, 1, −1, 1, 1, −1, 1, −1, −1, 1, −1, 1, . . . ]. $S_3 * X_1$ and $S_4 * X_2$ are orthogonal to each other.

As a result of the phase control by the receiving-side variable phase shifters 40, the reception result $r_3$ in the antenna element $11_3$ and the reception result $r_4$ in the antenna element $11_4$ can be expressed by the following equations:

$$r_3 = S_3 * (R_3 * h_{1,3} * T_1 * X_1 + R_3 * h_{2,3} * T_2 * X_2)$$

$$r_4 = S_4 * (R_4 * h_{1,4} * T_1 * X_1 + R_4 * h_{2,4} * T_2 * X_2)$$

The synthesized reception result is $r = r_3 + r_4$.

The double despreader 66 multiplies the reception result r by the first orthogonal-spreading sequences and the second orthogonal-spreading sequences (performs double despreading) to obtain the following result.

$$g_{1,3} = r * S_3 * X_1 = R_3 * h_{1,3} * T_1$$

$$g_{1,4} = r * S_4 * X_1 = R_4 * h_{1,4} * T_1$$

$$g_{2,3} = r * S_3 * X_2 = R_3 * h_{2,3} * T_2$$

$$g_{2,4} = r * S_4 * X_2 = R_4 * h_{2,4} * T_2$$

In this way, it is possible to realize a condition that satisfies the four independent equations so as to calculate effective channel coefficients $g_{1,3}$, $g_{2,3}$, $g_{1,4}$, and $g_{2,4}$. It can be understood from the above description that, when the antenna elements $11_1$ and $11_2$ transmit pilot signals and the antenna elements $11_3$ and $11_4$ receive the pilot signals, it is possible to calculate the channel coefficients $g_{1,3}$, $g_{2,3}$, $g_{1,4}$, and $g_{2,4}$. Inversely, when the antenna elements $11_3$ and $11_4$ transmit pilot signals and the antenna elements $11_1$ and $11_2$ receive the pilot signals, with the same theory, it is possible to calculate effective channel coefficients in the reverse direction $g_{3,1}$, $g_{3,2}$, $g_{4,1}$, and $g_{4,2}$ as follows.

$$g_{3,1} = r * S_1 * X_3 = R_1 * h_{3,1} * T_3$$

$$g_{4,1} = r * S_1 * X_4 = R_1 * h_{4,1} * T_4$$

$$g_{3,2} = r * S_2 * X_3 = R_2 * h_{3,2} * T_3$$

$$g_{4,2} = r * S_2 * X_4 = R_2 * h_{4,2} * T_4$$

When the antenna element $11_1$ is a reference antenna element, it can be assumed $c_{eNB,1} = 1$. In this case, calibration coefficients $c_{eNB,3}$ and $c_{eNB,4}$ for the antenna elements $11_3$ and $11_4$ can be calculated according to the following equations:

$$c_{eNB,3} = \frac{g_{1,3}}{g_{3,1}}$$

$$c_{eNB,4} = \frac{g_{1,4}}{g_{4,1}}$$

where $$\frac{g_{1,3}}{g_{3,1}} = \frac{T_1 \cdot R_3}{R_1 \cdot T_3}$$

$$\frac{g_{1,4}}{g_{4,1}} = \frac{T_1 \cdot R_4}{R_1 \cdot T_4}.$$

The calibration coefficient $c_{eNB,2}$ for the antenna element $11_2$ belonging to the same reference antenna group as the reference antenna element $11_1$ is unknown. However, in the process so far, the effective channel coefficients $g_{3,2}$ and $g_{2,3}$ are known and the calibration coefficient $c_{eNB,3}$ for the antenna element $11_3$ is calculated. Accordingly, the calibration coefficient $c_{eNB,2}$ for the antenna element $11_2$ can be calculated as follows from the effective channel coefficients $g_{3,2}$ and $g_{2,3}$ and the calibration coefficient $c_{eNB,3}$. Alternatively, the calibration coefficient $c_{eNB,2}$ for the antenna elements $11_2$ may be calculated as follows from the effective channel coefficients $g_{4,2}$ and $g_{2,4}$ and the calibration coefficient $c_{eNB,4}$.

$$c_{eNB,2} = \frac{g_{2,3} \cdot c_{eNB,3}}{g_{3,2}}$$

$$c_{eNB,2} = \frac{g_{2,4} \cdot c_{eNB,4}}{g_{4,2}}$$

As a result, calibration coefficients related to the antenna elements in all the antenna groups are determined when the calibration coefficient $c_{eNB,1}$ for the reference antenna element in the reference antenna group is configured to 1.

The principle of the third embodiment has been described so far by taking an example in which there are only two sub-branches in each branch. When there are more than two sub-branches in each branch, all calibration coefficients can be calculated by modifying the above description.

Figure 18:
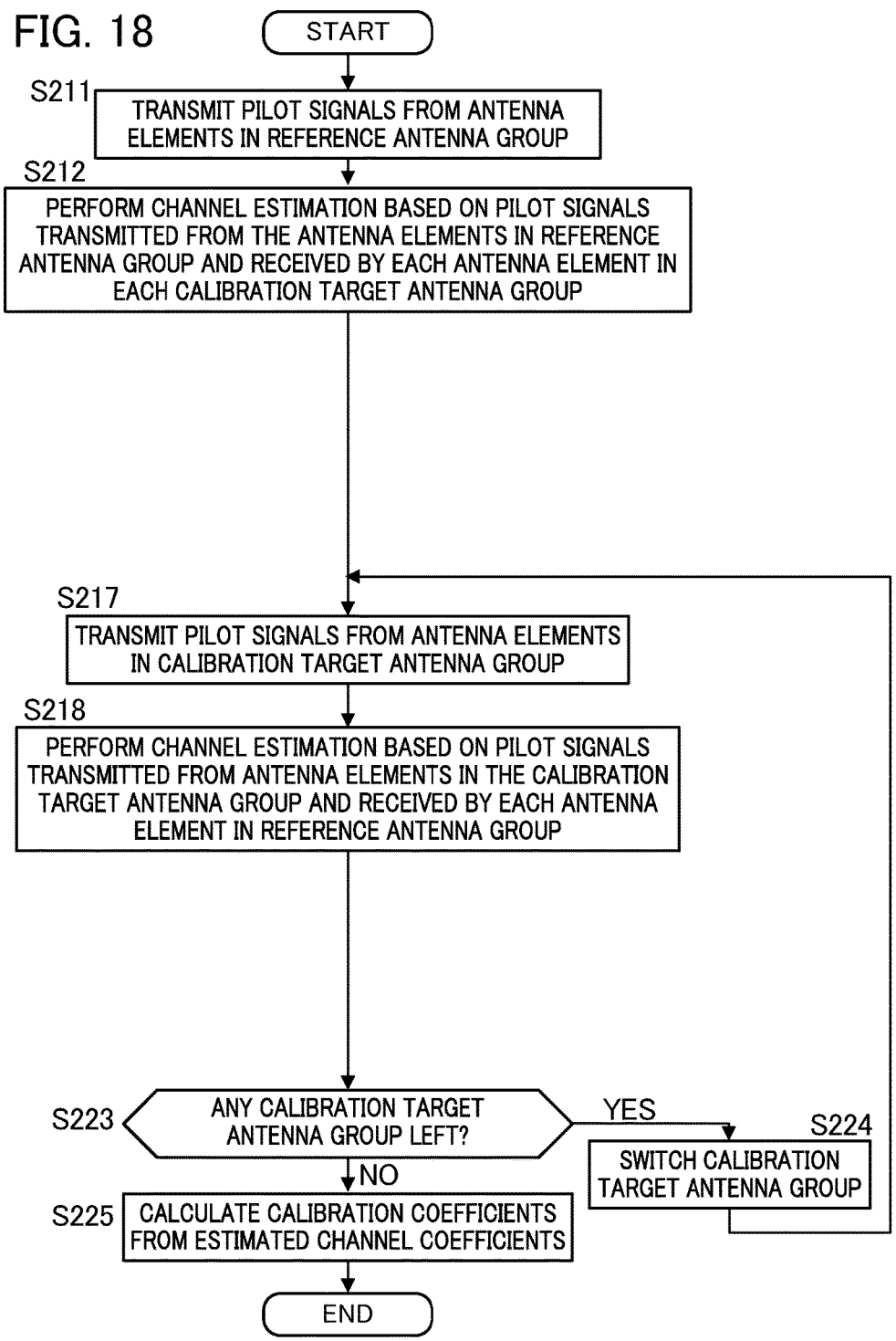
FIG. 18 shows a flowchart illustrating a process for self-calibration according to the third embodiment.

FIG. 18 shows a flowchart illustrating the process for self-calibration according to the third embodiment. First, the antenna transmission controller 26 causes all the antenna elements in the reference antenna group alone (e.g., transceiving antenna elements $11_1$ to $11_{N/L}$) to transmit pilot signals (Step S211). In Step S211, the digital phase controller 27 gives different phases to the sub-branches in the reference antenna group. In addition, in Step S211, the digital phase controller 64 gives different phases to the sub-branches in each calibration target antenna group.

Next, the channel estimator 42 estimates effective channel coefficients based on the pilot signals that have been transmitted from each antenna element in the reference antenna group and received by each antenna element in each calibration target antenna group (Step S212). In Step S212, the double despreader 66 performs double despreading so as to identify, for each pilot signal, the antenna element that transmitted the pilot signal and the antenna element that received the pilot signal.

After all the antenna elements belonging to each calibration target antenna group have received pilot signals transmitted from all the antenna elements belonging to the reference antenna group, and after effective channel coefficients for these combinations have been estimated, the process proceeds to Step S217. In this flowchart, the above-mentioned "first time period" is a period before Step S217, and the "second time period" is a period starting from Step S217 and ending before Step S225.

In Step S217, the antenna transmission controller 26 causes all the antenna elements in one calibration target antenna group alone (e.g., the group including transceiving antenna elements $11_{1+N/L}$ to $11_{2N/L}$) to transmit pilot signals. In Step S217, the digital phase controller 27 gives different phases to the sub-branches in the one calibration target antenna group. In addition, in Step S217, the digital phase controller 64 gives different phases to the sub-branches in the reference antenna group.

Next, the channel estimator 42 estimates effective channel coefficients based on the pilot signals transmitted from each antenna element in the one calibration target antenna group and received by each antenna element in the reference antenna group (Step S218). In Step S218, the double despreader 66 performs double despreading so as to identify, for each pilot signal, the antenna element that transmitted the pilot signal and the antenna element that received the pilot signal.

After all the antenna elements belonging to the reference antenna group have received pilot signals transmitted from all the antenna elements belonging to the current calibration target antenna group, and after effective channel coefficients for these combinations have been estimated, the process proceeds to Step S223.

In Step S223, the antenna transmission controller 26 determines whether there is any calibration target antenna group that has not transmitted pilot signals. When the determination result is positive, the antenna transmission controller 26 switches the calibration target antenna group (Step S224). Thereafter, the process returns to Step S217, and thus, pilot signals are transmitted from all the antenna elements in another calibration target antenna group and the channel estimator 42 estimates effective channel coefficients (Step S218).

The process proceeds to Step S225, after all the antenna elements in all the calibration target antenna groups have transmitted pilot signals, all the antenna elements belonging to the reference antenna group have received pilot signals transmitted from all the antenna elements belonging to all the calibration target antenna groups, and effective channel coefficients for these combinations have been estimated. In Step S225, the calibration coefficient calculator 44 calculates calibration coefficients for all the antenna elements in the calibration target antenna groups from the effective channel coefficients obtained in Step S212 and Step S218.

In the process so far, the effective channel coefficients for channels from the antenna elements belonging to the reference antenna group, except the reference antenna element, to the antenna elements belonging to the calibration target antenna groups and the effective channel coefficients in the reverse direction have been calculated, and the calibration coefficients related to the antenna elements belonging to the calibration target antenna groups have been calculated. In Step S225, from these effective channel coefficients and calibration coefficients, the calibration coefficient calculator 44 calculates calibration coefficients for all the antenna elements belonging to the reference antenna group, except for the reference antenna element.

The calibration coefficient calculator 44 supplies the calculated calibration coefficients to the downlink parameter determiner 24. The downlink parameter determiner 24 controls at least one of digital precoding or analog transmission beamforming based on these calibration coefficients as in the first embodiment.

In this embodiment, after pilot signals are transmitted from transceiving antenna elements that belong to one antenna group and are then received by transceiving antenna elements that belong to another antenna group, it is identifiable as to which of the transceiving antenna elements transmitted each pilot signal. Furthermore, after pilot signals are received by transceiving antenna elements that belong to one antenna group, it is identifiable as to which of the transceiving antenna elements received each pilot signal. Therefore, it is possible to easily calculate calibration coefficients for transceiving antenna elements using self-calibration for antenna calibration in a TDD mobile communication system.

In Massive MIMO, when a radio base station actually performs downlink transmission while performing beamforming, radio waves are simultaneously emitted from transceiving antenna elements belonging to one antenna group. Accordingly, electric current flows into sub-branches in one branch corresponding to one antenna group and electromagnetic coupling is caused. In this embodiment, because pilot signals are simultaneously transmitted from the transceiving antenna elements belonging to one antenna group in the performance of antenna calibration, it is possible to calculate calibration coefficients reflecting the influence of electromagnetic coupling. Furthermore, since transmitting-side switches 50 are not provided in the transmitting-side sub-branches, it is possible to simplify the structure as well as the control of the components. Furthermore, since receiving-side switches 60 are not provided in the receiving-side sub-branches, it is possible to simplify the structure as well as the control of the components. As is clear when comparing FIG. 18 with FIG. 12, it is unnecessary to have a step to switch antenna elements that transmit pilot signals and a step to switch antenna elements that receive pilot signals. Consequently, it is possible to simplify the process.

Fourth Embodiment

Figure 19:
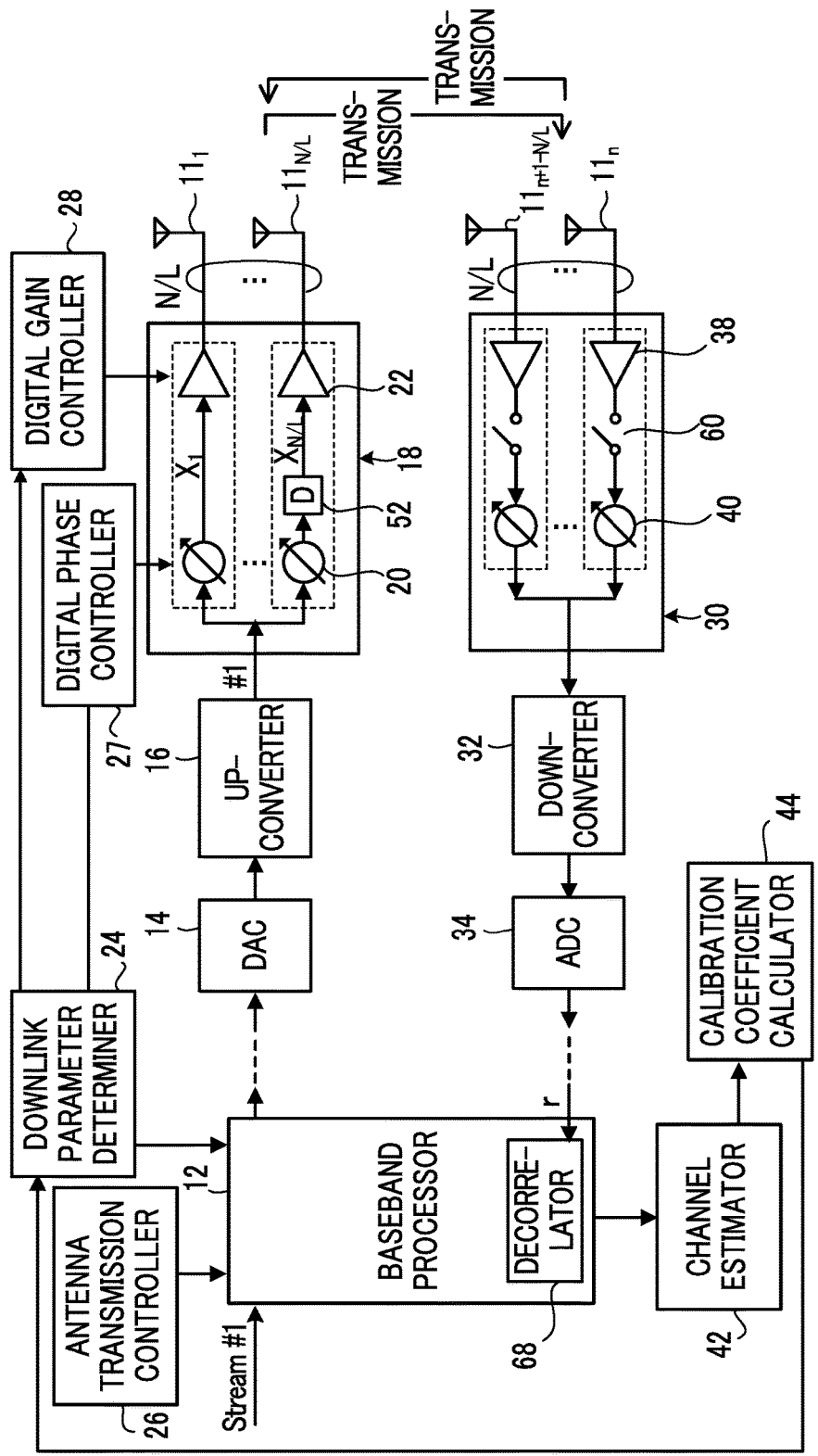
FIG. 19 shows a block diagram illustrating a configuration of a radio base station according to a fourth embodiment of the present invention.

FIG. 19 shows a configuration of a radio base station 10 according to the fourth embodiment of the present invention. FIG. 19 shows only one branch in the analog beamformer 18 (corresponding to one antenna group) and another branch in the uplink signal processor 30 (corresponding to another antenna group) for the purposes of illustration. However, in reality, the analog beamformer 18 includes L branches corresponding to L antenna groups, and the uplink signal processor 30 includes L branches corresponding to L antenna groups.

In this embodiment, in the first time period, the antenna transmission controller 26 causes the transceiving antenna elements (e.g., transceiving antenna elements $11_1$ to $11_{N/L}$) alone belonging to the reference antenna group, which is one of L antenna groups, to transmit radio pilot signals. The channel estimator 42 estimates channel coefficients based on the pilot signals received by transceiving antenna elements belonging to the calibration target antenna groups. In addition, in the second time period different from the first time period (the second time period may be before or after the first time period), the antenna transmission controller 26 causes the transceiving antenna elements belonging to a calibration target antenna group to transmit radio pilot signals. The channel estimator 42 estimates channel coefficients based on the pilot signals received by the transceiving antenna elements belonging to the reference antenna group. The calibration coefficient calculator 44 calculates calibration coefficients from the channel coefficients estimated in the first time period and the channel coefficients estimated in the second time period.

After pilot signals are transmitted from transceiving antenna elements belonging to an antenna group and are received by other transceiving antenna elements belonging to another antenna group, preferably it is identifiable as to which of the transceiving antenna elements transmitted each pilot signal. Additionally, after pilot signals are received by transceiving antenna elements belonging to an antenna group, preferably it is identifiable as to which of the transceiving antenna elements received each pilot signal.

Thus, the radio base station 10 according to this embodiment includes: a sequence supplier that, when transceiving antenna elements belonging to one antenna group transmit pilot signals in the first time period and the second time period, gives the same sequences to signals to be supplied to the sub-branches corresponding to the transceiving antenna elements; and a delay applier that, when transceiving antenna elements belonging to one antenna group transmit pilot signals in the first time period and the second time period, makes the transmission timings of the pilot signals different.

The sequence supplier may be a baseband processor 12. The baseband processor (sequence supplier) 12 supplies to the DAC 14 sequences with high auto-correlation and low cross-correlation as a basis for pilot signals. Such sequences may be PN (pseudonoise) sequences or Zadoff-Chu sequences, for example.

The delay applier may be implemented by one or more delayers 52 or may be implemented with cables having different length with each other in the transmitting-side sub-branches. By means of the operation of the delay applier, when transceiving antenna elements belonging to one antenna group transmit pilot signals, the antenna elements transmit a sequence with different delays.

In addition, in this embodiment, each sub-branch in the uplink signal processor 30 includes a receiving-side switch 60 that, when one sub-branch belonging to one branch in the uplink signal processor 30 processes pilot signals in the first time period and the second time period, prevents other sub-branches belonging to this branch from processing the pilot signals. Furthermore, in this embodiment, the baseband processor 12 includes a decorrelator 68. The decorrelator 68 decorrelates received pilot signals with a sequence supplied by the baseband processor (sequence supplier) 12 upon transmission of the pilot signals.

Therefore, by means of the different delays in pilot signals at the transmitting-side and the decorrelation of pilot signals by the receiving-side decorrelator 68, it is possible, after pilot signals are simultaneously transmitted from transceiving antenna elements belonging to one antenna group and are then received by other transceiving antenna elements belonging to other antenna groups, to identify which of the transceiving antenna elements transmitted each pilot signal. By means of the operation of the receiving-side switches 60 at the receiving-side of pilot signals, it is possible, after pilot signals are received by transceiving antenna elements belonging to one antenna group, to identify which of the transceiving antenna elements received each pilot signal.

The operation of the baseband processor 12 and components other than the delay applier, the receiving-side switches 60, and the decorrelator 68 are the same as those of the radio base station 10 that is described above with reference to FIGS. 8 to 10 and that serves as a basis for the embodiments. The same reference signs are used in FIG. 19 to denote the same components. In addition, in FIG. 19, each sub-branch is surrounded by a dotted-line rectangle.

A flowchart illustrating the process for self-calibration according to the fourth embodiment may be the same as that of FIG. 15, which shows a flowchart illustrating the process for self-calibration according to the second embodiment. However, in the fourth embodiment, the digital phase controller 27 does not give different phases to the sub-branches in each antenna group in the performance of self-calibration.

The calibration coefficient calculator 44 supplies the calculated calibration coefficients to the downlink parameter determiner 24. The downlink parameter determiner 24 controls at least one of digital precoding or analog transmission beamforming based on these calibration coefficients as in the first embodiment.

In this embodiment, after pilot signals are transmitted from transceiving antenna elements that belong to one antenna group and are then received by transceiving antenna elements that belong to another antenna group, it is identifiable as to which of the transceiving antenna elements transmitted each pilot signal. Furthermore, after pilot signals are received by transceiving antenna elements that belong to one antenna group, it is identifiable as to which of the transceiving antenna elements received each pilot signal.

Therefore, it is possible to easily calculate calibration coefficients for transceiving antenna elements using self-calibration for antenna calibration in a TDD mobile communication system.

In Massive MIMO, when a radio base station actually performs downlink transmission while performing beamforming, radio waves are simultaneously emitted from transceiving antenna elements belonging to one antenna group. Accordingly, electric current flows into sub-branches in one branch corresponding to one antenna group and electromagnetic coupling is caused. In this embodiment, because pilot signals are simultaneously transmitted from the transceiving antenna elements belonging to one antenna group in the performance of antenna calibration, it is possible to calculate calibration coefficients reflecting the influence of electromagnetic coupling. Furthermore, since transmitting-side switches 50 are not provided in the transmitting-side sub-branches, it is possible to simplify the structure as well as the control of the components. Furthermore, as is clear when comparing FIG. 15 with FIG. 12, it is unnecessary to have a step to switch antenna elements that transmit pilot signals, and consequently, it is possible to simplify the process.

Fifth Embodiment

Figure 20:
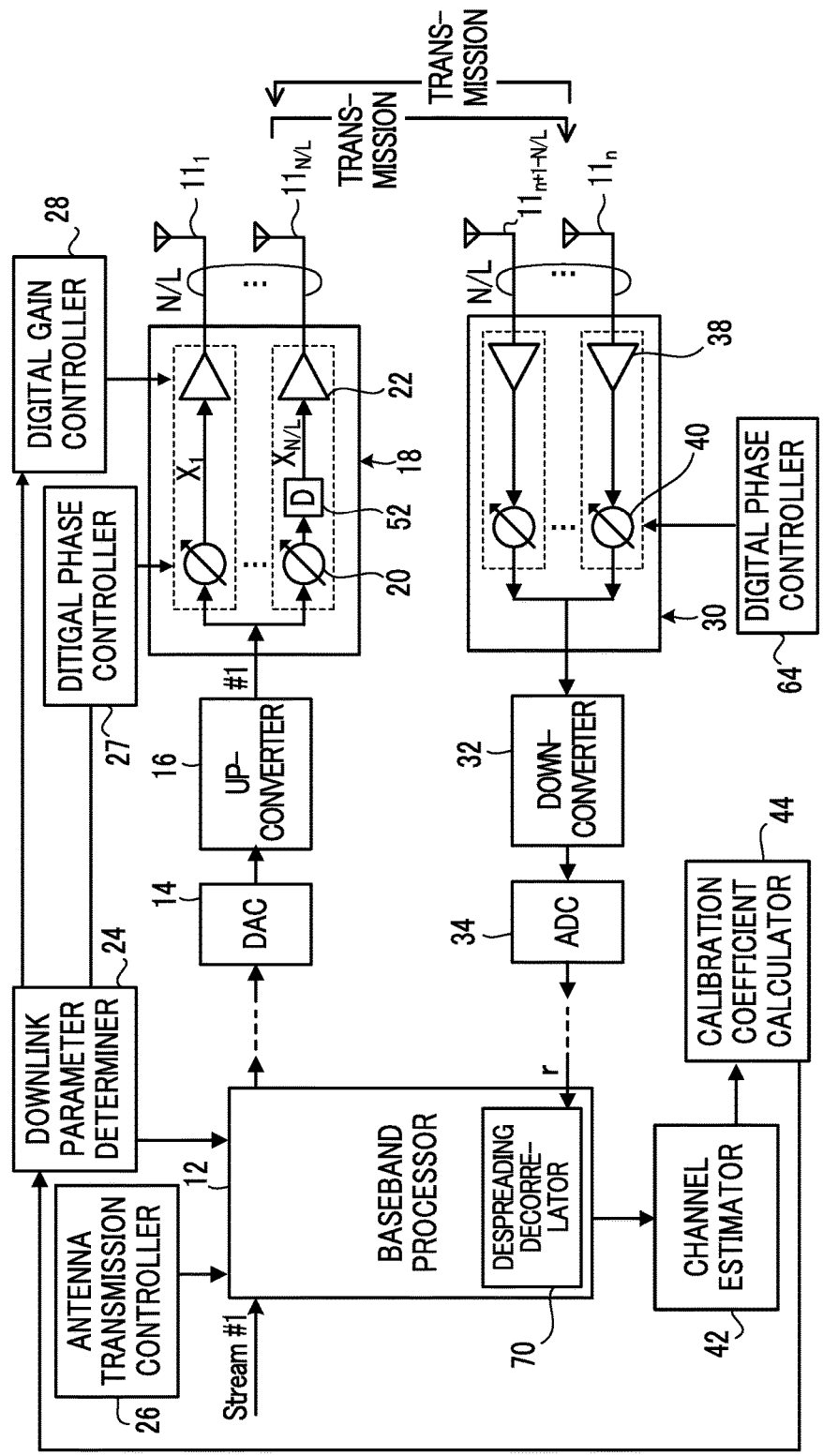
FIG. 20 shows a block diagram illustrating a configuration of a radio base station according to a fifth embodiment of the present invention.

FIG. 20 shows a configuration of a radio base station 10 according to the fifth embodiment of the present invention. FIG. 20 shows only one branch in the analog beamformer 18 (corresponding to one antenna group) and another branch in the uplink signal processor 30 (corresponding to another antenna group) for the purposes of illustration. However, in reality, the analog beamformer 18 includes L branches corresponding to L antenna groups, and the uplink signal processor 30 includes L branches corresponding to L antenna groups.

In this embodiment, in the first time period, the antenna transmission controller 26 causes the transceiving antenna elements (e.g., transceiving antenna elements $11_1$ to $11_{N/L}$) alone belonging to the reference antenna group, which is one of L antenna groups, to transmit radio pilot signals. The channel estimator 42 estimates effective channel coefficients based on the pilot signals received by transceiving antenna elements belonging to the calibration target antenna groups. In addition, in the second time period different from the first time period (the second time period may be before or after the first time period), the antenna transmission controller 26 causes the transceiving antenna elements alone belonging to a calibration target antenna group to transmit radio pilot signals. The channel estimator 42 estimates effective channel coefficients based on the pilot signals received by the transceiving antenna elements belonging to the reference antenna group. The calibration coefficient calculator 44 calculates calibration coefficients from the effective channel coefficients estimated in the first time period and the effective channel coefficients estimated in the second time period.

After pilot signals are transmitted from transceiving antenna elements belonging to an antenna group and are received by other transceiving antenna elements belonging to another antenna group, preferably it is identifiable as to which of the transceiving antenna elements transmitted each pilot signal. Additionally, after pilot signals are received by transceiving antenna elements belonging to an antenna group, preferably it is identifiable as to which of the transceiving antenna elements received each pilot signal.

Thus, the radio base station 10 according to this embodiment includes: a sequence supplier that, when transceiving antenna elements belonging to one antenna group transmit pilot signals in the first time period and the second time period, gives the same sequences to signals to be supplied to the sub-branches corresponding to the transceiving antenna elements; and a delay applier that, when transceiving antenna elements belonging to one antenna group transmit pilot signals in the first time period and the second time period, makes transmission timings of the pilot signals different.

The sequence supplier may be a baseband processor 12. The baseband processor (sequence supplier) 12 supplies sequences with high auto-correlation and low cross-correlation to the DAC 14 as a basis for pilot signals. Such sequences may be PN (pseudonoise) sequences or Zadoff-Chu sequences, for example.

The delay applier may be implemented by one or more delayers 52 or may be implemented with cables having different length with each other in the transmitting-side sub-branches. By means of the operation of the delay applier, when transceiving antenna elements belonging to one antenna group transmit pilot signals, the antenna elements transmit a sequence with different delays.

In addition, the radio base station 10 according to this embodiment includes a digital phase controller (receiving-side phase controller) 64 that, when sub-branches belonging to one branch in the uplink signal processor 30 process pilot signals in the first time period and the second time period, makes the phases of the pilot signals processed by these sub-branches different.

The digital phase controller 64 is a functional block that is implemented by a DSP executing a computer program stored in a storage unit (not illustrated) and functioning in accordance with the computer program. The digital phase controller 64 adjusts the phase of the variable phase shifter 40 for reception beamforming in usual uplink reception, and adjusts the phase to be given by the variable phase shifter 40 to make the phases of received pilot signals different in antenna calibration. In antenna calibration, the digital phase controller (receiving-side phase controller) 64 adjusts the phase of the variable phase shifter 40 such that, for example, a pilot signal for the receiving-side sub-branch corresponding to a particular antenna element is configured to [1, 1, 1, 1] and a pilot signal for the receiving-side sub-branch corresponding to another antenna element is configured to [1, 1, −1, −1]. The digital phase controller 64 thereby orthogonalizes (i.e., spreads) these pilot signals for these sub-branches.

Furthermore, in this embodiment, the baseband processor 12 includes a despreading decorrelator 70. The despreading decorrelator 70 performs an inverse operation (namely, dispreading) of the variable phase shifters 40 spreading pilot signals as a result of the operation of the digital phase controller (receiving-side phase controller) 64, and decorrelates received pilot signals with sequences supplied by the baseband processor (sequence supplier) 12 upon transmission of the pilot signals.

Therefore, by means of the different transmitting-side delays of pilot signals and the receiving-side decorrelation by the despreading decorrelator 70, it is possible, after pilot signals are simultaneously transmitted from transceiving antenna elements belonging to one antenna group and are then received by other transceiving antenna elements belonging to other antenna groups, to identify which of the transceiving antenna elements transmitted each pilot signal. In addition, by means of the spreading of pilot signals by the receiving-side digital phase controller (receiving-side phase controller) 64 and the despreading of pilot signals by the receiving-side despreading decorrelator 70, it is possible, after pilot signals are received by transceiving antenna elements belonging to one antenna group, to identify which of the transceiving antenna elements received each pilot signal.

Operations of the baseband processor 12 and components other than the delay applier, the digital phase controller 64, and the despreading decorrelator 70 are the same as those of the radio base station 10 that is described above with reference to FIGS. 8 to 10 and that serves as a basis for the embodiments. The same reference signs are used in FIG. 20 to denote the same components. In addition, in FIG. 20, each sub-branch is surrounded by a dotted-line rectangle.

The flowchart illustrating the process for self-calibration according to the fifth embodiment may be the same as FIG. 18, which shows a flowchart illustrating the process for self-calibration according to the third embodiment. However, in the fifth embodiment, the digital phase controller 27 does not give different phases to the sub-branches in each antenna group in the performance of self-calibration, and the digital phase controller 64 does not give different phases to the sub-branches in each antenna group.

The calibration coefficient calculator 44 supplies the calculated calibration coefficients to the downlink parameter determiner 24. The downlink parameter determiner 24 controls at least one of digital precoding or analog transmission beamforming based on these calibration coefficients as in the first embodiment.

In this embodiment, after pilot signals are transmitted from transceiving antenna elements that belong to one antenna group and are then received by transceiving antenna elements that belong to another antenna group, it is identifiable as to which of the transceiving antenna elements transmitted each pilot signal. Furthermore, after pilot signals are received by transceiving antenna elements that belong to one antenna group, it is identifiable as to which of the transceiving antenna elements received each pilot signal. Therefore, it is possible to easily calculate calibration coefficients for transceiving antenna elements using self-calibration for antenna calibration in a TDD mobile communication system.

Figure 21:
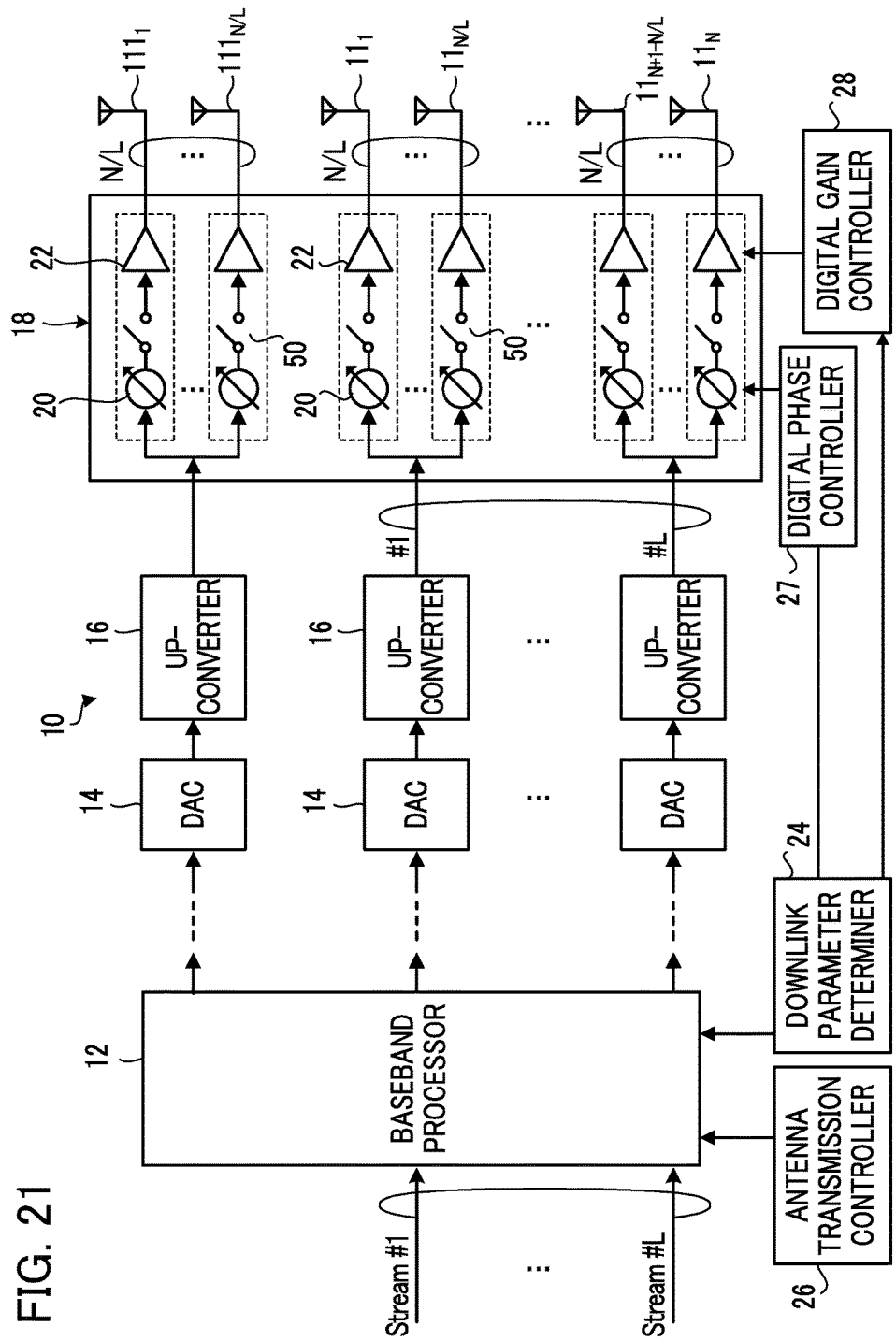
FIG. 21 shows a block diagram illustrating transmission-related portions of a radio base station according to a sixth embodiment of the present invention.
Figure 22:
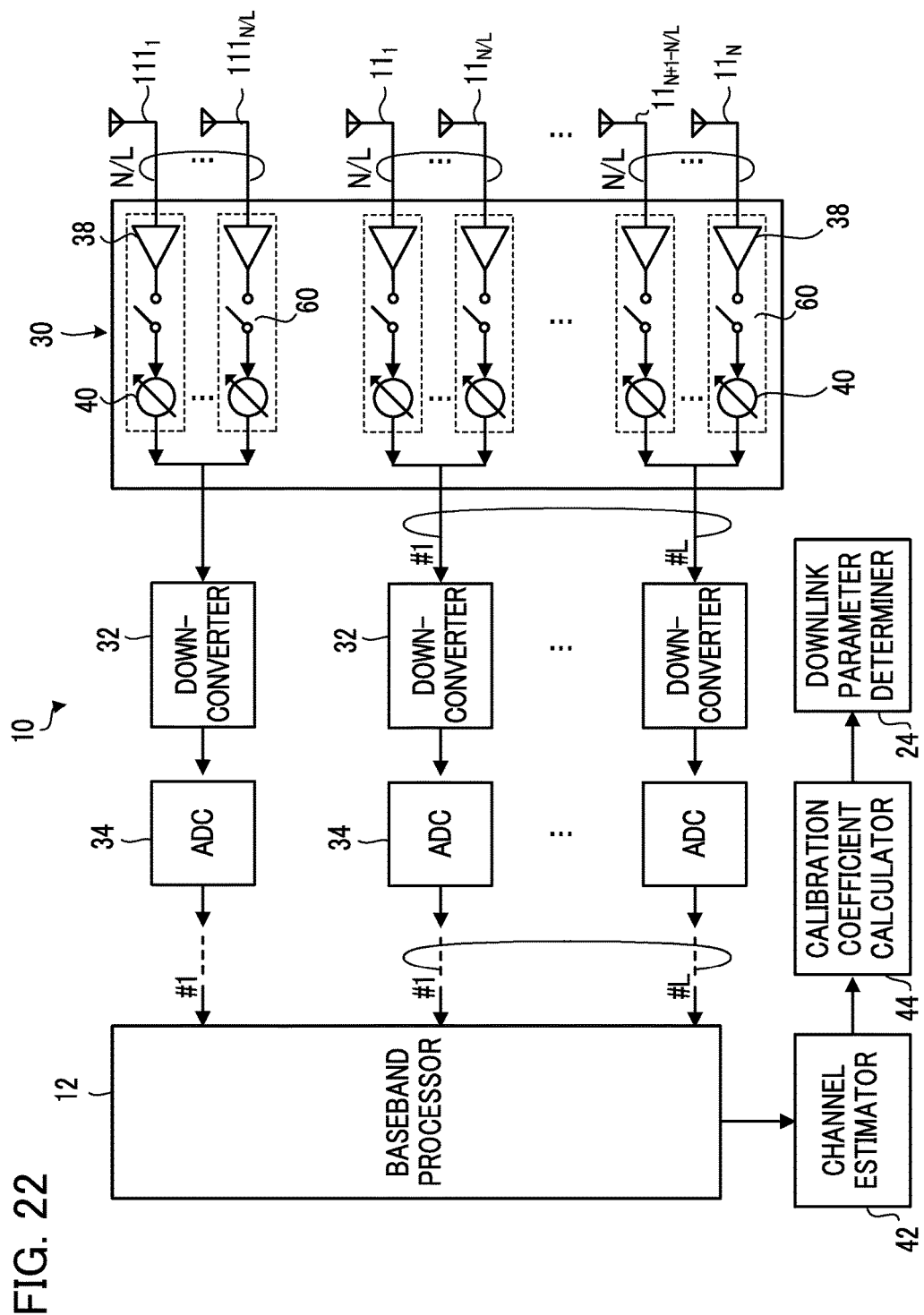
FIG. 22 shows a block diagram illustrating mainly reception-related portions of the radio base station according to the sixth embodiment of the present invention.

In Massive MIMO, when a radio base station actually performs downlink transmission while performing beamforming, radio waves are simultaneously emitted from transceiving antenna elements belonging to one antenna group. Accordingly, electric current flows into sub-branches in one branch corresponding to one antenna group and electromagnetic coupling is caused. In this embodiment, because pilot signals are simultaneously transmitted from the transceiving antenna elements belonging to one antenna group in the performance of antenna calibration, it is possible to calculate calibration coefficients reflecting the influence of electromagnetic coupling. Furthermore, since transmitting-side switches 50 are not provided in the transmitting-side sub-branches, it is possible to simplify the structure as well as the control of the components. Furthermore, since receiving-side switches 60 are not provided in the receiving-side sub-branches, it is possible to simplify the structure as well as the control of the components. As is clear when comparing FIG. 18 with FIG. 12, it is unnecessary to have a step to switch antenna elements that transmit pilot signals and a step to switch antenna elements that receive pilot signals. Consequently, it is possible to simplify the process Sixth Embodiment FIGS. 21 and 22 show a configuration of a radio base station 10 according to the sixth embodiment of the present invention. FIG. 21 shows only portions relevant to transmission, and FIG. 22 shows portions mainly relevant to reception. The sixth embodiment is a modification of the first embodiment. In addition to the transceiving antenna element $11_1$ to $11_N$ for communication (communication transceiving antenna elements), the radio base station 10 includes antenna calibration reference transceiving antenna elements $111_1$ to $111_{N/L}$ to transmit and receive pilot signals for antenna calibration. In the illustrated embodiment, the radio base station 10 includes N/L number of antenna calibration reference transceiving antenna elements. However, the number of antenna calibration reference transceiving antenna elements is not limited to this example and may be one.

In transmission of pilot signals from calibration reference transceiving antenna elements for antenna calibration, pilot signals are converted into analog signals by the DAC 14 and up-converted by the up-converters 16, and their phases and amplitudes are adjusted by the variable phase shifters 20 and the power amplifiers 22 in the analog beamformer 18 for the antenna calibration reference transceiving antenna elements $111_1$ to $111_{N/L}$. The pilot signals are then transmitted by the antenna calibration reference transceiving antenna elements $111_1$ to $111_{N/L}$ (refer to FIG. 21). The pilot signals transmitted from the calibration reference transceiving antenna elements are received by the communication transceiving antenna elements $11_1$ to $11_N$.

Pilot signals transmitted from the communication transceiving antenna elements $11_1$ to $11_N$ for antenna calibration are received by the antenna calibration reference transceiving antenna elements $111_1$ to $111_{N/L}$. Amplitudes and phases of the pilot signals received by the antenna calibration reference transceiving antenna elements $111_1$ to $111_{N/L}$ are adjusted by low-noise receiving amplifiers 38 and variable phase shifters 40. Then, the pilot signals are down-converted by down-converters 32 and converted into analog signals by ADC 34 so as to be supplied to the baseband processor 12. Other components are the same as those of the radio base station 10 in the first embodiment. The same reference signs are used in FIGS. 21 and 22 to denote the same components.

Figure 23:
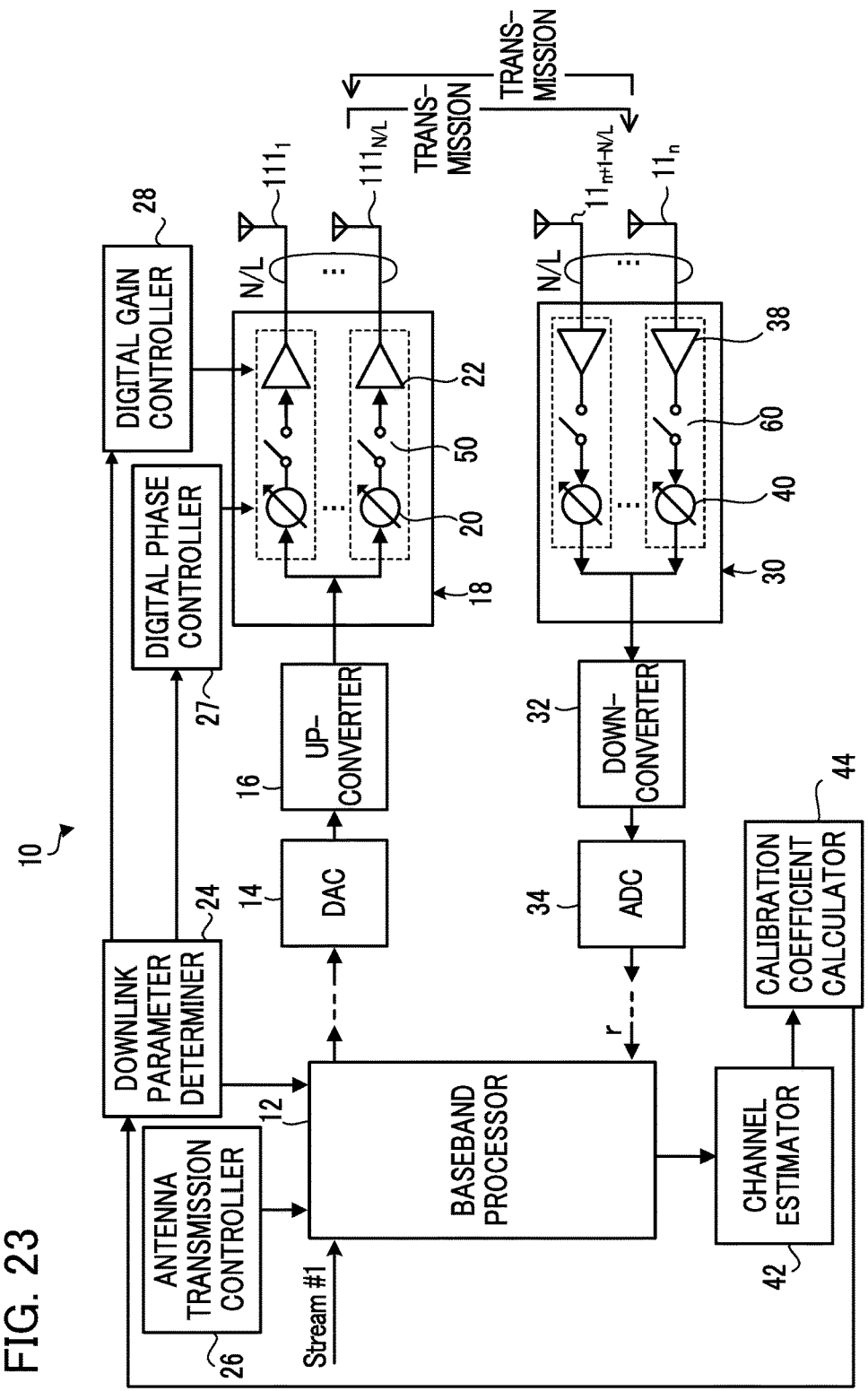
FIG. 23 shows a block diagram illustrating a configuration of the radio base station according to the sixth embodiment of the present invention.

FIG. 23 shows a configuration of the radio base station 10 according to the sixth embodiment of the present invention. For the purposes of illustration, FIG. 23 shows only one branch in the analog beamformer 18 (corresponding to the antenna calibration reference transceiving antenna elements $111_1$ to $111_{N/L}$) and another branch in the uplink signal processor 30 (corresponding to one antenna group of the communication transceiving antenna elements). However, in reality, the analog beamformer 18 includes L branches corresponding to L antenna groups of the communication transceiving antenna elements and one branch corresponding to the antenna calibration reference transceiving antenna elements. In addition, the uplink signal processor 30 includes L branches corresponding to L antenna groups of the communication transceiving antenna elements and one branch corresponding to the antenna calibration reference transceiving antenna elements.

In this embodiment, in the first time period, the antenna transmission controller 26 causes the antenna calibration reference transceiving antenna elements $111_1$ to $111_{N/L}$ alone to transmit radio pilot signals. The channel estimator 42 estimates channel coefficients based on the pilot signals received by the communication transceiving antenna elements 11. In addition, in a second time period different from the first time period (the second time period may be before or after the first time period), the antenna transmission controller 26 causes the communication transceiving antenna elements 11 alone to transmit radio pilot signals. The channel estimator 42 estimates channel coefficients based on the pilot signals received by the antenna calibration reference transceiving antenna elements $111_1$ to $111_{N/L}$. The calibration coefficient calculator 44 calculates calibration coefficients from the channel coefficients estimated in the first time period and the channel coefficients estimated in the second time period.

After pilot signals are transmitted from the antenna calibration reference transceiving antenna elements $111_1$ to $111_{N/L}$ and are received by communication transceiving antenna elements 11, it is preferably identifiable as to which of the antenna calibration reference transceiving antenna elements 111 transmitted each pilot signal. Additionally, after pilot signals are received by the antenna calibration reference transceiving antenna elements $111_1$ to $111_{N/L}$, it is preferably identifiable as to which of the antenna calibration reference transceiving antenna elements 111 received each pilot signal. Furthermore, after pilot signals are transmitted from communication transceiving antenna elements 11 belonging to one antenna group and are received by the antenna calibration reference transceiving antenna elements $111_1$ to $111_{N/L}$, it is preferably identifiable as to which of the communication transceiving antenna elements 11 transmitted each pilot signal. Additionally, after pilot signals are received by communication transceiving antenna elements 11 belonging to one antenna group, it is preferably identifiable as to which of these communication transceiving antenna elements 11 belonging to one antenna group received each pilot signal.

Thus, in this embodiment, the analog beamformer 18 includes transmitting-side switches 50 that, when one of the antenna calibration reference transceiving antenna elements $111_1$ to $111_{N/L}$ transmits pilot signals in the first time period, prevent other antenna calibration reference transceiving antenna elements from transmitting pilot signals. Moreover, the uplink signal processor 30 includes receiving-side switches 60 that, when one sub-branch belonging to one branch in the uplink signal processor 30 processes pilot signals in the first time period, prevent other sub-branches belonging to that branch from processing the pilot signals. In addition, in this embodiment, the analog beamformer 18 includes transmitting-side switches 50 that, when one transceiving antenna element belonging to one antenna group transmits pilot signals in the second time period, prevent other transceiving antenna elements belonging to that antenna group from transmitting pilot signals, and the uplink signal processor 30 includes receiving-side switches 60 that, when one sub-branch corresponding to one antenna calibration reference transceiving antenna element 111 in the uplink signal processor 30 processes pilot signals in the second time period, prevent other sub-branches corresponding to other antenna calibration reference transceiving antenna elements from processing the pilot signals.

A flowchart illustrating the process for self-calibration according to the sixth embodiment is similar to that of FIG. 12, which shows a flowchart illustrating the process for self-calibration according to the first embodiment. It is noted that the "reference antenna group" in FIG. 12 is replaced with "antenna calibration reference transceiving antenna elements $111_1$ to $111_{N/L}$", and "calibration target antenna group" in FIG. 12 is replaced with "antenna group of communication transceiving antenna elements 11." In the sixth embodiment, all the communication transceiving antenna elements 11 are subject to antenna calibration.

In this embodiment, if the number of antenna calibration reference transceiving antenna elements 111 is one, there is no need for a transmitting-side switch 50 and a receiving-side switch 60 corresponding to the antenna calibration reference transceiving antenna element 111.

Seventh Embodiment

Figure 24:
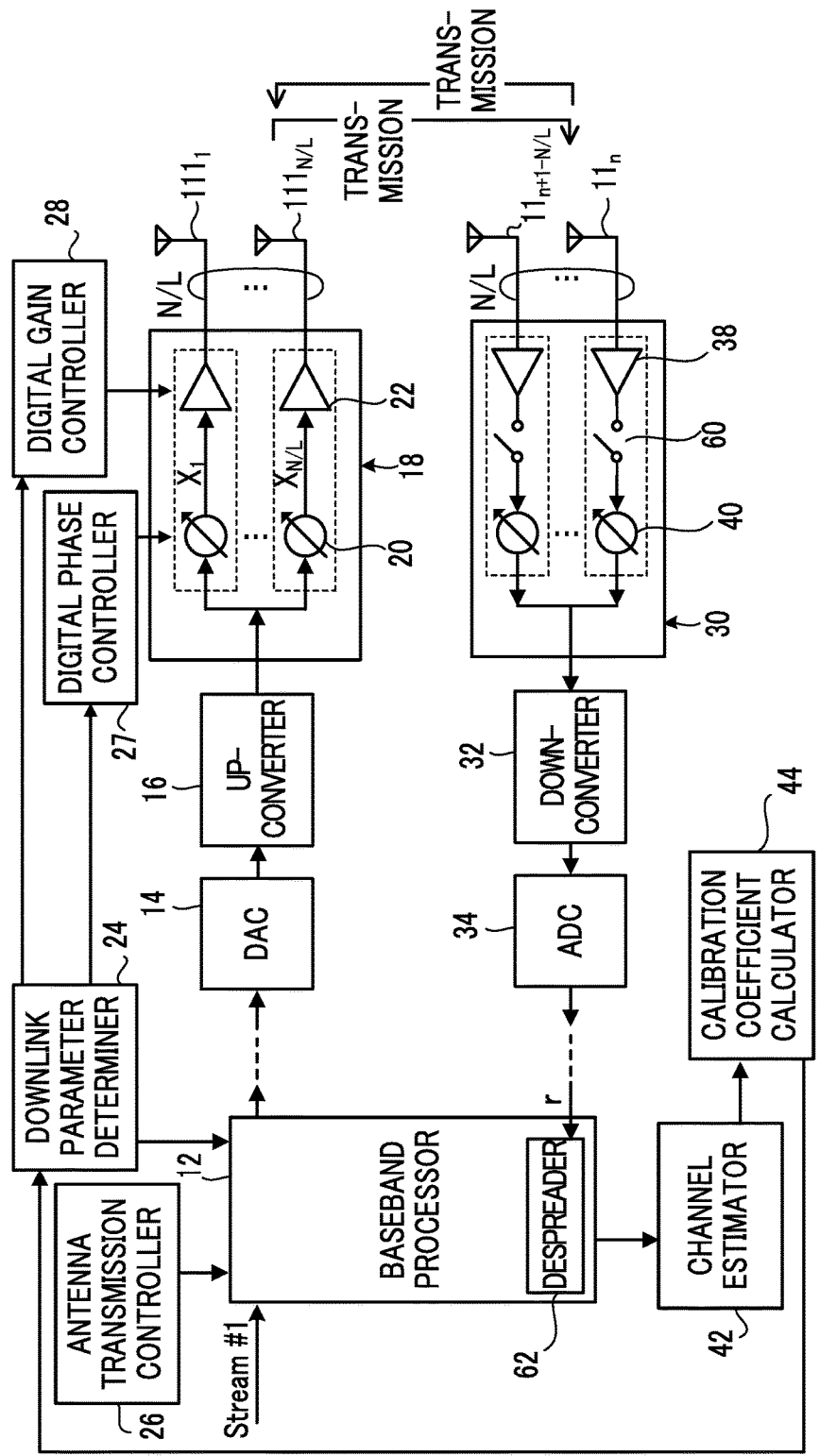
FIG. 24 shows a block diagram illustrating a configuration of a radio base station according to a seventh embodiment of the present invention.

FIG. 24 shows a configuration of a radio base station 10 according to the seventh embodiment of the present invention. For the purposes of illustration, FIG. 24 shows only one branch in the analog beamformer 18 (corresponding to the antenna caliration reference transceiving antenna elements $111_1$ to $111_{N/L}$) and another branch in the uplink signal processor 30 (corresponding to one antenna group of the communication transceiving antenna elements). However, in reality, the analog beamformer 18 includes L branches corresponding to L antenna groups of the communication transceiving antenna elements and one branch corresponding to the antenna calibration reference transceiving antenna elements. In addition, the uplink signal processor 30 includes L branches corresponding to L antenna groups of the communication transceiving antenna elements and one branch corresponding to the antenna calibration reference transceiving antenna elements.

In this embodiment, in the first time period, the antenna transmission controller 26 causes the antenna calibration reference transceiving antenna elements $111_1$ to $111_{N/L}$ alone to transmit radio pilot signals. The channel estimator 42 estimates channel coefficients based on the pilot signals received by the communication transceiving antenna elements 11. In addition, in a second time period different from the first time period (the second time period may be before or after the first time period), the antenna transmission controller 26 causes the communication transceiving antenna elements 11 alone to transmit radio pilot signals. The channel estimator 42 estimates channel coefficients based on the pilot signals received by the antenna calibration reference transceiving antenna elements $111_1$ to $111_{N/L}$. The calibration coefficient calculator 44 calculates calibration coefficients from the channel coefficients estimated in the first time period and the channel coefficients estimated in the second time period.

After pilot signals are transmitted from the antenna calibration reference transceiving antenna elements $111_1$ to $111_{N/L}$ and are received by communication transceiving antenna elements 11, it is preferably identifiable as to which of the antenna calibration reference transceiving antenna elements 111 transmitted each pilot signal. Additionally, after pilot signals are received by the antenna calibration reference transceiving antenna elements $111_1$ to $111_{N/L}$, it is preferably identifiable as to which of the antenna calibration reference transceiving antenna elements 111 received each pilot signal. Furthermore, after pilot signals are transmitted from communication transceiving antenna elements 11 belonging to one antenna group and are received by the antenna calibration reference transceiving antenna elements $111_1$ to $111_{N/L}$, it is preferably identifiable as to which of the communication transceiving antenna elements 11 transmitted each pilot signal. Additionally, after pilot signals are received by communication transceiving antenna elements 11 belonging to one antenna group, it is preferably identifiable as to which of these communication transceiving antenna elements 11 belonging to one antenna group received each pilot signal.

Thus, the radio base station 10 according to this embodiment includes a transmitting-side phase controller that, when the antenna calibration reference transceiving antenna elements $111_1$ to $111_{N/L}$ transmit pilot signals in the first time period, makes phases of these pilot signals to be transmitted from the antenna calibration reference transceiving antenna elements different. In addition, the radio base station 10 according to this embodiment includes the transmitting-side phase controller that, when communication transceiving antenna elements 11 belonging to one antenna group transmit pilot signals in the second time period, makes phases of these pilot signals to be transmitted from these transceiving antenna elements different. The transmitting-side phase controller may be a digital phase controller 27. The digital phase controller 27 adjusts the phases of the variable phase shifters 20 for analog transmission beamforming in usual downlink transmission, and adjusts the phases to be given by the variable phase shifters 20 to make the phases of pilot signals different in antenna calibration. In antenna calibration, the digital phase controller (transmitting-side phase controller) 27 adjusts variable phase shifters 20 such that, for example, the phase of a pilot signal $X_1$ for the sub-branch corresponding to the antenna element $111_1$ is configured to [1, 1], and the phase of a pilot signal $X_2$ for the sub-branch corresponding to the antenna element $111_2$ is configured to [1, −1]. The digital phase controller 27 thereby orthogonalizes (i.e., spreads) these pilot signals for these sub-branches.

In addition, in this embodiment, each sub-branch in the uplink signal processor 30 includes a receiving-side switch 60 that, when one sub-branch belonging to one branch in the uplink signal processor 30 processes pilot signals in the first time period and the second time period, prevents other sub-branches belonging to this branch from processing the pilot signals. Furthermore, in this embodiment, the baseband processor 12 includes a despreader 62. The despreader 62 performs an inverse operation (namely, despreading) of the variable phase shifters 20 spreading pilot signals as a result of the operation by the digital phase controller (transmitting-side phase controller) 27.

Therefore, by means of the spreading of pilot signals by the transmitting-side digital phase controller (transmitting-side phase controller) 27 and the despreading of the pilot signals by the receiving-side despreader 62, it is possible, after pilot signals are simultaneously transmitted from transceiving antenna elements (communication transceiving antenna elements 11 or antenna calibration reference transceiving antenna elements 111) belonging to one antenna group and are then received by other transceiving antenna elements belonging to another antenna group, to identify which of the transceiving antenna elements transmitted each pilot signal. By means of an operation of the receiving-side switches 60 at the receiving-side for pilot signals, after pilot signals are received by transceiving antenna elements belonging to one antenna group, it is possible to identify which of the transceiving antenna elements received each pilot signal.

A flowchart illustrating the process for self-calibration according to the seventh embodiment is similar to that of FIG. 15, which shows a flowchart illustrating the process for self-calibration according to the second embodiment. However, "reference antenna group" in FIG. 15 is replaced with "antenna calibration reference transceiving antenna elements $111_1$ to $111_{N/L}$", and "calibration target antenna group" in FIG. 15 is replaced with "antenna group of communication transceiving antenna elements 11." In the seventh embodiment, all the communication transceiving antenna elements 11 are subject to antenna calibration.

In this embodiment, if the number of antenna calibration reference transceiving antenna elements 111 is one, there is no need for a transmitting-side phase controller or a receiving-side switch 60 for this antenna calibration reference transceiving antenna element 111. In addition, there is no need for a despreader 62 in reception processing of pilot signals transmitted from the antenna calibration reference transceiving antenna element 111.

Eighth Embodiment

Figure 25:
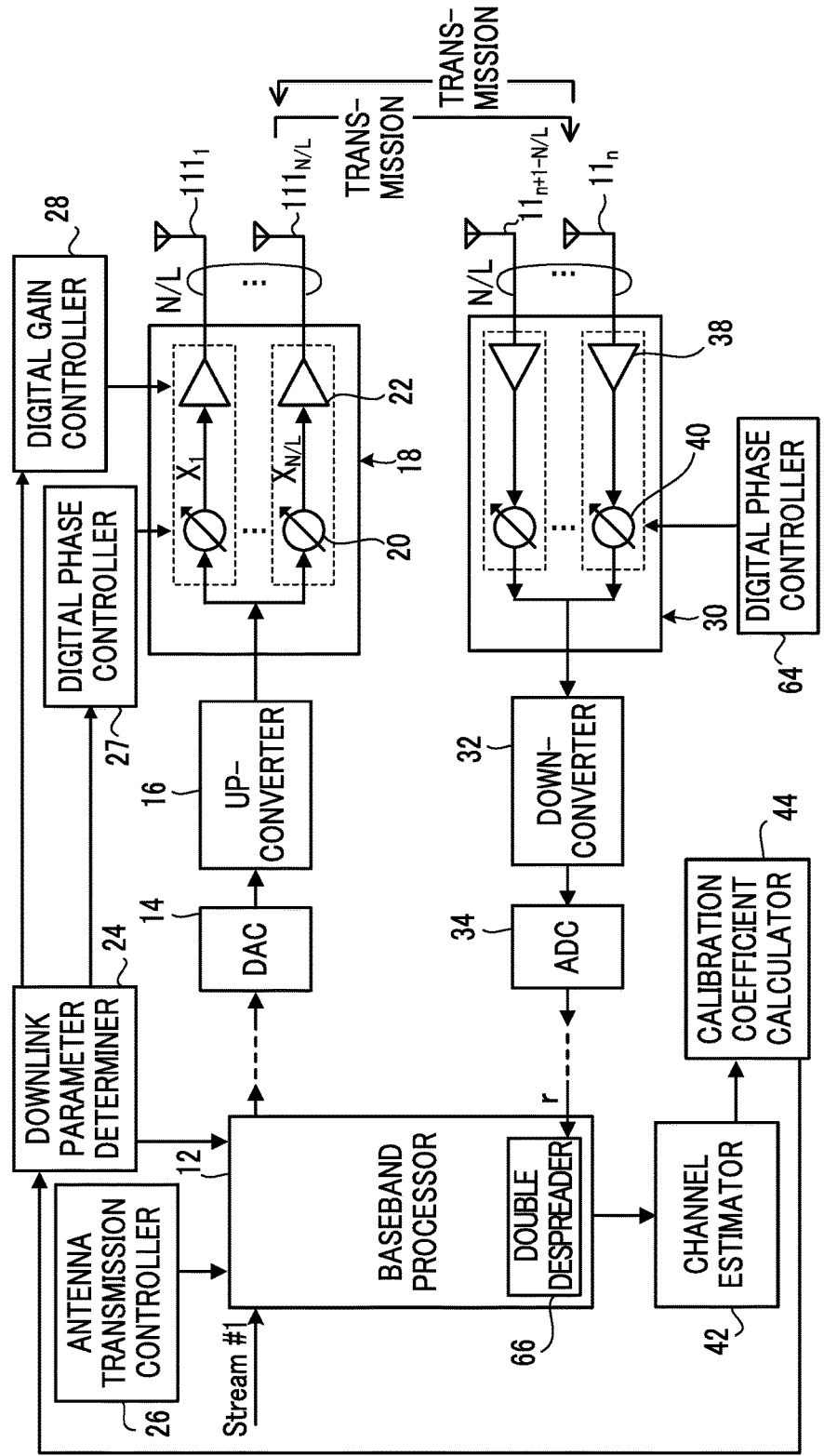
FIG. 25 shows a block diagram illustrating a configuration of a radio base station according to an eighth embodiment of the present invention.

FIG. 25 shows a configuration of a radio base station 10 according to the eighth embodiment of the present invention. For the purposes of illustration, FIG. 25 shows only one branch in the analog beamformer 18 (corresponding to the antenna calibration reference transceiving antenna elements $111_1$ to $111_{N/L}$) and another branch in the uplink signal processor 30 (corresponding to one antenna group of the communication transceiving antenna elements). However, in reality, the analog beamformer 18 includes L branches corresponding to L antenna groups of the communication transceiving antenna elements and one branch corresponding to the antenna calibration reference transceiving antenna elements. In addition, the uplink signal processor 30 includes L branches corresponding to L antenna groups of the communication transceiving antenna elements and one branch corresponding to the antenna calibration reference transceiving antenna elements.

In this embodiment, in the first time period, the antenna transmission controller 26 causes the antenna calibration reference transceiving antenna elements $111_1$ to $111_{N/L}$ alone to transmit radio pilot signals. The channel estimator 42 estimates effective channel coefficients based on the pilot signals received by the communication transceiving antenna elements 11. In addition, in a second time period different from the first time period (the second time period may be before or after the first time period), the antenna transmission controller 26 causes the communication transceiving antenna elements 11 alone to transmit radio pilot signals. The channel estimator 42 estimates effective channel coefficients based on the pilot signals received by the antenna calibration reference transceiving antenna elements $111_1$ to $111_{N/L}$. The calibration coefficient calculator 44 calculates calibration coefficients from the effective channel coefficients estimated in the first time period and the effective channel coefficients estimated in the second time period.

After pilot signals are transmitted from the antenna calibration reference transceiving antenna elements $111_1$ to $111_{N/L}$ and are received by communication transceiving antenna elements 11, it is preferably identifiable as to which of the antenna calibration reference transceiving antenna elements 111 transmitted each pilot signal. Additionally, after pilot signals are received by the antenna calibration reference transceiving antenna elements $111_1$ to $111_{N/L}$, it is preferably identifiable as to which of the antenna calibration reference transceiving antenna elements 111 received each pilot signal. Furthermore, after pilot signals are transmitted from communication transceiving antenna elements 11 belonging to one antenna group and are received by the antenna calibration reference transceiving antenna elements $111_1$ to $111_{N/L}$, it is preferably identifiable as to which of the communication transceiving antenna elements 11 transmitted each pilot signal. Additionally, after pilot signals are received by communication transceiving antenna elements 11 belonging to one antenna group, it is preferably identifiable as to which of these communication transceiving antenna elements 11 belonging to one antenna group received each pilot signal.

Thus, the radio base station 10 according to this embodiment includes a transmitting-side phase controller that, when the antenna calibration reference transceiving antenna elements $111_1$ to $111_{N/L}$ transmit pilot signals in the first time period, spreads the pilot signals to be transmitted from these antenna calibration reference transceiving antenna elements with different first orthogonal-spreading sequences (short codes), and that, when communication transceiving antenna elements 11 belonging to one antenna group transmit pilot signals in the second time period, spreads the pilot signals to be transmitted from these transceiving antenna elements with different first orthogonal-spreading sequences. In addition, the radio base station 10 according to this embodiment includes a digital phase controller (receiving-side phase controller) 64 that, when sub-branches belonging to one branch in the uplink signal processor 30 process pilot signals in the first time period and the second time period, spreads the pilot signals processed by these sub-branches with different second orthogonal-spreading sequences (long codes). The transmitting-side phase controller may be a digital phase controller 27 as in the third embodiment.

Furthermore, in this embodiment, the baseband processor 12 includes a double despreader 66. The double despreader 66 executes an inverse operation (namely, despreading long codes) of the variable phase shifters 40 spreading pilot signals as a result of the operation of the receiving-side digital phase controller (receiving-side phase controller) 64, and executes an inverse operation (namely, despreading short codes) of the variable phase shifters 20 spreading pilot signals as a result of the operation of the transmitting-side digital phase controller (transmitting-side phase controller) 27. In other words, the double despreader 66 performs double despreading.

Accordingly, by means of the spreading of pilot signals by the transmitting-side digital phase controller (transmitting-side phase controller) 27 and the short-code despreading of the pilot signals by the receiving-side double despreader 66, it is possible, after pilot signals are simultaneously transmitted from transceiving antenna elements (communication transceiving antenna elements 11 or antenna calibration reference transceiving antenna elements 111) belonging to one antenna group and are then received by other transceiving antenna elements belonging to another antenna group, to identify which of the transceiving antenna elements transmitted each pilot signal. By means of the spreading of pilot signals by the receiving-side digital phase controller (receiving-side phase controller) 64 and the long-code despreading of the pilot signals by the receiving-side double despreader 66, it is possible, after pilot signals are received by transceiving antenna elements belonging to one antenna group, to identify which of the transceiving antenna elements received each pilot signal.

A flowchart illustrating the process for self-calibration according to the eighth embodiment is similar to that of FIG. 18, which shows a flowchart illustrating the process for self-calibration according to the third embodiment. However, "reference antenna group" in FIG. 18 is replaced with "antenna calibration reference transceiving antenna elements $111_1$ to $111_{N/L}$", and "calibration target antenna group" in FIG. 18 is replaced with "antenna group of communication transceiving antenna elements 11." In the eighth embodiment, all the communication transceiving antenna elements 11 are subject to antenna calibration.

In this embodiment, if the number of antenna calibration reference transceiving antenna elements 111 is one, there is no need for a transmitting-side phase controller or a receiving-side phase controller for this antenna calibration reference transceiving antenna element 111, there is no need for short-code despreading by the double despreader 66 in the reception processing of pilot signals transmitted from the antenna calibration reference transceiving antenna element 111, and there is no need for long-code despreading by the double despreader 66 in the reception processing of pilot signals received by the antenna calibration reference transceiving antenna element 111.

Ninth Embodiment

Figure 26:
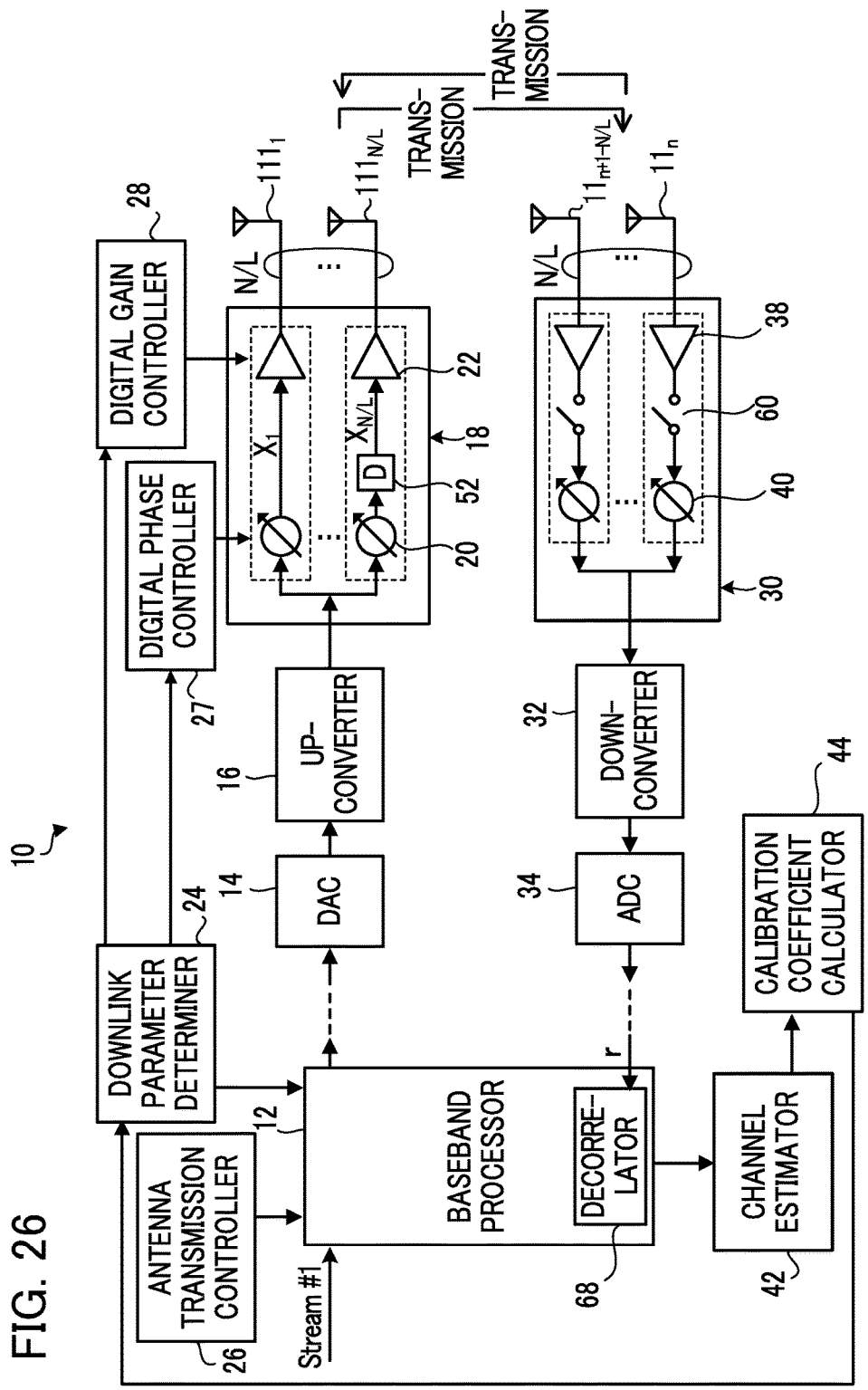
FIG. 26 shows a block diagram illustrating a configuration of a radio base station according to a ninth embodiment of the present invention.

FIG. 26 shows a configuration of a radio base station 10 according to the ninth embodiment of the present invention. For the purposes of illustration, FIG. 26 shows only one branch in the analog beamformer 18 (corresponding to the antenna calibration reference transceiving antenna elements $111_1$ to $111_{N/L}$) and another branch in the uplink signal processor 30 (corresponding to one antenna group of the communication transceiving antenna elements). However, in reality, the analog beamformer 18 includes L branches corresponding to L antenna groups of the communication transceiving antenna elements and one branch corresponding to the antenna calibration reference transceiving antenna elements. In addition, the uplink signal processor 30 includes L branches corresponding to L antenna groups of the communication transceiving antenna elements and one branch corresponding to the antenna calibration reference transceiving antenna elements.

In this embodiment, in the first time period, the antenna transmission controller 26 causes the antenna calibration reference transceiving antenna elements $111_1$ to $111_{N/L}$ alone to transmit radio pilot signals. The channel estimator 42 estimates channel coefficients based on the pilot signals received by the communication transceiving antenna elements 11. In addition, in a second time period different from the first time period (the second time period may be before or after the first time period), the antenna transmission controller 26 causes the communication transceiving antenna elements 11 alone to transmit radio pilot signals. The channel estimator 42 estimates channel coefficients based on the pilot signals received by the antenna calibration reference transceiving antenna elements $111_1$ to $111_{N/L}$. The calibration coefficient calculator 44 calculates calibration coefficients from the channel coefficients estimated in the first time period and the channel coefficients estimated in the second time period.

After pilot signals are transmitted from the antenna calibration reference transceiving antenna elements $111_1$ to $111_{N/L}$ and are received by communication transceiving antenna elements 11, it is preferably identifiable as to which of the antenna calibration reference transceiving antenna elements 111 transmitted each pilot signal. Additionally, after pilot signals are received by the antenna calibration reference transceiving antenna elements $111_1$ to $111_{N/L}$, it is preferably identifiable as to which of the antenna calibration reference transceiving antenna elements 111 received each pilot signal. Furthermore, after pilot signals are transmitted from communication transceiving antenna elements 11 belonging to one antenna group and are received by the antenna calibration reference transceiving antenna elements $111_1$ to $111_{N/L}$, it is preferably identifiable as to which of the communication transceiving antenna elements 11 transmitted each pilot signal. Additionally, after pilot signals are received by communication transceiving antenna elements 11 belonging to one antenna group, it is preferably identifiable as to which of these communication transceiving antenna elements 11 belonging to one antenna group received each pilot signal.

Thus, the radio base station 10 according to this embodiment includes: a sequence supplier that, when the antenna calibration reference transceiving antenna elements $111_1$ to $111_{N/L}$ transmit pilot signals in the first time period, gives the same sequences to signals to be supplied to the sub-branches corresponding to the antenna calibration reference transceiving antenna elements; and a delay applier that, when the antenna calibration reference transceiving antenna elements $111_1$ to $111_{N/L}$ transmit pilot signals, makes transmission timings of the pilot signals different. In addition, the radio base station 10 according to this embodiment includes: the sequence supplier that, when communication transceiving antenna elements 11 belonging to one antenna group transmit pilot signals in the second time period, gives the same sequences to signals to be supplied to the sub-branches corresponding to these transceiving antenna elements; and the delay applier that, when communication transceiving antenna elements 11 belonging to one antenna group transmit pilot signals, makes transmission timing of the pilot signals different. The sequence supplier may be a baseband processor 12. The baseband processor (sequence supplier) 12 supplies sequences with high auto-correlation and low cross-correlation to the DAC 14 as a basis for pilot signals. Such sequences may be PN (pseudonoise) sequences or Zadoff-Chu sequences, for example. The delay applier may be implemented by one or more delayers 52 or may be implemented with cables having different length with each other in the transmitting-side sub-branches. By means of the operation of the delay applier, when transceiving antenna elements belonging to one antenna group transmit pilot signals, the antenna elements transmit a sequence with different delays.

In addition, in this embodiment, each sub-branch in the uplink signal processor 30 includes a receiving-side switch 60 that, when one sub-branch belonging to one branch in the uplink signal processor 30 processes pilot signals in the first time period and the second time period, prevents other sub-branches belonging to this branch from processing the pilot signals. Furthermore, in this embodiment, the baseband processor 12 includes a decorrelator 68. The decorrelator 68 decorrelates received pilot signals with the sequences supplied by the baseband processor (sequence supplier) 12 upon transmission of the pilot signals.

Therefore, by means of the different delays in pilot signals at the transmitting-side and the decorrelation of the pilot signals by the receiving-side decorrelator 68, it is possible, after pilot signals are simultaneously transmitted from transceiving antenna elements (communicating transceiving antenna element 11 or antenna calibration reference transceiving antenna element 111) belonging to one antenna group and are then received by other transceiving antenna elements belonging to another antenna group, to identify which of the transceiving antenna elements transmitted each pilot signal. By means of the operation of the receiving-side switches 60 at the receiving-side for pilot signals, it is possible, after pilot signals are received by transceiving antenna elements belonging to one antenna group, to identify which of the transceiving antenna elements received each pilot signal.

A flowchart illustrating the process for self-calibration according to the ninth embodiment is similar to that of FIG. 15, which shows a flowchart illustrating the process for self-calibration according to the second embodiment. It is noted that "reference antenna group" in FIG. 15 is replaced with "antenna calibration reference transceiving antenna elements $111_1$ to $111_{N/L}$", and "calibration target antenna group" in FIG. 15 is replaced with "antenna group of communication transceiving antenna elements 11." In the ninth embodiment, all the communication transceiving antenna elements 11 are subject to antenna calibration. In addition, in this embodiment, the digital phase controller 27 does not give different phases to the sub-branches of each antenna group in the performance of self-calibration.

In this embodiment, if the number of antenna calibration reference transceiving antenna elements 111 is one, there is no need for a delay applier or a receiving-side switch 60 for this antenna calibration reference transceiving antenna element 111, and there is no need for a decorrelator 68 in the reception processing of pilot signals transmitted from the antenna calibration reference transceiving antenna element 111.

Tenth Embodiment

Figure 27:
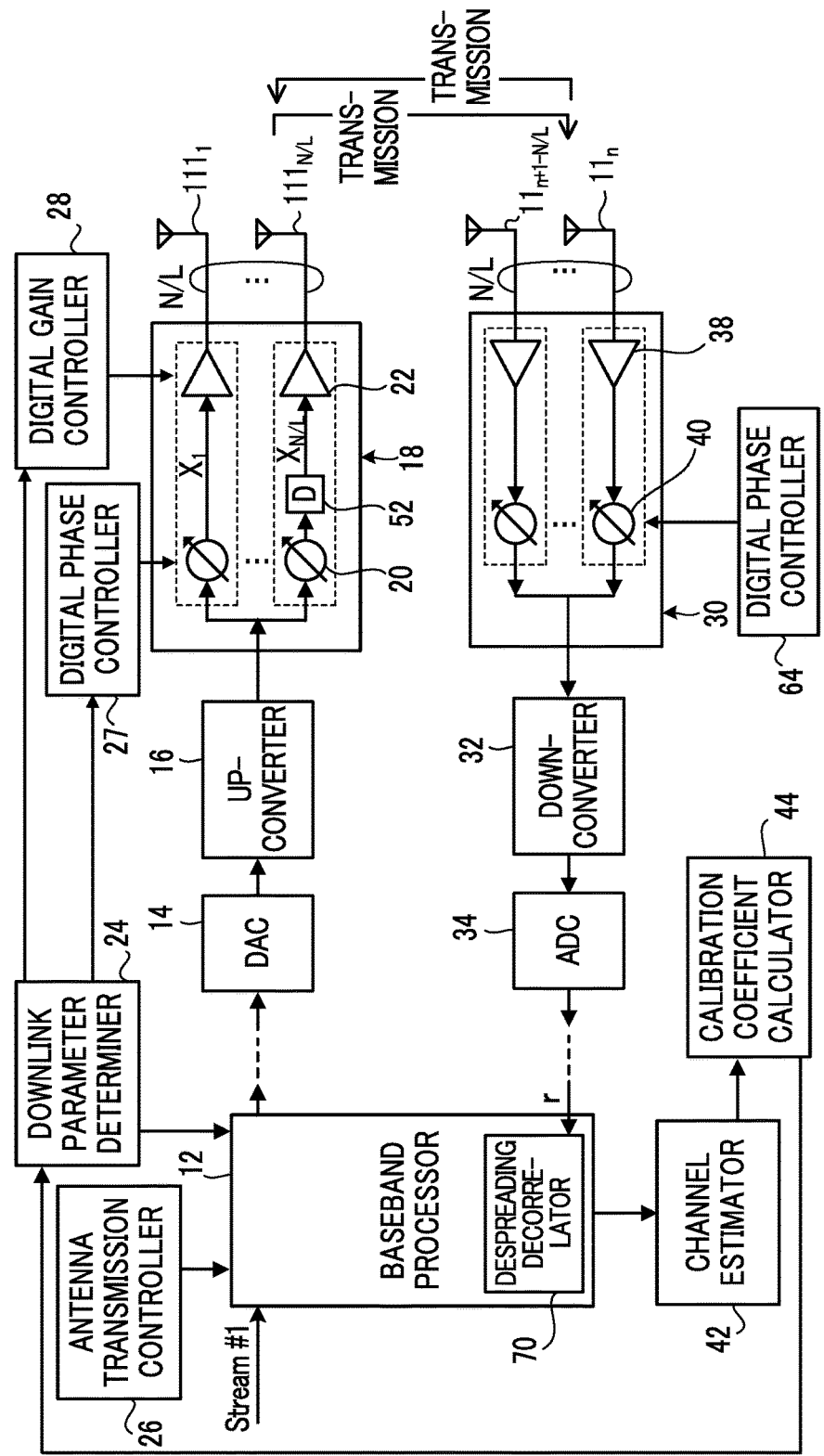
FIG. 27 shows a block diagram illustrating a configuration of a radio base station according to a tenth embodiment of the present invention.

FIG. 27 shows a configuration of a radio base station 10 according to the tenth embodiment of the present invention. For the purposes of illustration, FIG. 27 shows only one branch in the analog beamformer 18 (corresponding to the antenna calibration reference transceiving antenna elements $111_1$ to $111_{N/L}$) and another branch in the uplink signal processor 30 (corresponding to one antenna group of the communication transceiving antenna elements). However, in reality, the analog beamformer 18 includes L branches corresponding to L antenna groups of the communication transceiving antenna elements and one branch corresponding to the antenna calibration reference transceiving antenna elements. In addition, the uplink signal processor 30 includes L branches corresponding to L antenna groups of the communication transceiving antenna elements and one branch corresponding to the antenna calibration reference transceiving antenna elements.

In this embodiment, in the first time period, the antenna transmission controller 26 causes the antenna calibration reference transceiving antenna elements $111_1$ to $111_{N/L}$ alone to transmit radio pilot signals. The channel estimator 42 estimates effective channel coefficients based on the pilot signals received by the communication transceiving antenna elements 11. In addition, in a second time period different from the first time period (the second time period may be before or after the first time period), the antenna transmission controller 26 causes the communication transceiving antenna elements 11 alone to transmit radio pilot signals. The channel estimator 42 estimates effective channel coefficients based on the pilot signals received by the antenna calibration reference transceiving antenna elements $111_1$ to $111_{N/L}$. The calibration coefficient calculator 44 calculates calibration coefficients from the effective channel coefficients estimated in the first time period and the effective channel coefficients estimated in the second time period.

After pilot signals are transmitted from the antenna calibration reference transceiving antenna elements $111_1$ to $111_{N/L}$ and are received by communication transceiving antenna elements 11, it is preferably identifiable as to which of the antenna calibration reference transceiving antenna elements 111 transmitted each pilot signal. Additionally, after pilot signals are received by the antenna calibration reference transceiving antenna elements $111_1$ to $111_{N/L}$, it is preferably identifiable as to which of the antenna calibration reference transceiving antenna elements 111 received each pilot signal. Furthermore, after pilot signals are transmitted from communication transceiving antenna elements 11 belonging to one antenna group and are received by the antenna calibration reference transceiving antenna elements $111_1$ to $111_{N/L}$, it is preferably identifiable as to which of the communication transceiving antenna elements 11 transmitted each pilot signal. Additionally, after pilot signals are received by communication transceiving antenna elements 11 belonging to one antenna group, it is preferably identifiable as to which of these communication transceiving antenna elements 11 belonging to one antenna group received each pilot signal.

Thus, the radio base station 10 according to this embodiment includes: a sequence supplier that, when the antenna calibration reference transceiving antenna elements $111_1$ to $111_{N/L}$ transmit pilot signals in the first time period, gives the same sequences to signals to be supplied to the sub-branches corresponding to the antenna calibration reference transceiving antenna elements; and a delay applier that, when the antenna calibration reference transceiving antenna elements $111_1$ to $111_{N/L}$ transmit pilot signals, makes transmission timings of the pilot signals different. In addition, the radio base station 10 according to this embodiment includes: the sequence supplier that, when communication transceiving antenna elements 11 belonging to one antenna group transmit pilot signals in the second time period, gives the same sequences to signals to be supplied to the sub-branches corresponding to these transceiving antenna elements; and the delay applier that, when communication transceiving antenna elements 11 belonging to one antenna group transmit pilot signals, makes transmission timing of the pilot signals different. The sequence supplier may be a baseband processor 12. The baseband processor (sequence supplier) 12 supplies sequences with high auto-correlation and low cross-correlation to the DAC 14 as a basis for pilot signals. Such sequences may be PN (pseudonoise) sequences or Zadoff-Chu sequences, for example. The delay applier may be implemented by one or more delayers 52 or may be implemented with cables having different length with each other in the transmitting-side sub-branches. By means of the operation of the delay applier, when transceiving antenna elements belonging to one antenna group transmit pilot signals, the antenna elements transmit a sequence with different delays.

In addition, as in the fifth embodiment, the radio base station 10 according to this embodiment includes a digital phase controller (receiving-side phase controller) 64 that, when sub-branches belonging to one branch in the uplink signal processor 30 process pilot signals in the first time period and the second time period, makes the phases of the pilot signals processed by these sub-branches different. Furthermore, in this embodiment, the baseband processor 12 includes a despreading decorrelator 70. The despreading decorrelator 70 performs an inverse operation (namely, dispreading) of the variable phase shifters 40 spreading pilot signals as a result of the operation of the digital phase controller (receiving-side phase controller) 64, and decorrelates received pilot signals with sequences supplied by the baseband processor (sequence supplier) 12 upon transmission of the pilot signals.

Therefore, by means of the different transmitting-side delays of pilot signals and the receiving-side decorrelation by the despreading decorrelator 70, it is possible, after pilot signals are simultaneously transmitted from transceiving antenna elements (communicating transceiving antenna element 11 or antenna calibration reference transceiving antenna element 111) belonging to one antenna group and are then received by other transceiving antenna elements belonging to another antenna group, to identify as to which of the transceiving antenna elements transmitted each pilot signal. In addition, by means of the spreading of pilot signals by the receiving-side digital phase controller (receiving-side phase controller) 64 and the despreading of the pilot signals by the receiving-side despreading decorrelator 70, it is possible, after pilot signals are received by transceiving antenna elements belonging to one antenna group, to identify which of the transceiving antenna elements received each pilot signal.

A flowchart illustrating the process for self-calibration according to the tenth embodiment is similar to that of FIG. 18, which shows a flowchart illustrating the process for self-calibration according to the third embodiment. It is noted that "reference antenna group" in FIG. 18 is replaced with "antenna calibration reference transceiving antenna elements $111_1$ to $111_{N/L}$", and "calibration target antenna group" in FIG. 18 is replaced with "antenna group of communication transceiving antenna elements 11." In the tenth embodiment, all the communication transceiving antenna elements 11 are subject to antenna calibration. In addition, in this embodiment, the digital phase controller 27 does not give different phases to the sub-branches of each antenna group in the performance of self-calibration.

In this embodiment, if the number of antenna calibration reference transceiving antenna elements 111 is one, there is no need for a delay applier or a receiving-side phase controller for this antenna calibration reference transceiving antenna element 111, there is no need for the decorrelation by the despreading decorrelator 70 in the reception processing of pilot signals transmitted from the antenna calibration reference transceiving antenna element 111, and there is no need for the despreading by the despreading decorrelator 70 in the reception processing of pilot signals received by the antenna calibration reference transceiving antenna element 111.

Other Modifications

In the above embodiments, antenna elements transmit and receive radio pilot signals, and calibration coefficients are calculated based on radio pilot signals propagated through space. Alternatively, pilot signals may be transceived through a procedure different from that for radio transceiving. Pilot signals may be transmitted and received among antenna elements via coupling circuits that link antenna elements, and calibration coefficients may be calculated based on effective channel coefficients for pilot signals propagated through the coupling circuits.

In the radio base station 10 and the mobile terminal, various functions performed by the DSP may instead be performed by hardware, or may instead be performed by a programmable logic device such as an FPGA (Field Programmable Gate Array) and CPU (Central Processing Unit).

DESCRIPTION OF REFERENCE SIGNS

10 . . . radio base station; 11 . . . transceiving antenna element; 10A . . . antenna set; 12 . . . baseband processor (sequence supplier, digital signal processor); 14 . . . digital-to-analog converter (DAC); 16 . . . up-converter (frequency converter); 18 . . . analog beamformer; 20 . . . variable phase shifter; 22 . . . power amplifier (amplitude adjuster); 24 . . . downlink parameter determiner; 26 . . . antenna transmission controller; 27 . . . digital phase controller (transmitting-side phase controller); 28 . . . digital gain controller; 30 . . . uplink signal processor; 32 . . . down-converter (frequency converter); 34 . . . analog-to-digital converter (ADC); 38 . . . low-noise receiving amplifier; 40 . . . variable phase shifter; 42 . . . channel estimator; 44 . . . calibration coefficient calculator; 50 . . . transmitting-side switch; 52 . . . delayer (delay applier); 60 . . . receiving-side switch; 62 . . . despreader; 64 . . . digital phase controller (receiving-side phase controller); 66 . . . double despreader; 68 . . . decorrelator; 70 . . . despreading decorrelator.

The invention claimed is:

1. A radio base station comprising:
a digital signal processor configured to perform digital precoding by applying a precoding matrix to a downlink signal;
an analog beamformer configured to perform analog beamforming that applies a change in a phase and amplitude to the downlink signal that has undergone the digital precoding, the change corresponding to a beamforming matrix;
transceiving antenna elements configured to transmit by radio the downlink signal that has undergone the analog beamforming and to receive by radio, from user equipment, an uplink signal in a same frequency band as a frequency band used for transmitting the downlink signal; and
an uplink signal processor configured to process the uplink signal received by the transceiving antenna elements,
wherein the transceiving antenna elements are classified into antenna groups, each antenna group including some of the transceiving antenna elements,
wherein the analog beamformer includes branches, each branch corresponding to a corresponding one of the antenna groups, each branch including sub-branches, each sub-branch including a variable phase shifter and an amplitude adjuster to perform the analog beamforming, each sub-branch being connected to one of the transceiving antenna elements,
wherein the uplink signal processor includes branches, each branch corresponding to a corresponding one of the antenna groups, each branch including sub-branches, each sub-branch including a receiving amplifier and being connected to one of the transceiving antenna elements,
wherein the radio base station further comprises:
an antenna transmission controller configured to control transmission of pilot signals from the transceiving antenna elements;
a channel estimator configured to estimate channel coefficients based on pilot signals received by the transceiving antenna elements; and
a calibration coefficient calculator configured to, when downlink transmission is performed, calculate calibration coefficients to be applied to a downlink radio signal to be transmitted from the transceiving antenna elements based on channel coefficients estimated from uplink radio signals received by the transceiving antenna elements,
wherein in a first time period, the antenna transmission controller causes transceiving antenna elements alone that are among the transceiving antenna elements and belong to a reference antenna group to transmit pilot signals, the reference antenna group being one of the antenna groups, and the channel estimator estimates channel coefficients based on the pilot signals received by transceiving antenna elements, among the transceiving antenna elements, that belong to the antenna groups except for the reference antenna group,
wherein in a second time period different from the first time period, the antenna transmission controller causes the transceiving antenna elements alone that belong to the antenna groups except for the reference antenna group to transmit pilot signals, and the channel estimator estimates channel coefficients based on the pilot signals received by the transceiving antenna elements that belong to the reference antenna group,
wherein the calibration coefficient calculator calculates the calibration coefficients from the channel coefficients estimated in the first time period and the channel coefficients estimated in the second time period,
wherein after pilot signals are transmitted from transceiving antenna elements, these transceiving antenna elements being among the transceiving antenna elements and belonging to an antenna group that is one of the antenna groups, and are received by other transceiving antenna elements belonging to another antenna group among the antenna groups, it is identifiable as to which of the transceiving antenna elements transmitted each pilot signal, and
wherein after pilot signals are received by transceiving antenna elements, these transceiving antenna elements being among the transceiving antenna elements and belonging to an antenna group that is one of the antenna groups, it is identifiable as to which of the transceiving antenna elements received each pilot signal.

2. The radio base station according to claim 1, further comprising:
transmitting-side switches configured to, when one of transceiving antenna elements belonging to an antenna group among the antenna groups transmits pilot signals in the first time period and the second time period, prevent other transceiving antenna elements belonging to this antenna group from transmitting pilot signals; and
receiving-side switches configured to, when one of sub-branches belonging to a branch among the branches in the uplink signal processor processes the pilot signals in the first time period and the second time period, prevent other sub-branches belonging to this branch from processing the pilot signals.

3. The radio base station according to claim 1, further comprising:
a transmitting-side phase controller configured to, when transceiving antenna elements belonging to an antenna group among the antenna groups transmit pilot signals in the first time period and the second time period, make phases of the pilot signals to be transmitted from these transceiving antenna elements different from each other; and
receiving-side switches configured to, when one of sub-branches belonging to a branch among the branches in the uplink signal processor processes the pilot signals in the first time period and the second time period, prevent other sub-branches belonging to this branch from processing the pilot signals.

4. The radio base station according to claim 1, further comprising:
a transmitting-side phase controller configured to, when transceiving antenna elements belonging to an antenna group among the antenna groups transmit pilot signals in the first time period and the second time period, spread the pilot signals to be transmitted from these transceiving antenna elements with different first orthogonal-spreading sequences; and
a receiving-side phase controller configured to, when sub-branches belonging to a branch among the branches in the uplink signal processor process the pilot signals in the first time period and the second time period, spread the pilot signals processed by these sub-branches with different second orthogonal-spreading sequences.

5. The radio base station according to claim 1, further comprising:
- a sequence supplier configured to, when transceiving antenna elements belonging to one antenna group among the antenna groups transmit pilot signals in the first time period and the second time period, give same sequences to the signals to be supplied to sub-branches corresponding to these transceiving antenna elements;
- a delay applier configured to, when the transceiving antenna elements belonging to the one antenna group transmit the pilot signals in the first time period and the second time period, make transmission timings of the pilot signals different; and
- receiving-side switches configured to, when a sub-branch belonging to a branch among the branches in the uplink signal processor processes the pilot signals in the first time period and the second time period, prevent other sub-branches belonging to the branch from processing the pilot signals.

6. The radio base station according to claim 1, further comprising:
- a sequence supplier configured to, when transceiving antenna elements belonging to one antenna group among the antenna groups transmit pilot signals in the first time period and the second time period, give same sequences to the signals to be supplied to sub-branches corresponding to these transceiving antenna elements;
- a delay applier configured to, when the transceiving antenna elements belonging to the one antenna group transmit the pilot signals in the first time period and the second time period, make transmission timings of the pilot signals different; and
- a receiving-side phase controller configured to, when a sub-branch belonging to a branch among the branches in the uplink signal processor processes the pilot signals in the first time period and the second time period, make phases of the pilot signals processed by these sub-branches different.

7. A radio base station comprising:
- a digital signal processor configured to perform digital precoding by applying a precoding matrix to a downlink signal;
- an analog beamformer configured to perform analog beamforming that applies a change in a phase and amplitude to the downlink signal that has undergone the digital precoding, the change corresponding to a beamforming matrix;
- transceiving antenna elements configured to transmit by radio the downlink signal that has undergone the analog beamforming and to receive by radio, from user equipment, an uplink signal in a same frequency band as a frequency band used for transmitting the downlink signal;
- an uplink signal processor configured to process the uplink signal received by the transceiving antenna elements, and
- at least one antenna calibration reference transceiving antenna element configured to transmit and receive pilot signals for antenna calibration,
- wherein the transceiving antenna elements are classified into antenna groups, each antenna group including some of the transceiving antenna elements,
- wherein the analog beamformer includes branches, each branch corresponding to a corresponding one of the antenna groups, each branch including sub-branches, each sub-branch including a variable phase shifter and an amplitude adjuster to perform the analog beamforming, each sub-branch being connected to one of the transceiving antenna elements,
- wherein the uplink signal processor includes branches, each branch corresponding to a corresponding one of the antenna groups, each branch including sub-branches, each sub-branch including a receiving amplifier and being connected to one of the transceiving antenna elements,
- wherein the radio base station further comprises:
- an antenna transmission controller configured to control transmission of pilot signals from the at least one antenna calibration reference transceiving antenna element and from the transceiving antenna elements;
- a channel estimator configured to estimate channel coefficients based on pilot signals received by the at least one antenna calibration reference transceiving antenna element and by the transceiving antenna elements; and
- a calibration coefficient calculator configured to, when downlink transmission is performed, calculate calibration coefficients to be applied to a downlink radio signal to be transmitted from the transceiving antenna elements based on channel coefficients estimated from uplink radio signals received by the transceiving antenna elements,
- wherein in a first time period, the antenna transmission controller causes the at least one antenna calibration reference transceiving antenna element alone to transmit pilot signals and the channel estimator estimates channel coefficients based on the pilot signals received by the transceiving antenna elements,
- wherein in a second time period different from the first time period, the antenna transmission controller causes the transceiving antenna elements alone to transmit pilot signals, and the channel estimator estimates channel coefficients based on the pilot signals received by the at least one antenna calibration reference transceiving antenna element,
- wherein the calibration coefficient calculator calculates the calibration coefficients from the channel coefficients estimated in the first time period and the channel coefficients estimated in the second time period,
- wherein after pilot signals are transmitted from transceiving antenna elements, these transceiving antenna elements being among the transceiving antenna elements and belonging to an antenna group that is one of the antenna groups, and are received by the at least one antenna calibration reference transceiving antenna element, it is identifiable as to which of the transceiving antenna elements transmitted each pilot signal, and
- wherein after pilot signals are received by transceiving antenna elements, these transceiving antenna elements being among the transceiving antenna elements and belonging to an antenna group that is one of the antenna groups, it is identifiable as to which of the transceiving antenna elements received each pilot signal.

* * * * *

UNITED STATES PATENT AND TRADEMARK OFFICE
CERTIFICATE OF CORRECTION

PATENT NO. : 10,020,596 B2  
APPLICATION NO. : 15/313570  
DATED : July 10, 2018  
INVENTOR(S) : Anass Benjebbour et al.

Page 1 of 1

It is certified that error appears in the above-identified patent and that said Letters Patent is hereby corrected as shown below:

In the Specification

At Column 6, Line number 41 replace equation 17:
$$h_{m,n} = T_{eNB,m} \blacksquare g_{m,n} \blacksquare R_{eNB,n} \qquad (17)$$

With the following:
$$h_{m,n} = T_{eNB,m} \cdot g_{m,n} \cdot R_{eNB,n} \qquad (17)$$

At Column 6, Line 47 replace equation 18:
$$h_{n,m} = T_{eNB,n} \blacksquare g_{n,m} \blacksquare R_{eNB,m} \qquad (18)$$

With the following:
$$h_{n,m} = T_{eNB,n} \cdot g_{n,m} \cdot R_{eNB,m} \qquad (18)$$

At Column 20, replace Lines 33-37:
culated. Supposedly, if orthogonal pilot signals $X_1$ and $X_2$ are transmitted that satisfy $X_1 \blacksquare X_1 = 1$, $X_2 \blacksquare X_2 = 1$, and $X_1 \blacksquare X_2 = 0$, and the reception result r is multiplied by $X_1$ and $X_2$, respectively, at the receiving side, the following equations can be obtained.

With the following:
culated. Supposedly, if orthogonal pilot signals $X_1$ and $X_2$ are transmitted that satisfy $X_1 \cdot X_1 = 1$, $X_2 \cdot X_2 = 1$, and $X_1 \cdot X_2 = 0$, and the reception result r is multiplied by $X_1$ and $X_2$, respectively, at the receiving side, the following equations can be obtained.

Signed and Sealed this  
Eighteenth Day of June, 2019

Andrei Iancu  
*Director of the United States Patent and Trademark Office*